(12) United States Patent
Sumler et al.

(10) Patent No.: US 8,149,701 B2
(45) Date of Patent: *Apr. 3, 2012

(54) SYSTEM, METHOD, AND COMPUTER READABLE MEDIUM FOR CREATING A VIDEO CLIP

(75) Inventors: Jason Sumler, Dallas, TX (US); Tomer Alpert, Dallas, TX (US)

(73) Assignee: Silver Screen Tele-Reality, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/018,191

(22) Filed: Jan. 31, 2011

(65) Prior Publication Data

US 2011/0214045 A1  Sep. 1, 2011

Related U.S. Application Data

(63) Continuation of application No. 11/293,005, filed on Dec. 2, 2005, now Pat. No. 7,882,258, and a continuation-in-part of application No. 10/773,130, filed on Feb. 5, 2004, now abandoned.

(60) Provisional application No. 60/632,410, filed on Dec. 2, 2004, provisional application No. 60/445,261, filed on Feb. 5, 2003.

(51) Int. Cl.
  *G01R 31/08* (2006.01)
  *G06F 15/16* (2006.01)

(52) U.S. Cl. ........................................ 370/230; 709/231

(58) Field of Classification Search .................... 370/230
  See application file for complete search history.

(56) References Cited

U.S. PATENT DOCUMENTS

| | | | |
|---|---|---|---|
| 5,642,135 A * | 6/1997 | Noguchi et al. | ............ 345/547 |
| 6,046,734 A | 4/2000 | Noguchi et al. | |
| 6,195,503 B1 | 2/2001 | Ikedo et al. | |
| 6,256,061 B1 | 7/2001 | Martin et al. | |
| 6,353,699 B1 * | 3/2002 | Schwab | ........................ 386/234 |
| 2002/0097327 A1 | 7/2002 | Yamasaki | |
| 2004/0257380 A1 | 12/2004 | Herbert et al. | |

* cited by examiner

*Primary Examiner* — Jeffrey Pwu
*Assistant Examiner* — Shaq Taha

(57) ABSTRACT

The present invention provides a system, method, and computer readable medium for creating a video clip. In one embodiment, a method, comprising creating a copy of a still image by a first module, the copy of the still image comprising reduced dimensions of the still image, creating a new still image from a selected area of the still image, automatically ordering the new still image and the copy of the still image, creating an audio file by at least one of a second module and a third module, creating a timeline, by the first module, related to the ordered images and the created audio file, and rendering the timeline into a video clip by a fourth module, wherein the timeline includes a length of the audio file, a length of the video clip, the ordered images, a display time of each of the ordered images, transition identifiers, transition lengths. The present invention further discloses a system for assembling and distributing multi-media output, comprising: a rendering server; a web server; and storage, wherein the servers and the storage are operably coupled; the storage adapted to receive digital media and properties of the media, store the media and the properties, and transmit the media and the properties; the web server adapted to perform at least one of a following action: retrieve the media and properties of the media; manipulate the media and the properties; assemble the properties; and transmit at least one of a following element from a group consisting of: the properties; and the assembled properties; and the rendering server adapted to receive commands from the web server.

14 Claims, 43 Drawing Sheets

221'

Export Digital Media
This form allows you to select SiSTer Exchange fields for media files, and support them.
After selecting the files and their fields, click Execute to save their information. When you have processed all your files, click Done to perform the export.

222'

224' Digital Media Exchanger Fields
- PPV 10 Cents ▼ — View Heading
- Minimum of 1000 Mbs ▼ — View Heading
- 60 Day License ▼ — View Heading
- ▼ — View Heading
- ▼ — View Heading

226' DE Export to SiSTer Exchange Partners (???? contract on file)
- Library ID: 2020
- Project ID:
- Username: user@domain.com
- Password:

[Execute]

View a Digital Media Exchange Field

500' — Field Code: 3-10 Characters long — PPV10

502' — Short Description: Displayed in select menu — PPV 10 Cents

504' — Business Description: Displayed in exchange agreement
Pay Per View $0.10

506' — Catalog Description: Displayed in exchange catalog
This clip is priced on a Pay Per View Model.
Cost is $0.10 per view.

[Close]

FIG. 26b

SYSTEM, METHOD, AND COMPUTER READABLE MEDIUM FOR CREATING A VIDEO CLIP

CROSS-REFERENCE TO RELATED APPLICATIONS

The present invention is a continuation of and claims the benefit and priority of U.S. patent application Ser. No. 11/293,005, filed on Dec. 2, 2005 now U.S. Pat. No. 7,882, 258, entitled System, Method, and Computer Readable Medium for Creating A Video Clip, which is related to and claims the benefit and priority of U.S. Provisional Patent Application Ser. No. 60/632,410, filed on Dec. 2, 2004 now abandoned, entitled Picture To Video (Pic-2-Vid) In Internet Commerce and which is a Continuation-In-Part of U.S. patent application Ser. No. 10/773,130, filed on Feb. 5, 2004, entitled System And Method For Assembling And Distributing Multi-Media Output, which is related to and claims the benefit and priority of U.S. Provisional Patent Application Ser. No. 60/445,261 filed on Feb. 5, 2003, entitled System And Method For Generating A Unified File Name. The entire contents of each of the above noted patent applications are enclosed by reference herein.

FILED OF THE INVENTION

The present invention is generally related to video, and more specifically, to a system, method, and computer readable medium for creating a video clip. The present invention relates generally to multi-media content and, more specifically, to a system and method for assembling and distributing multi-media output. The present invention also relates generally to multi-media content and more specifically, to a system, method, and computer-readable medium for assembling and distributing multi-media output.

BACKGROUND OF THE INVENTION

The transcoding of pictures to video is a known technique that includes U.S. Pat. No. 6,195,503 that describes the transformation of compressed images and audio into video. Also, video editing using server Internet tools, including the transcoding and rendering of pictures into video is known. However, a limitation exists for using pictures as a tool for Internet commerce. Almost all sites for selling and buying items on the Internet use simple pictures as the main tool for explaining, demonstrating and educating customers about these items. Pictures are simple to take and use. Further, pictures do not use complex editing tools and processing power and do not require a high level of expertise to either take, process, or deliver.

It would be very beneficial if improved systems, methods, and computer readable media are devised which allow better options to convey pertinent information while using the same pictures that are used today.

Large numbers of organizations are producing and making use of video, audio, flash animation, HTML and pictures collectively known as Multi Media Content (MMC). There is also an abundant amount of video and audio in analog format (such as tapes) which are typically converted to digital format. Another major source of MMC is commercial material produced by the entertainment (movie studios) and broadcasting industry (TV), as well as individuals using camcorders. Most of the MMC is distributed on CD's and DVD's. Production of such media is costly and distribution via the mail system is time consuming.

An alternative to DVD's and CD's is electronic distribution that can be accomplished via a Local Area Network (LAN), Wide Area Network (WAN), using TCP/IP via a public network (the Internet), or via an internal system (Intranet). Other means of distribution are wireless such as microwave, a cellular network, and a WI-FL network, for example. However, MMC content, (especially video) typically comprised large files, and distributing such content electronically can be very expensive, time consuming, and in many cases, simply impossible due to the limited capacity of the receiving device.

Trading, licensing and selling of MMC by commercial providers (such as movie studios, TV networks, sport channels, etc.) is cumbersome since the providers may consider the content to be proprietary and may find it difficult to prevent a receiver of the content from creating multiply copies.

Progressive download, widely known as Streaming Media (a client-server system), is an excellent solution since the encoding process reduces the original file size by 80-90%. Upon request, the server sends a small amount of data ("Buffering"). As soon as the buffering is completed the receiving device starts the play back while the process of downloading and decoding occurs in the background, often times simultaneously. The process of encoding MMC to a streaming format, however, is cumbersome, time consuming, and requires significant technical expertise as the user has to select a wide range of parameters. Furthermore, the nature of TCP/IP and a secured network, block the user from direct accesses to the operating system and file storage process. A separate process of uploading is required and the final stage of storage and indexing for retrieval must be done by authorized personnel (for example, a system administrator).

Other issues that prevent wide use of MMC content include:

1. Once the MMC is uploaded it cannot be changed—any change requires creation of a new file (rendering) and repeating the upload process;

2. Streaming video can be played within flash and HTML but there is no way to tell what and when the receiving device will play each component since the buffering time can change randomly; and 3. There are many types of receiving devices using many communication protocols, players and streaming technology. Distributing MMC in streaming format also enables the MMC provider to license the use of content without proprietary concern since the progressive download process prevents it. However, establishing a commerce platform for licensing and trading MMC requires an agreed upon protocol and a large, centralized database to monitor the transactions. Many attempts to do so have failed. It is therefore desirable for the present invention to overcome the aforementioned problems and limitations associated with multi-media output.

SUMMARY OF THE INVENTION

The present invention provides a system, method, and computer readable medium for creating a video clip. In one embodiment, a method, comprising creating a copy of a still image by a first module, the copy of the still image comprising reduced dimensions of the still image, creating a new still image from a selected area of the still image, automatically ordering the new still image and the copy of the still image, creating an audio file by at least one of a second module and a third module, creating a timeline, by the first module, related to the ordered images and the created audio file, and rendering the timeline into a video clip by a fourth module, wherein the timeline includes a length of the audio file, a length of the video clip, the ordered images, a display time of each of the ordered images, transition identifiers, transition lengths.

In another embodiment, a system for creating a video clip comprises a device configured to create an audio file, and a web server configured to create a copy of a still image, a new still image from a selected area of the still image, wherein the new still image and the copy of the still image are automatically ordered, and a time line related to the ordered images and the created audio file, wherein the time line includes a length of the audio file.

In a further embodiment, a computer readable medium comprises creating a copy of a still image by the first module, the copy of the still image comprising reduced dimensions of the still image, creating a new still image from a selected area of the still image, automatically ordering the new still image and the copy of the still image, creating an audio file by at least one of a second module and a third module, creating a timeline, by the first module, related to the ordered images and the created audio, and rendering the timeline into a video clip by a fourth module, wherein the timeline includes a length of the audio file, an identifier of the audio file created by the second module or the third module, or a volume envelope associated with the audio file.

The present invention also achieves technical advantages as a system, method and computer-readable medium for assembling and distributing multi-media output. Various embodiments of the present invention are noted below:

1. Allow any user a simple method of encoding and uploading. This can be done by setting pre-defined "profiles" containing specific parameters for encoding, indexing, sorting and uploading any type of MMC. The profiles can be created by a system administrator, for example, and stored on a server. The user computing device automatically downloads these profiles.

2. The user is able to select any type of content. The system is able to allocate the right encoding and compressing process for each type of content. Setting the content attributes, indexing and encoding are done on the user's computing device. The uploaded MMC will then be much smaller than the original MMC thus saving significant upload time. Since the MMC has been identified, described and indexed, the content can be automatically directed to the right storage device. Retrieval by indexing, attribute and key word search is enabled. Once stored on the server, the content can be instantly edited by selecting entry and exit points for the streaming server.

3. The user can also select separate files and/or segments to be played together as one show ("movie making").

4. Allow the user to add voice to the MMC by means of a telephone, cellular phone, microphone and other similar devices. The user is able to play the voice over while the MMC is played or as an introduction before the MMC. The user should also be able to control the volume setting of the audio channels.

5. The user is able to mix and integrate different types of MMC such as video, audio, animation and pictures instantly and without rendering a new file. Since the system stores only the instruction sets and the server produces the edited clips, made-up movies and customized production, (on the fly), only a fraction of the storage capacity is required. The server creates Multi Media Presentations (MMP) that are displayed using HTML based platform and Multi Media Messaging (MMS) that are displayed directly on the device (for example, wireless devices such as cell phones).

6. Organizations are able to create and store pre-defined templates allowing their users to change the MMC content, add text, animation and voice over as needed.

7. The user is able to distribute the MMC in many format such as:
E-mail with a link to the message in HTML format (Vid-Mail);
Independent web site;
Embedded object in a web site;
Multi Media Message (MMS) to cell phone and wireless devices; and
On line instant messaging systems.

8. Security and access level is built into the system such that user access to the MMC is controlled. Security features are enabled for the MMS and MMP as well such that certain clips will not play for unauthorized viewers.

9. The system has the ability to automatically attach other MMC to any MMP and MMS such as advertisement and sponsors' messages. This process is known as "wrapping" and can be done on random basis or triggered by external parameters (such as demographic targeted wrappers).

10. The integration and execution of commands between different media types (such as streaming and flash) can be controlled and modified even after the publication. Viewers can interfere with the control system via a computing device or any telephone.

11. The system permits copying and sharing content between different project and storage devices based on the user's access level.

12. Allow for search and retrieval of MMC based on a unique identifier, indexing system and keyword search. The search and retrieval is machine independent and does not require any specific database and/or synchronization.

13. By defining commerce criteria, such as pricing, duration of license and time limits, one can offer the MMC for trade without copying and downloading the MMC (thus protecting intellectual properties). The process of such trade is independent—one can define the terms of commerce and exchange confirmation without any predefined protocol and/or centralized system.

14. Using the MMP and MMS command set stored on the server or on the user's computer, a new file can be rendered in the background. The new file is seamless, contains all the elements of MMP or MMS, and can include special effect, transitions, embedded text etc. The rendered file can be stored on the server as a new MMC. The rendered file can also be sent via MMS or downloaded to the user.

15. The command set can be sent directly to any video editing as a "story board". The editing system is automatically loading the right clips at the right places and times for the video editor to complete the editing process. A tremendous amount of time is saved and the communication between the parties is much more effective.

In one embodiment, is a system for assembling and distributing multi-media output which comprises: a rendering server; a web server; and storage, wherein the servers and the storage are operably coupled; the storage adapted to receive digital media and properties of the media, store the media and the properties, and transmit the media and the properties; the web server adapted to perform at least one of a following action: retrieve the media and properties of the media; manipulate the media and the properties; assemble the properties; and transmit at least one of a following element from a group consisting of: the properties; and the assembled properties; the rendering server adapted to receive commands from the web server. In another embodiment is a method for creating a unified file name, which comprises: assigning a unique identifier based on a destination of a file; assigning a code based on a type of the file after the unique identifier; assigning a code based on a user defined category after the code based on the file type; assigning a code based on a user defined sub-category after the code based on the user defined category; assigning a code related to at least one of: a creator of the file; and a creator of a content of the file, after the code based on the user defined sub-category; and assigning a creation date of at least one of: the creator of the file; and the creator of the content of the file, after the previously assigned code. In a further embodiment, is a computer readable medium which comprises instructions for: indicating, via a first instruction, a time index within a multi-media output; indicating, via a second instruction, a file within the multi-media output; playing the multi-media output via a first player; receiving an audio file at a second player; buffering the audio file at the second player; and playing the buffered audio file during at least one of a following location: the time index at the first player; and at a point the file is encountered at the first player.

BRIEF DESCRIPTION OF THE DRAWINGS

FIG. 26a illustrates a screen shot of sister exchange of exporting digital media in accordance with an exemplary embodiment of the present invention;

FIG. 26b illustrates a screen shot of sister exchange of UFN fields in accordance with an exemplary embodiment of the present invention;

DETAILED DESCRIPTION OF THE INVENTION

The present invention describes a process of creating video clips from any given set of digital pictures and of creating an audio track in either an automatic mode or a manual mode that is interchangeable. The pictures are provided as a set of Universal Resource Locators (URL's, pointing to one or more servers), uploaded manually or created on line by cropping and saving many pictures from one source. The audio track can be created from several sources including:

Interactive Voice Response (IVR)—using any telephone system the user can call into a computer based telephony application that calls a WMA encoder;

Text-To-Speech (TTS)—a TTS module can be used to convert text to speech;

Microphone—connected to a client device which records a voice file on the server; and Existing audio file—usually pre-recorded audio such as music or sound effects.

In manual mode, a preview module synchronizes a visual display (play-list) and an audio track for instant replay. a rendering server receives a command set (or SIS Commands) from a mixer or a predefined set of rules (in automatic mode) and creates a video file in .WMV format, for example. An embedded player recognizes the existence of the .WMV file and plays the video thus eliminating the need to post new HTML code.

Figure 1:
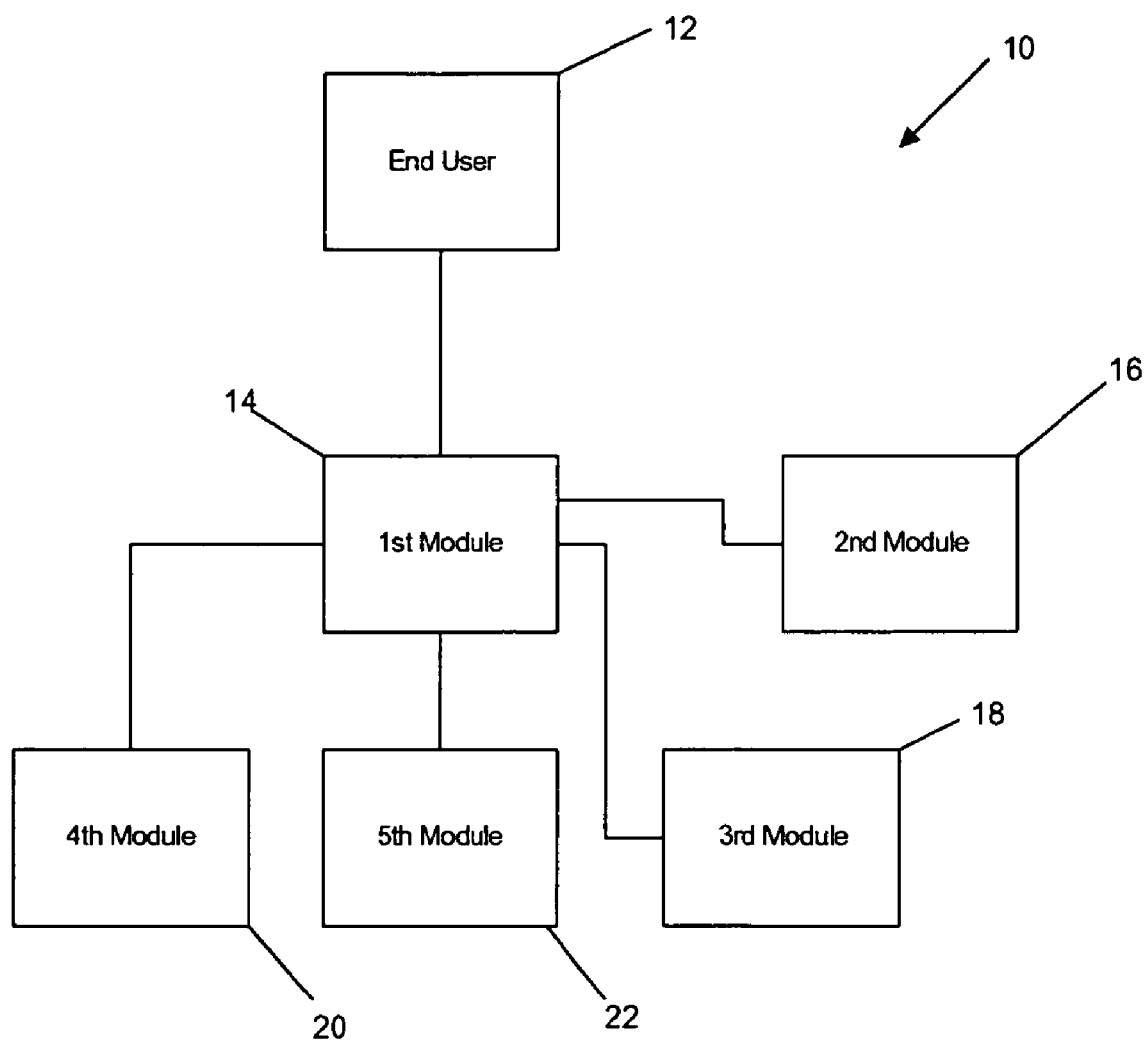
FIG. 1 depicts a system for creating a video clip in accordance with a preferred embodiment of the present invention.

The present invention further describes processing and delivering pictures made to video in a secure manner for use in commerce, such as for use in Internet commerce. Referring now to FIG. 1, a system 10 of the present invention comprises a first module (such as a web server 14), at least one of: a second module (such as a TTS engine) 16 and a third module (such as an IVR engine) 18, a fourth module (such as a rendering server) 20, a fifth module (such as a media steaming server) 22, and memory (not shown). The system 10 is accessed by a user device 12 such as a computer, cellular phone, and/or any wireless or wired device capable of communicating with the system 10. The user device 12 is coupled to the fist module 14, which is coupled to the second module and/or the third module directly or via the memory. The first module 14 is coupled to the fourth module 20 and is optionally coupled to the fifth module 22. In other embodiments, a lesser or greater number of modules can be used and the functionality performed by the current invention can be performed by these lesser or greater number of modules without departing from the scope of the present invention. Also, the connections between the modules may be wired, wireless, and a combination of wired and wireless.

Editing Process

Figure 5:
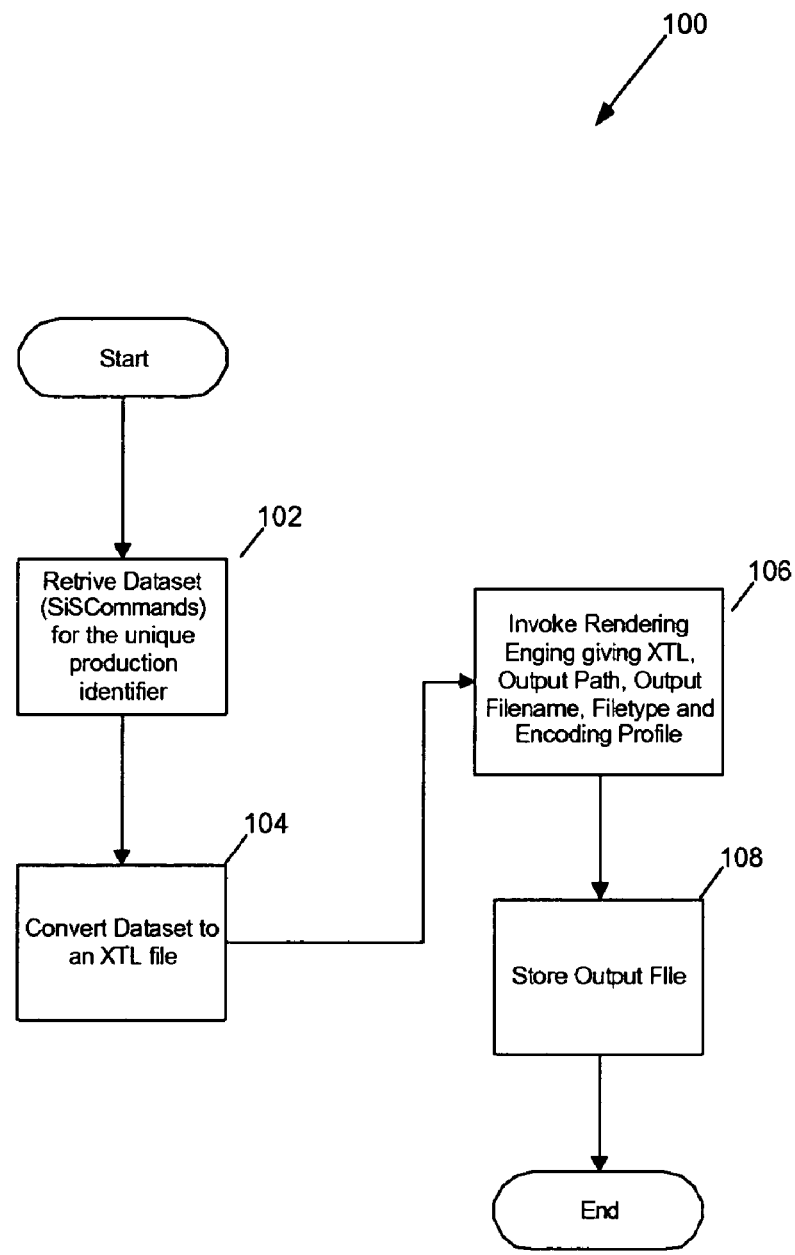
FIG. 5 depicts a transcoding/rendering process in accordance with a preferred embodiment of the present invention.

In one embodiment of the invention, the user uploads images (pictures), preferably in compressed format (such as JPEG) to a dedicated server for editing and transcoding from pictures and audio tracks to video, preferably WMV. A main portion of the invention is the editing process. Instead of transforming the pictures to video and then editing, the software of the present invention prepares (edits) the video using the original pictures and the original sound track (audio). This method allows for very simple editing that is extremely light in processing power. The editing process, as will be explained later, does not require the actual transcoding process to take place until the editing is completed and the editing instructions are summarized in a special command file (a SIS Command) using special command language. Instead of requiring several multiple servers dedicated to the editing process (because the requirement for processing power), the system uses fewer and lighter processing engines. This method also allows a streamlining of the transcoding process (transforming the pictures and associated audio to actual video). Once the user finishes editing the pictures and associated audio, the file containing the instructions on how to use the pictures and audio in the transcoding process are queued for the transcoding process. This achieves two main goals: (1) very efficient use of the transcoding engine, which typically requires most of the processing power, as files are processed only once, and (2) the files are queued (video encoding) in real time on their way to their final destination (the streaming server) as depicted in FIG. 5.

Figure 3:
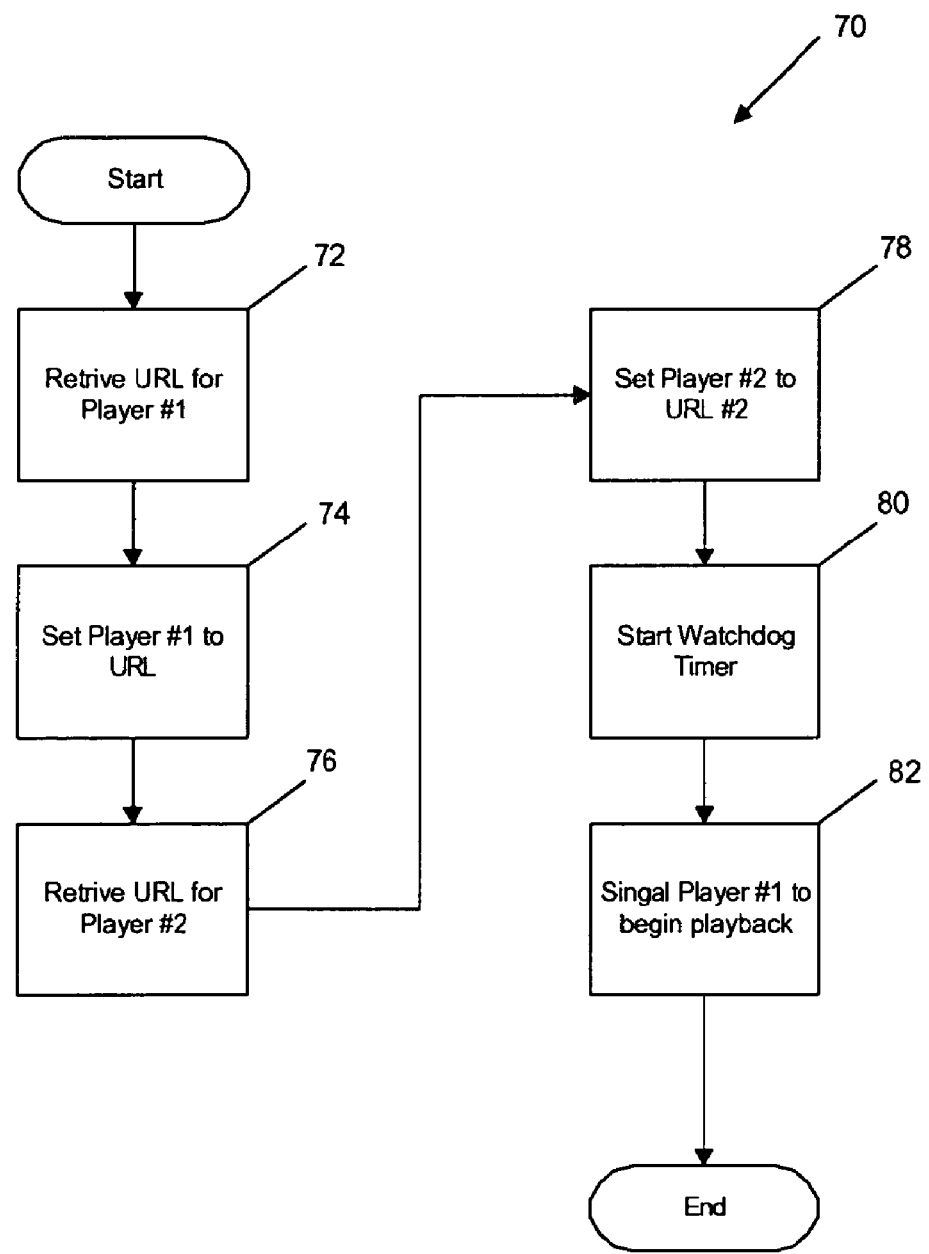
FIG. 3 depicts a flowchart for synchronization in accordance with a preferred embodiment of the present invention.
Figure 4:
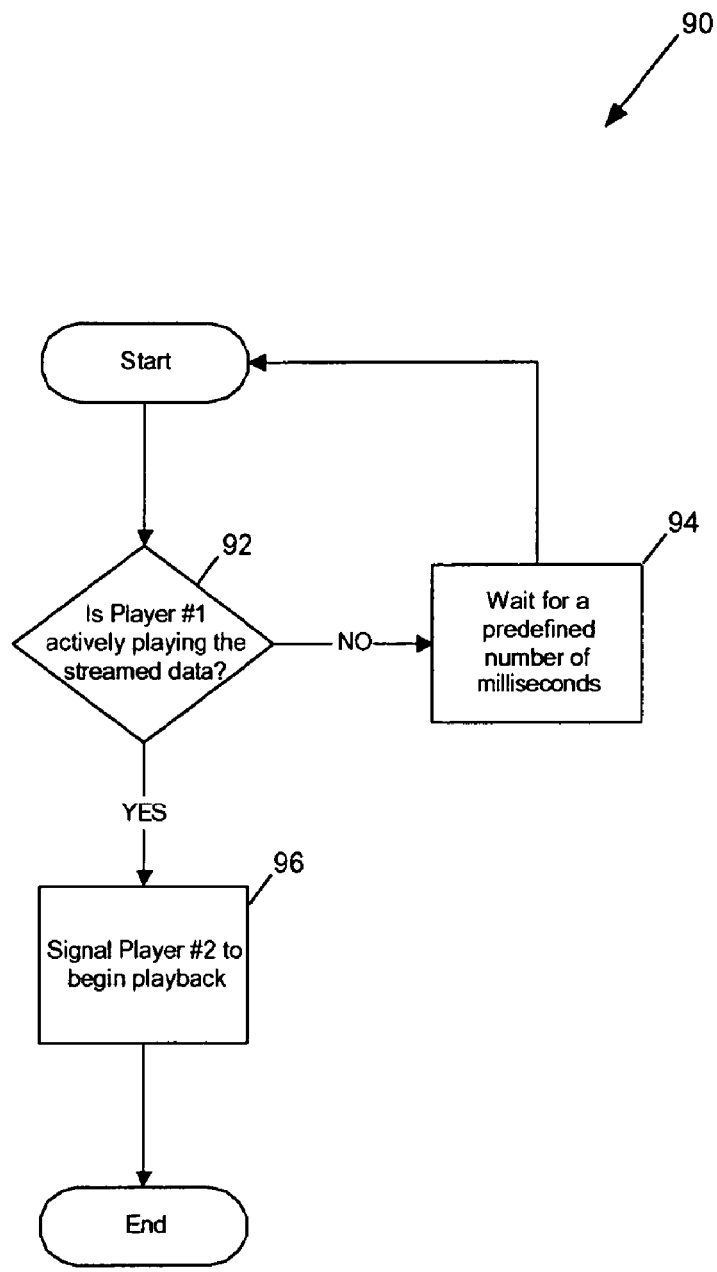
FIG. 4 depicts a timer process in accordance with a preferred embodiment of the present invention.

In one embodiment of the present invention, the system uses two players, one for audio and one for pictures. The editing process is premised on creating synchronization points between the two multimedia files (as depicted in FIGS. 3 and 4). In one instance, the pictures are displayed evenly in time according to the length of the audio file. For example, if there are 10 pictures to be transformed to video and the length of the audio file is 45 seconds, then each picture will be displayed for approximately 4.5 seconds. In another instance, the user (who created the video) can decide on different allocations of times to each picture based on the content of the audio file. This can be done either interactively (the user clicks the mouse for example when it desires a transition to the next picture) or by setting manually the time allocation—in percentages for example.

In another embodiment of the present invention, the audio track for the video is obtained using a telephone. The user calls a number, dials in an identification number of work in progress, and the server digitizes and compresses the incoming "audio track" in preparation for the editing process. In yet another variant of the invention, the audio track is uploaded from the user's computer where he/she digitizes the audio locally.

Text-To-Speech

In another embodiment of the invention, which can be used in many other applications (beyond Internet commerce), TTS is integrated into the system. This is important for both occasional users as well as aggregators (aggregators assist clients who are large sellers (Power Sellers) selling large quantities of items). The occasional user can benefit from TTS because it provides a professional sounding voice to the video (and the user can choose from a variety of voice options). The aggregator (and by extension his customers) can benefit from TTS because it can automatically create large amounts of sound tracks for many video clips (without the need for human interaction).

In a further embodiment of the invention, every picture has its associated TTS and the switch to a next picture is performed when the paragraph is over. In yet another embodiment of the current invention, the user can inject quiet periods when needed in order to keep a picture with short text on the screen longer. Likewise, the user can also include music or any other external audio clips to supplement the final video.

Focal Points

In yet another element of the present invention, the high resolution of available pictures allow the user to use a much higher quality video by using what are referred to as focal points. In many cases a single picture contains several objects that can be listed on sale. For example, a user may want to sell 10 tools and he created a single high resolution picture of all 10 tools. By using 10 focal points on the image (for example, selecting the focal points by clicks of the mouse), the software of the current invention can create the following: (1) 10 different pictures, and (2) a "real" video in which the "camera" is fluidly moving from one object to the next. This is especially useful when there are connections from one object to the next. A user can add pop-up messages and possibly associated text to help in the "selling" process. Such type of pop-up windows can create the mood for the visualization (add humor) or put a special slant on the object that is easier to do with a pop-up picture (typically smaller) than with the audio track.

Picture Security

One of the best ways to sell on the Internet is by using high quality pictures. These pictures often take a great deal of effort to create. Unfortunately, once the pictures are on the Internet they are easy to copy and use. There are no good methods to protect pictures. In one embodiment of the invention, the pictures are transformed to video to facilitate protection. There are many video formats that support DRM (Digital Rights Management) which provides the protection of the pictures that the user worked hard to create. In one embodiment of the invention WMV with its DRM system is used for picture protection.

The present invention includes a number of features:
1. Picture to video editing that uses the original pictures and audio tracks in the editing process.
2. (1) when two players are used for the editing process.
3. (1) where the transcoding process is streamlined.
4. Making the video playing length a function of the audio track length.
5. (4) where time allocated to each picture is equal.
6. (4) where the time allocated to each picture is manually set by the user.
7. Using a telephone to create the audio track.
8. Using text to speech as a source for the sound track.
9. (8) where every picture has its own text and the duration of the time allocated to each picture is a function of the length of the speech resulting from the text.
10. (8) where automatic picture to video is created for multiple streamlined advertisements.
11. (10) directed specifically at aggregators.
12. (1) or in (10) that facilitates the insertion of external audio clips and music into the picture to video process.
13. Use of focal points to improve the quality of the video.
14. A picture to video method in conjunction with a video DRM to protect the pictures from illegal distribution.

Figure 2:
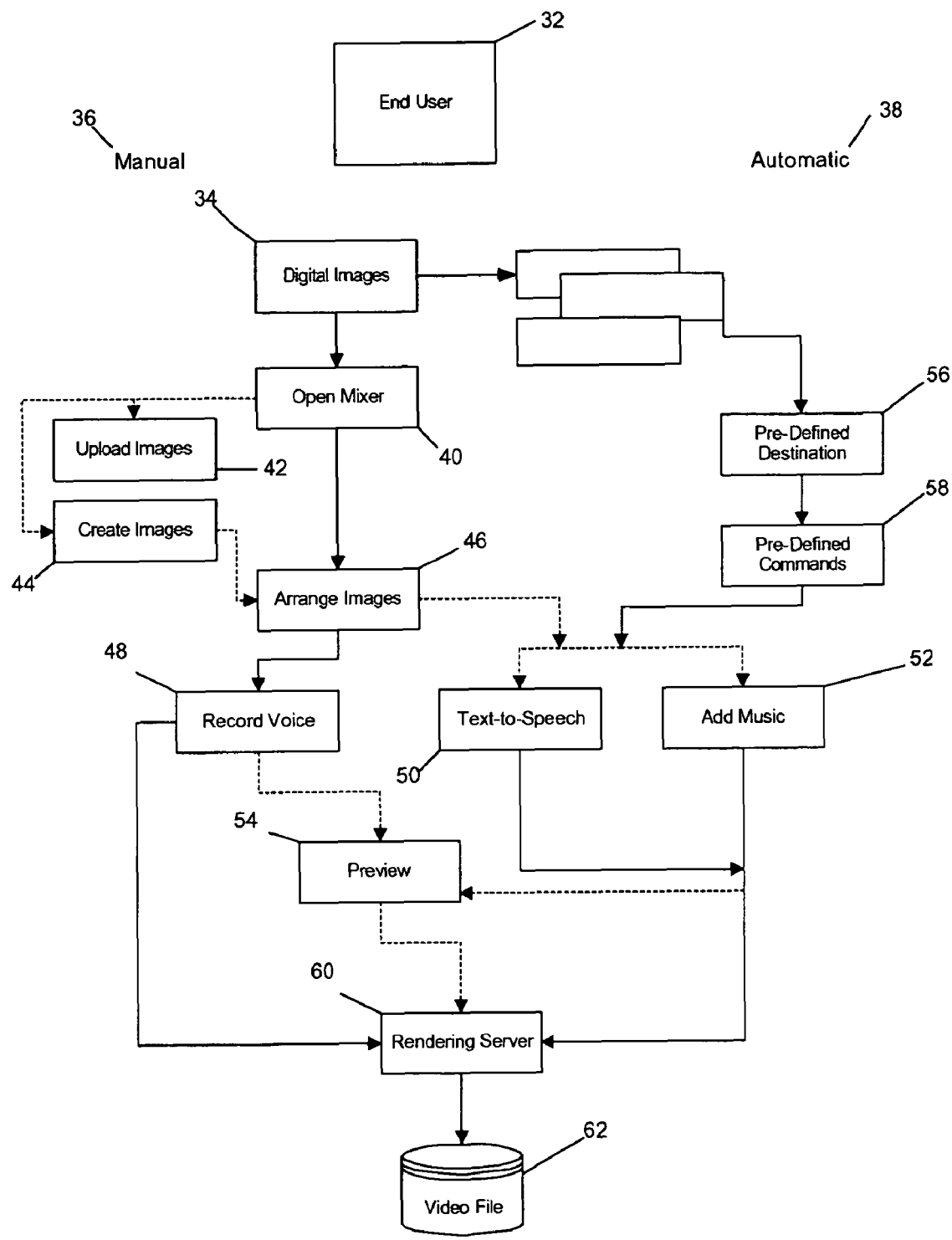
FIG. 2 depicts a more detailed system for creating a video clip in accordance with a preferred embodiment of the present invention.

Referring now to FIG. 2, a more detailed system 30 of the present invention includes a user device 32, which may be a wired or wireless device, is adapted to send pictures 34 via a manual process 36 or an automated process 38. If a manual process 36 is used, the pictures 40 are received by a mixer 40, the pictures are uploaded 42 to a web server, and can be created 44 and arranged 46 or ordered, panned, or zoomed, via a GUI accessible by the user device 32. A voice can be recorded via an IVR recording 48 or a TTS application 50, and music can be added 52 via a music interface. The audio and video can then be previewed 54. If the automated process 38 is used, a pre-defined destination 56 and pre-defined commands 58 would perform the uploading, creating, editing, etc. that was previously described in the manual process. Audio and music can also be added via the TTS application 50 and the music interface 52, respectively. In either process 36, 38, a rendering server 60 provides a rendering process that is further described in FIG. 5 which results in a video clip that can be stored 62.

Referring now to FIG. 3, a synchronization process 70 of the present invention is depicted. The process includes retrieving a URL for a first player 72, setting the first player to the retrieved URL (first URL) 74, retrieving a URL for a second player 76, setting the second player to the retrieved URL (second URL) 78, starting a timer process 80 (that is more fully described in FIG. 4), and signaling the first player to begin playing 82. This process can be used to preview pictures in one media player and audio in another player or both media and audio in one player with the pictures and the audio synchronized.

Referring now to FIG. 4, a timer process 90 of the present invention is depicted. The process includes determining 92 if a first player is playing streamed data. If it is not, the process proceeds to step 94 where a period of time (typically milliseconds) is elapsed before the determining 92 occurs again. If the player is playing the streamed data, signaling 96 a second player to begin playing.

Referring now to FIG. 5, a timer process 100 of the present invention is depicted. The process includes retrieving a dataset (SIS Commands) for the unique picture to video (or multi-media production) identifier 102, converting the dataset to an XTL file 104, invoking a rendering engine and providing the XTL file, an output path, a file name, a file type, and an encoding profile 106, and storing the resulting output file 108.

Figure 6:
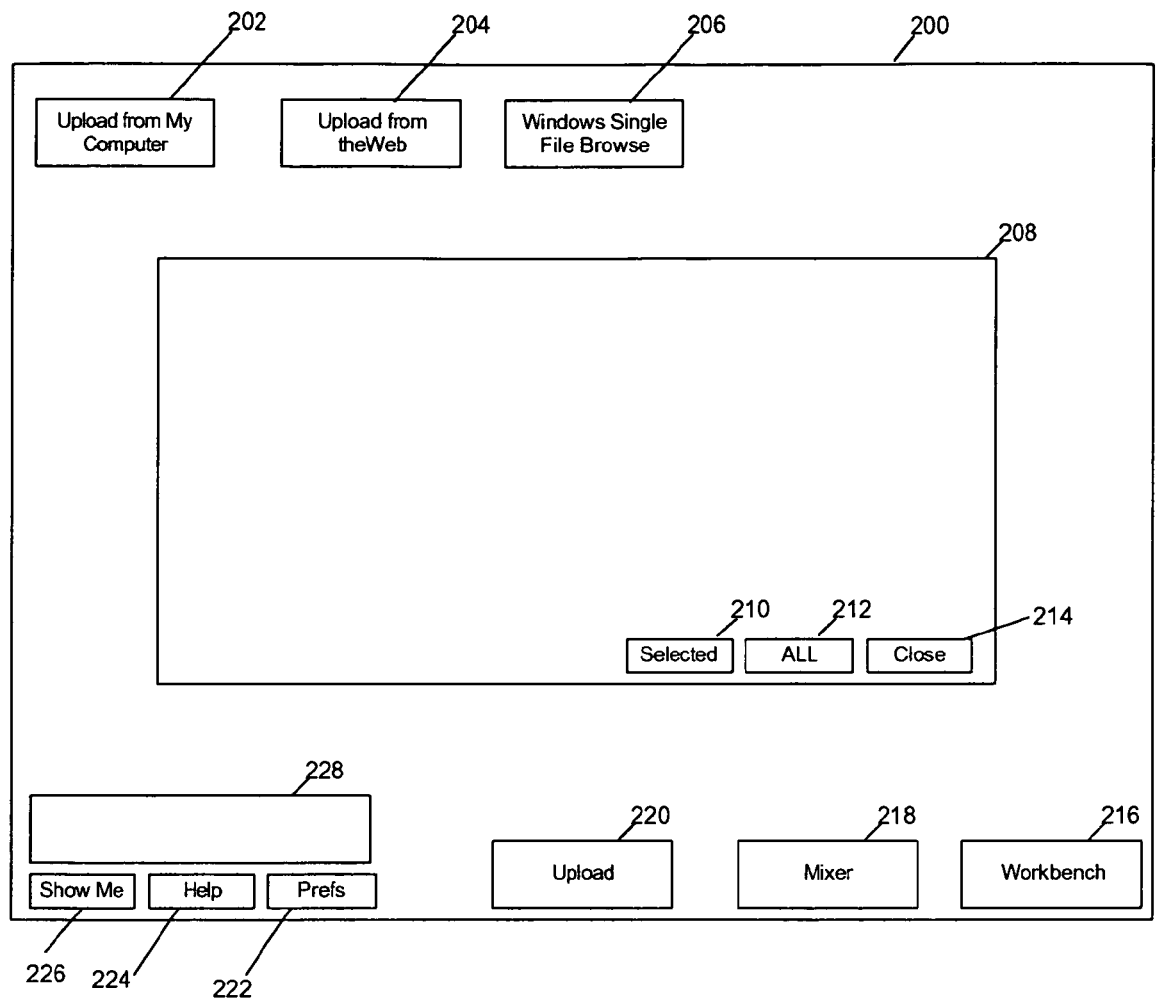
FIG. 6 depicts a user interface for management of uploading images into the system in accordance with a preferred embodiment of the present invention.

Referring now to FIG. 6 a user interface for management of uploading images 200 into the system is depicted. The reference numerals in the figure include: 202 which is a UI Button that opens another interface (240) to select images from the user's computer to upload, 204 which is a UI Button that opens another interface to select images from a web site for upload into the system, 206 which is a UI Button that opens another simpler interface (260) to allow the user to select images to upload, 208 which is the image "wallet" where all the uploaded images are displayed, 210 which is a UI Button that moves selected clips from the wallet to the storyboard (288), 212 which is a UI Button that moves all clips from the wallet to the storyboard (288), 214 which is a UI Button that closes the "wallet" window, 216 which is a UI Button that loads the "Workbench" UI (420), 218 which is a UI Button that loads the "Mixer" UI (280), 220 which is a UI Button that loads the "Upload Management" UI (200), 222 which is a UI Button that allows the user to manage their application preferences, 224 which is a UI Button that displays "Help Topics" in a text view, 226 which is a UI Button that displays a video tutorial about the process, and 228 which is an area for display of textual messages to the user.

Figure 7:
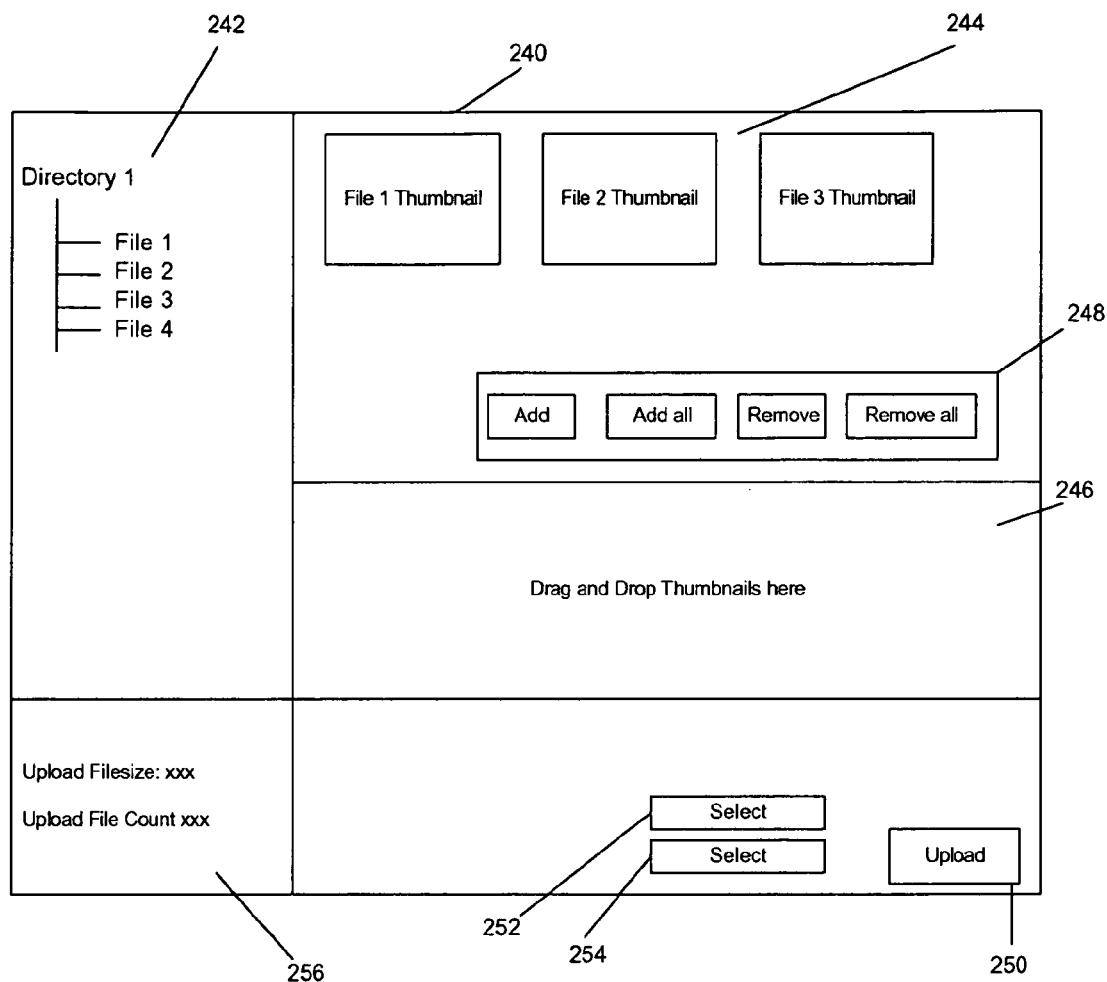
FIG. 7 depicts a user interface for uploading images from a user's computer into the system in accordance with a preferred embodiment of the present invention.

Referring now to FIG. 7 a user interface for uploading images from a user's computer 240 into the system is depicted. The reference numerals in the figure include: 242 which is a file directory listing of the end user's computer, 244 which is a thumbnail display area of images on the end user's computer, 246 which is a thumbnail display area of images selected to be uploaded into the system, 248 which is a set of UI Buttons to manage selected images being displayed in 246, 250 which is a UI Button to start the upload process, 252 which is a UI Button to select how the images are displayed in 244, 254 which is a UI Button to select how the images are displayed in 246, and 256 which is a set of display graphics detailing the number and size of currently uploaded file.

Figure 8:
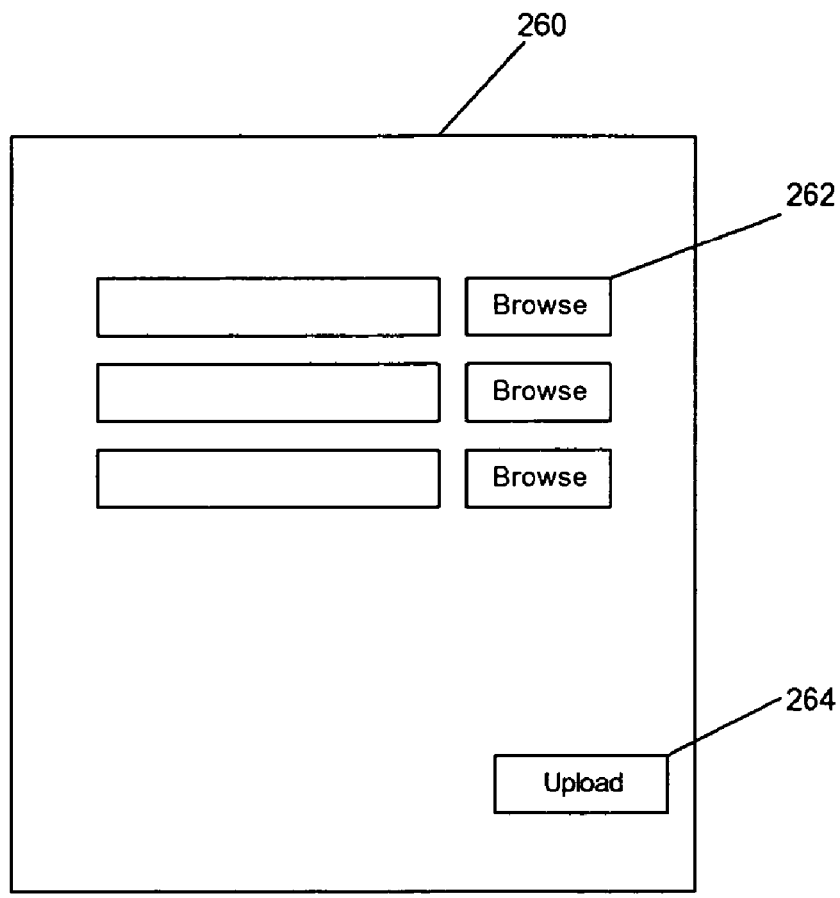
FIG. 8 depicts a simpler user interface to upload images into the system in accordance with a preferred embodiment of the present invention.

Referring now to FIG. 8 a simpler user interface to upload images 260 into the system is depicted. The reference numerals in the figure include: 262 which is a UI Button to open an image selection dialogue, and 264 which is a UI Button to start the upload process.

Figure 9:
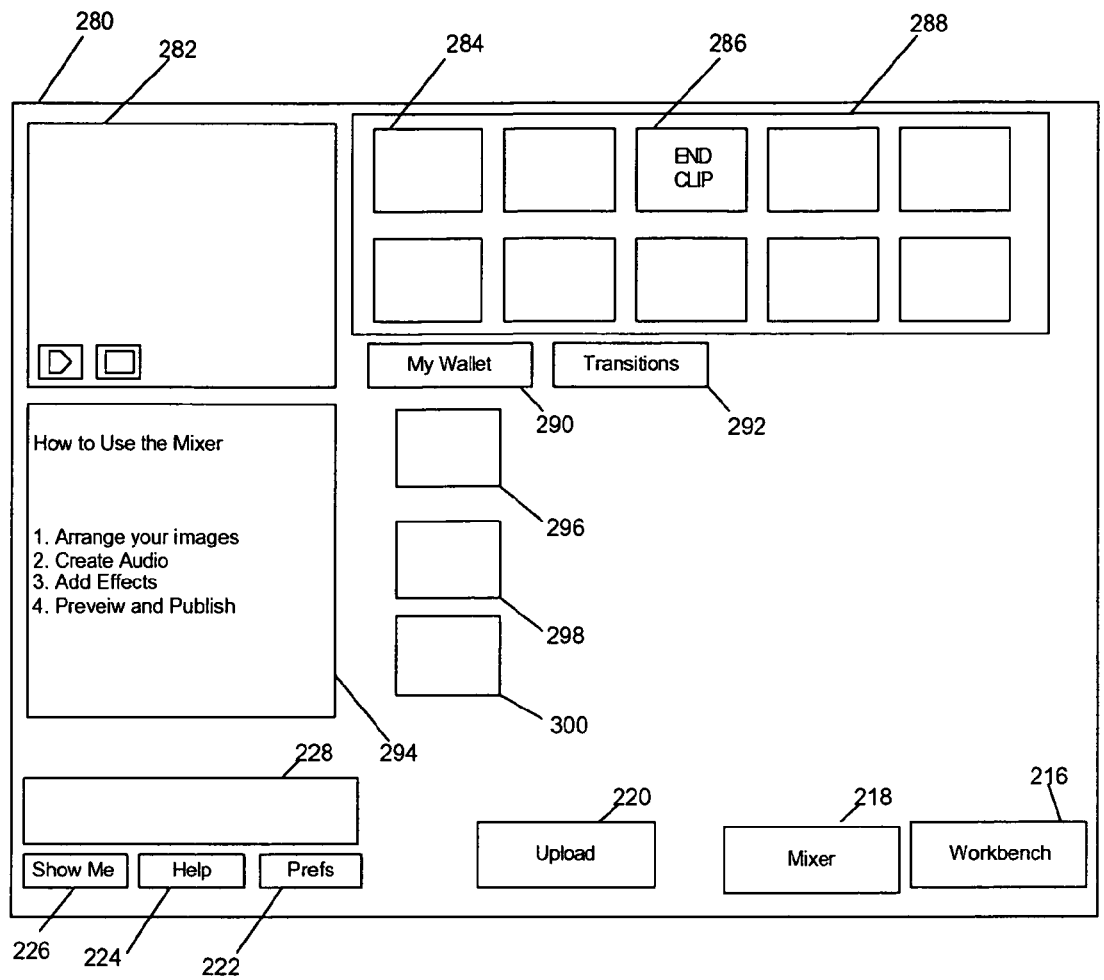
FIG. 9 depicts a "mixer" user interface where an end user can assemble a video production in accordance with a preferred embodiment of the present invention.

Referring now to FIG. 9 a "mixer" user interface where an end user can assemble a video production 280 is depicted. The reference numerals in the figure include: 282 which is a Media Player to play the video production, 284 which is a thumbnail image that represents the original image's sequence in the video, 286 which is the "End Clip" marker (which designates the end of the video production), 288 which is the Storyboard where the end user interacts with the thumbnail images, 290 which is a UI button that opens the image "wallet" (208), 292 which is a UI button that open the Video Transition Chooser Interface (310), 294 which is a text based help menu system, 296 which is a UI button that opens the voice recording interface (400), 298 which is a UI button that opens the female voice text-to-speech input interface, and 300 which is a UI button that opens the male voice text-to-speech input interface (390).

Figure 10:
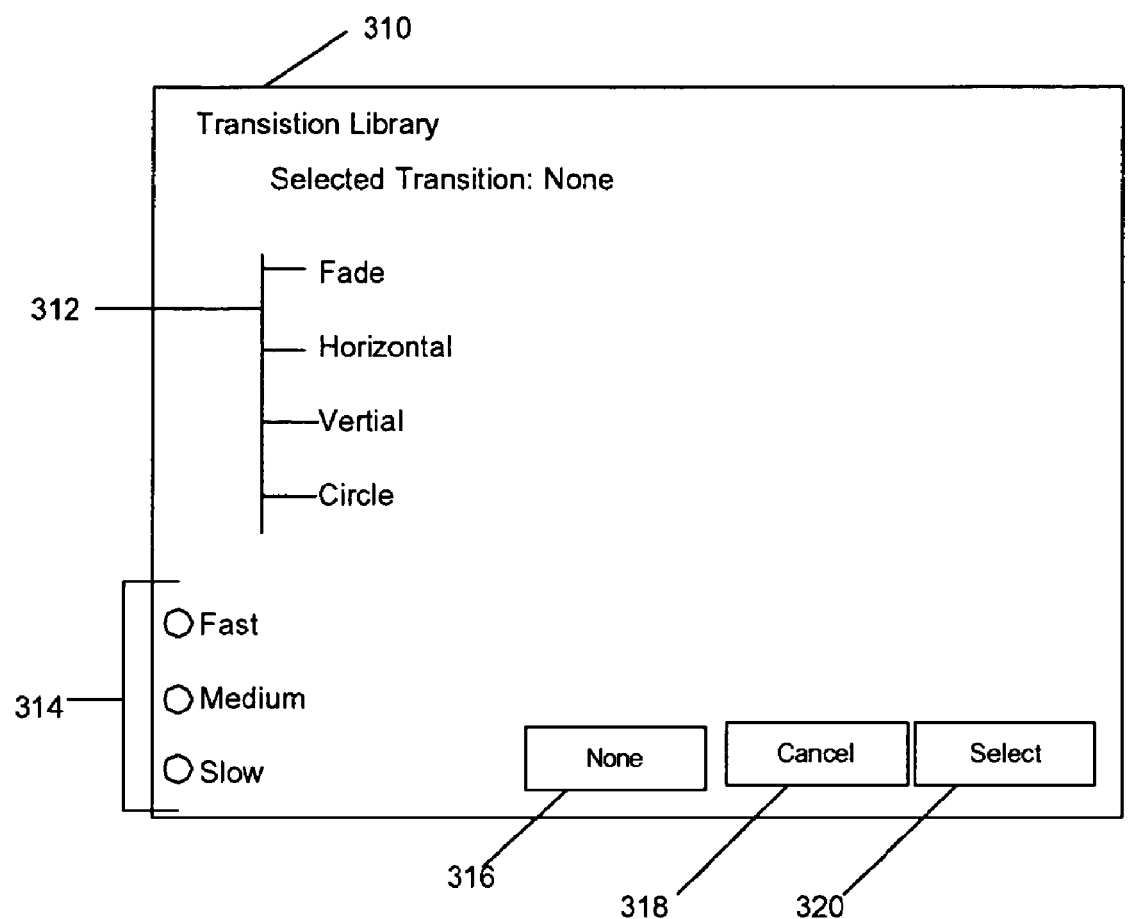
FIG. 10 depicts a video transition chooser interface in accordance with a preferred embodiment of the present invention.

Referring now to FIG. 10 a video transition chooser interface 310 is depicted. The reference numerals in the figure include: 312 which is a listing of available video transitions to choose from, 314 which is a listing of available transition speeds to choose from, 316 which is a UI button to disable use of video transitions, 318 which is a UI button to close the current window without saving any choices made by the end user, and 320 which is a UI button to accept the currently selected transition type and speed.

Figure 11:
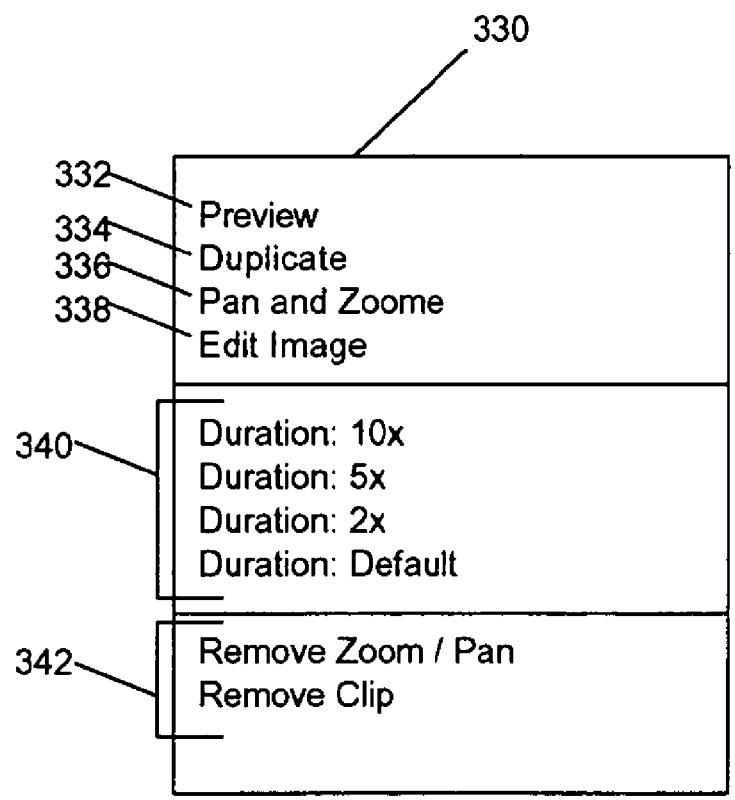
FIG. 11 depicts a click or context menu that is displayed when a user clicks on a thumbnail image in accordance with a preferred embodiment of the present invention.

Referring now to FIG. 11 a click or context menu that is displayed when a user clicks on a thumbnail image 330 is depicted. The reference numerals in the figure include: 332 which is a UI button that displays a preview of the image, 334 which is a UI button the creates a duplicate of the current image, 336 which is a UI button that opens the "Pan and Zoom" interface window (350), 338 which is a UI button that opens the "Crop Image" interface window (370), 340 which is a set of UI buttons that set the duration of the current image, and 342 which is a set of UI buttons to remove special effects that have been added to the image.

Figure 12:
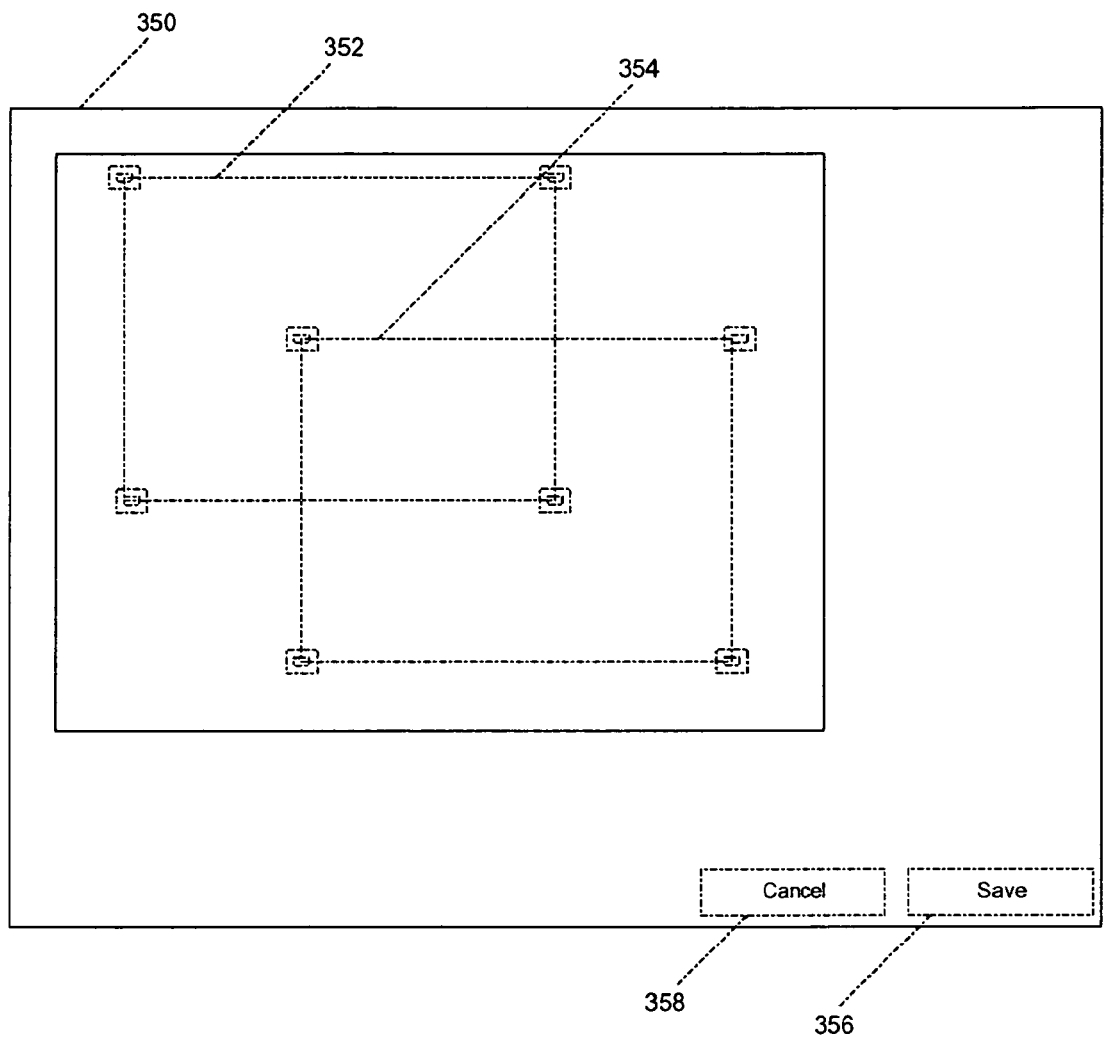
FIG. 12 depicts a "Pan and Zoom" interface window in accordance with a preferred embodiment of the present invention.

Referring now to FIG. 12 a "Pan and Zoom" interface window 350 is depicted. The end user makes a selection for the beginning viewport (352) and the end viewport (354). These selections will create simulated motion in the end video by morphing the image from the beginning viewport to the end viewport. The reference numerals in the figure include: 356 which is the UI button that saves the changes made to the "Pan and Zoom" options, and 358 which is the UI button to cancel any changes made and close the current window.

Figure 13:
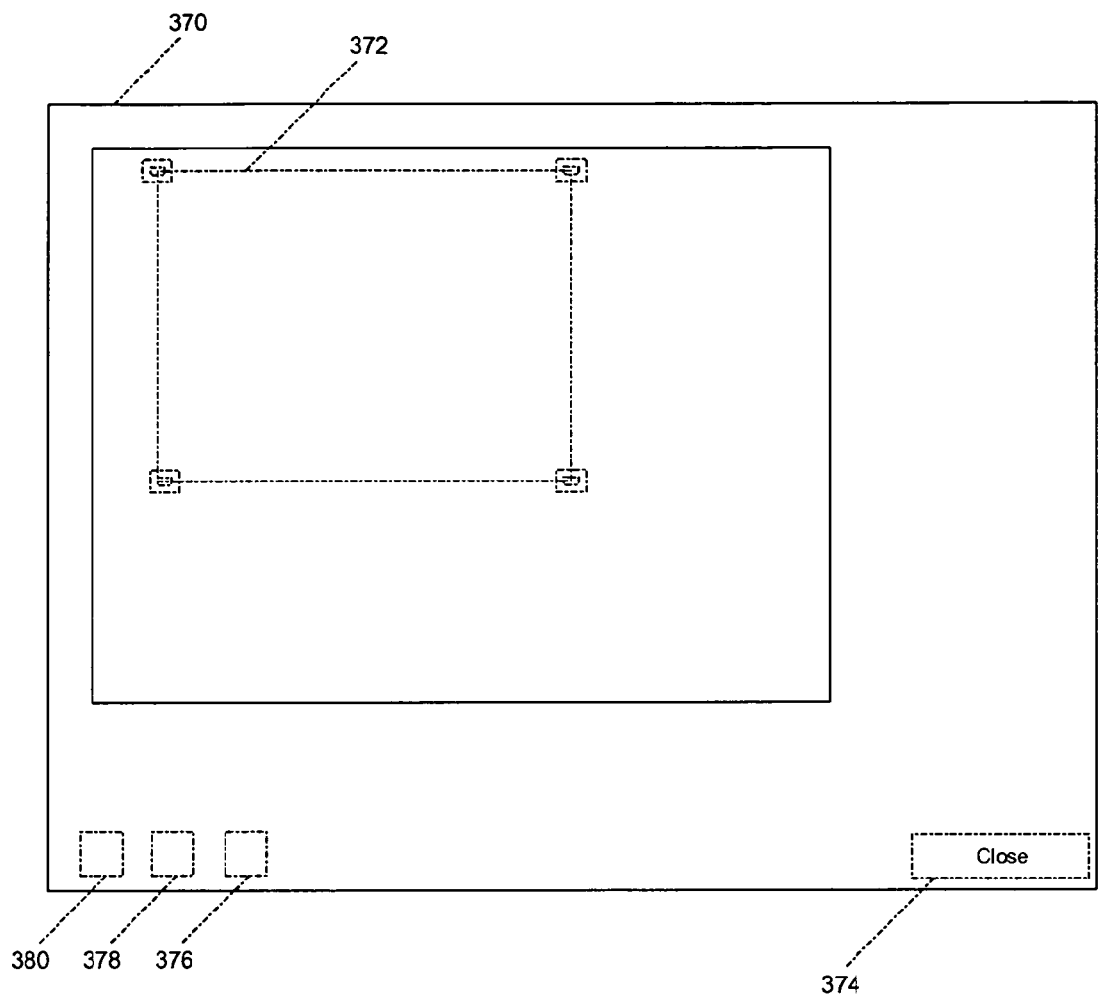
FIG. 13 depicts a "Crop Image" interface window in accordance with a preferred embodiment of the present invention.

Referring now to FIG. 13 a "Crop Image" interface window 370 is depicted, which allows for a user to select a portion of the original image using the selection box (372) and save the new image. The reference numerals in the figure include: 374 which is a UI button to close the current interface window, 376 which is a UI button to save the current "cropped" image as a new image, 378 which is a UI button to zoom into the current viewport, and 380 which is a UI button to preview the cropped image.

Figure 14:
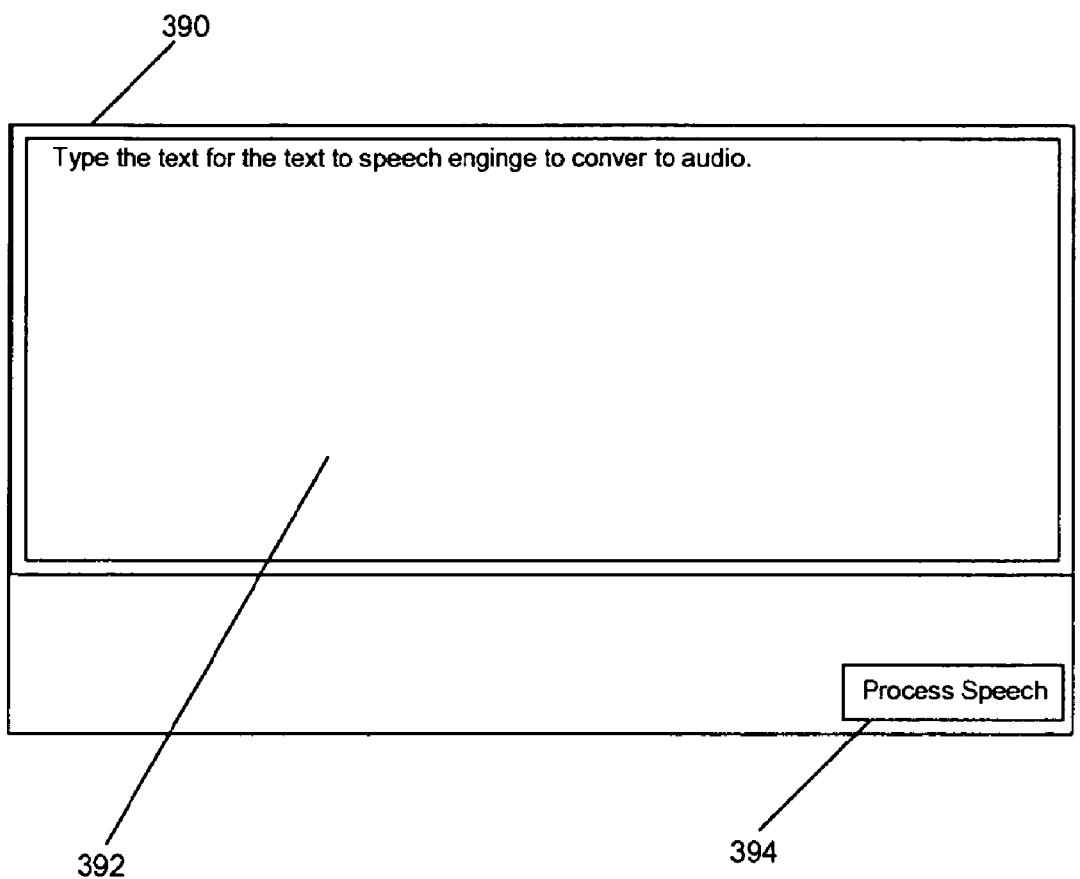
FIG. 14 depicts a male voice text-to-speech input interface in accordance with a preferred embodiment of the present invention.

Referring now to FIG. 14 a male voice text-to-speech input interface 390 is depicted. The reference numerals in the figure include: 390 which is the male voice text-to-speech input interface. This interface allows the end user to type text into the window (392) and have that text processed into audio by pressing the process speech UI button (394).

Figure 15:
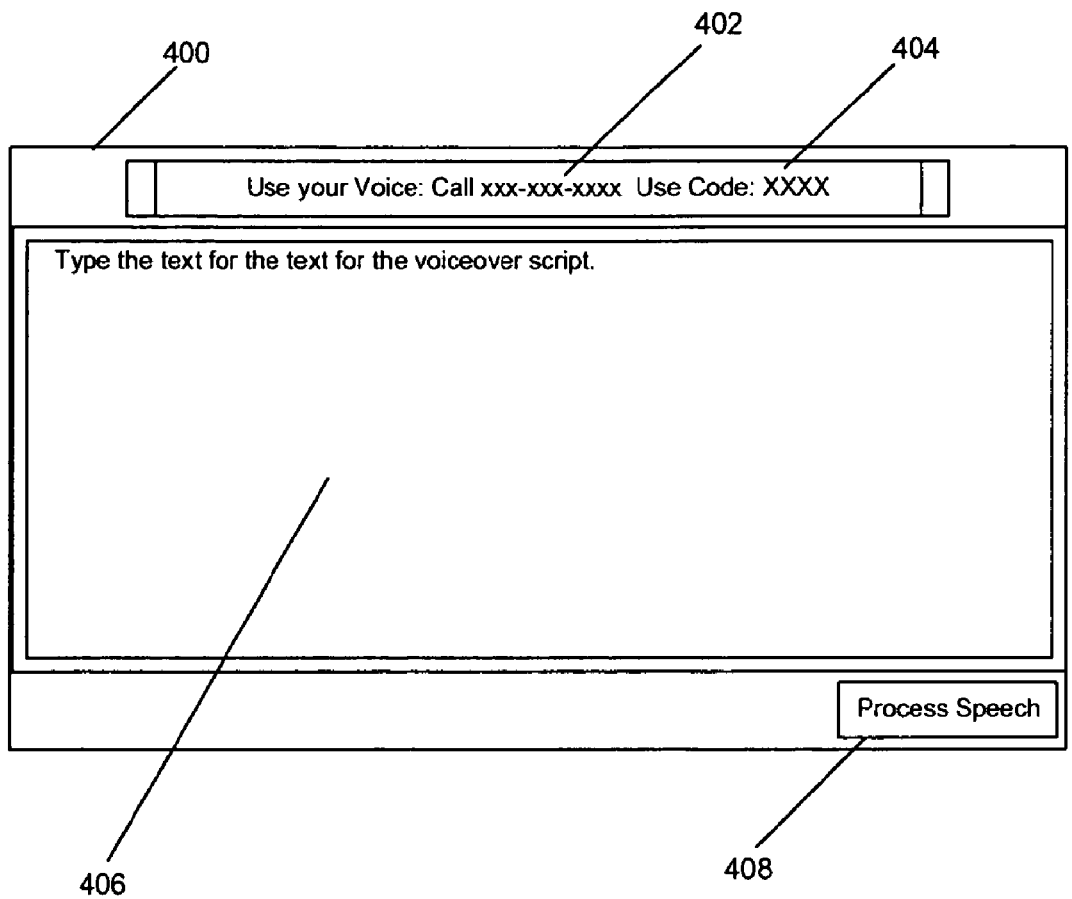
FIG. 15 depicts a voice recording interface window in accordance with a preferred embodiment of the present invention.

Referring now to FIG. 15 a voice recording interface window 400 is depicted, which allows the user to type a script into the window (406) to be recited during a recording. The reference numerals in the figure include: 402 which is a display area for the telephone number to call to make the voice recording, 404 which is a display area for the code number that is inputted into the voice recording system, and 408 which is a UI button to preview the recorded audio.

Figure 16:
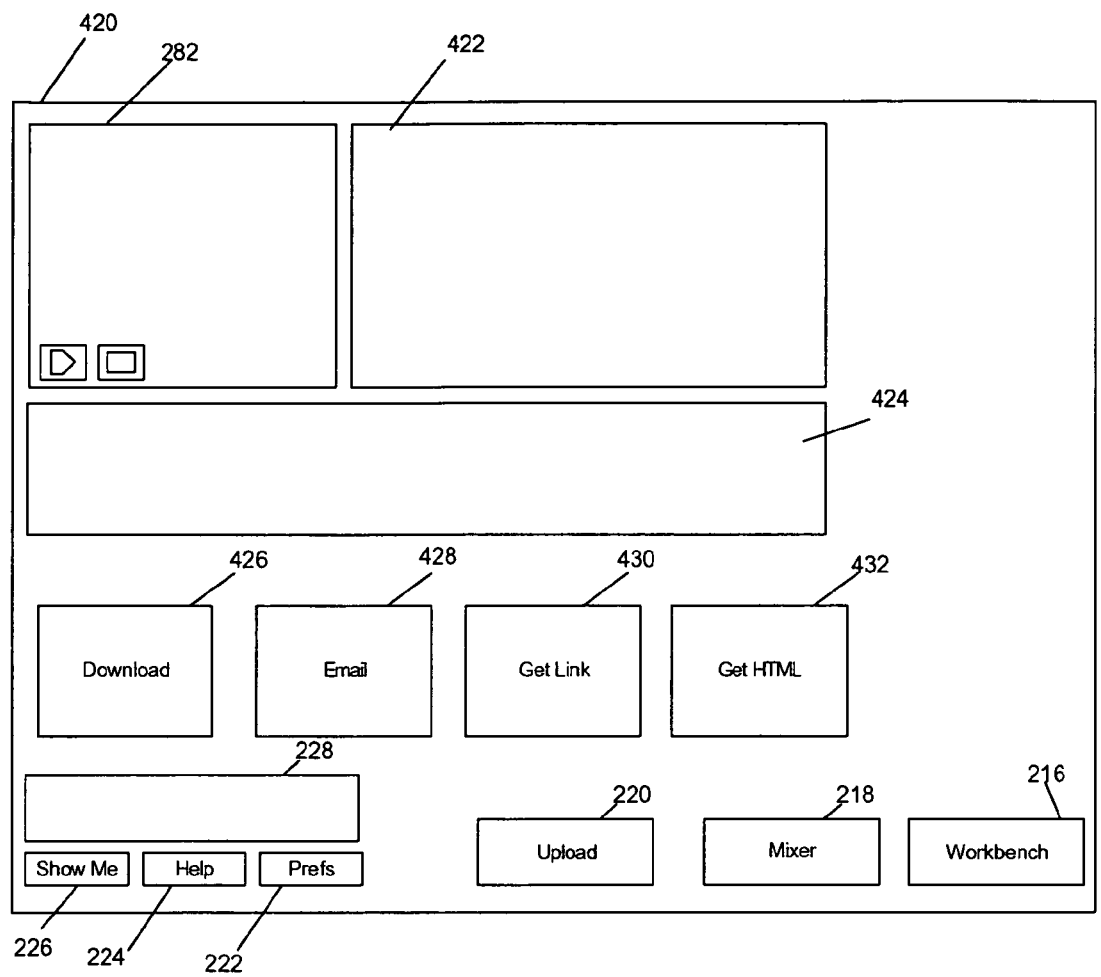
FIG. 16 depicts a "Workbench" user interface window in accordance with a preferred embodiment of the present invention.
Figure 17:
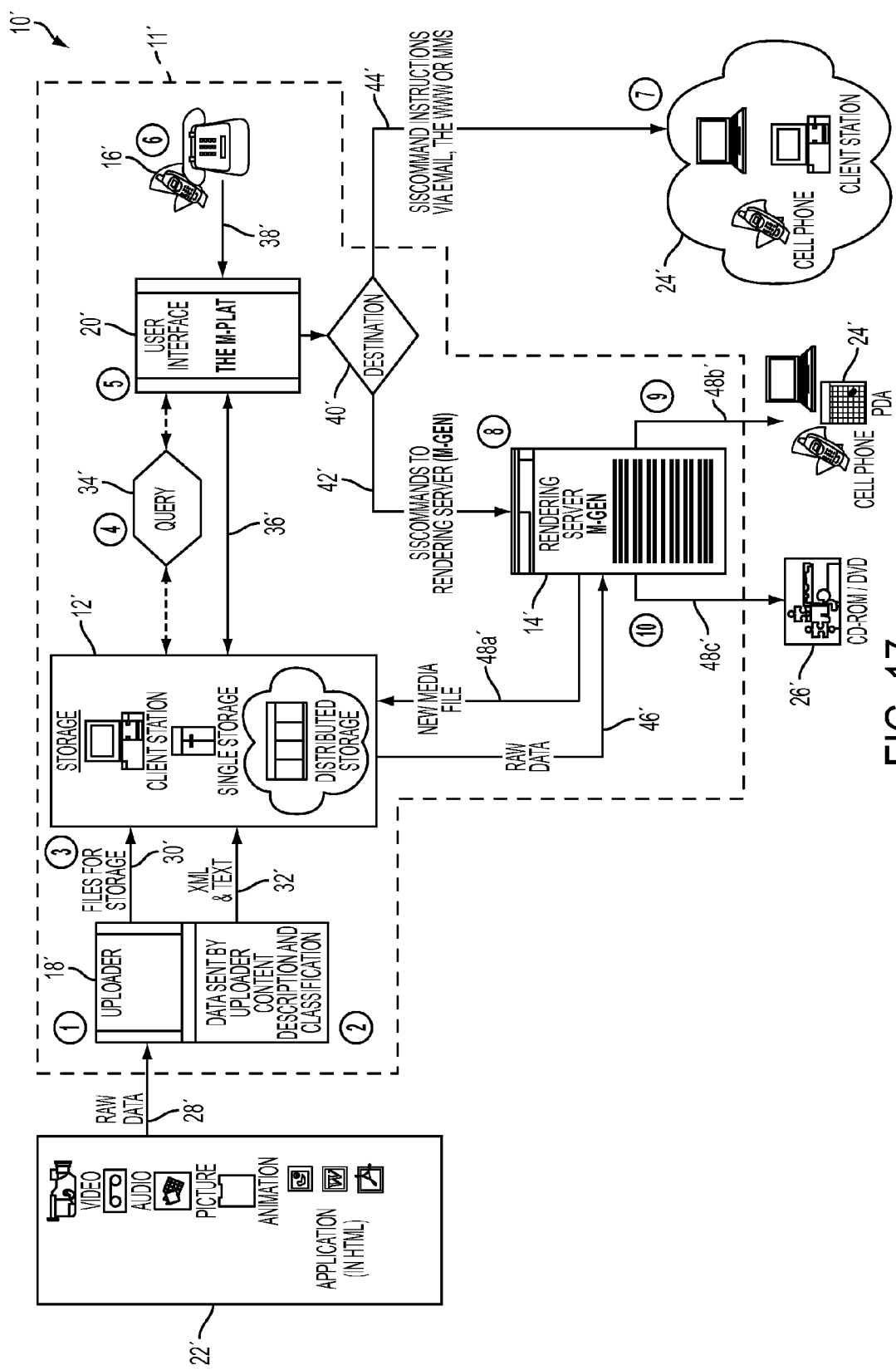
FIG. 17 illustrates an architecture in accordance with an exemplary embodiment of the present invention.
Figure 18:
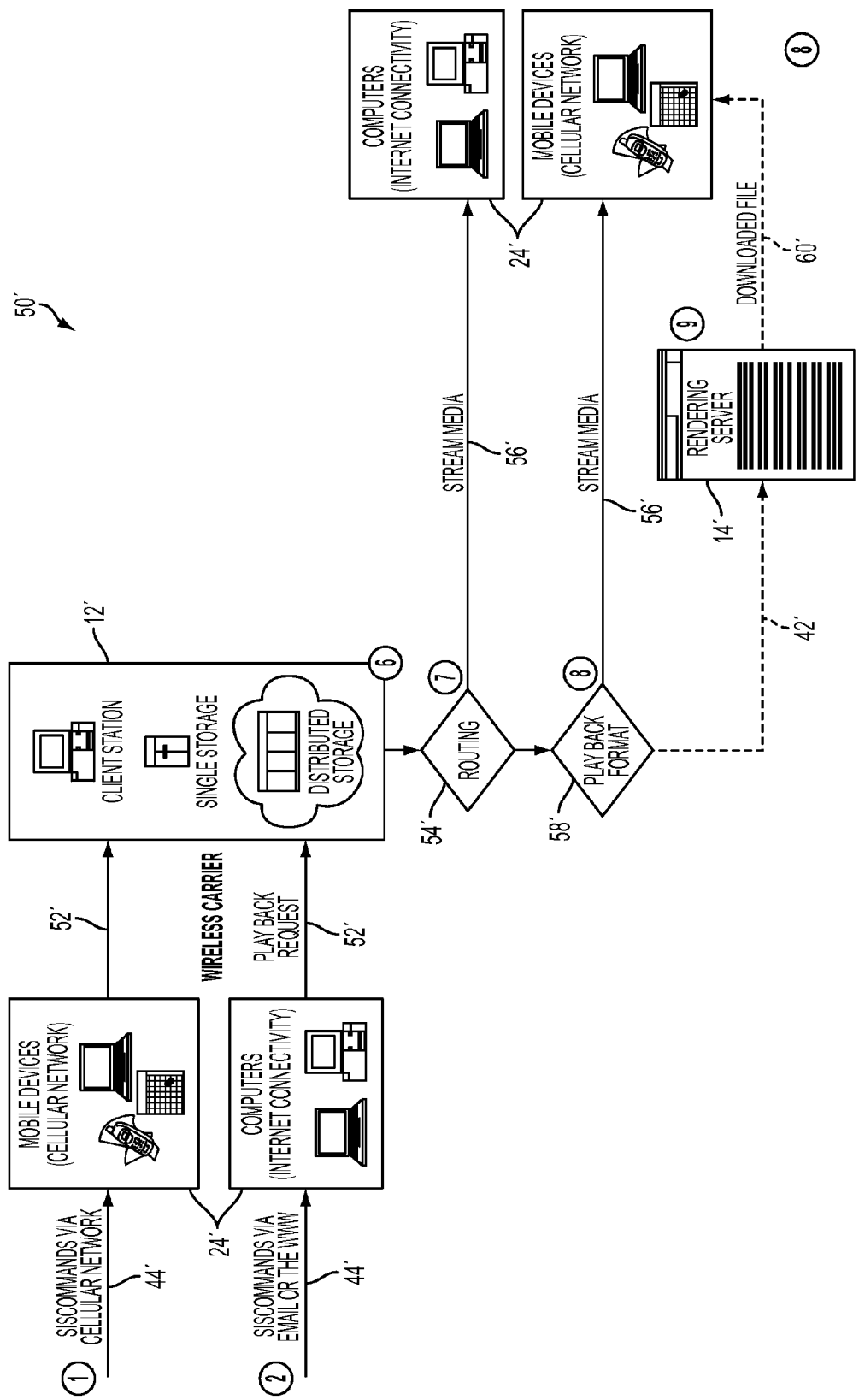
FIG. 18 illustrates a receiving and play back in accordance with an exemplary embodiment of the present invention.
Figure 19:
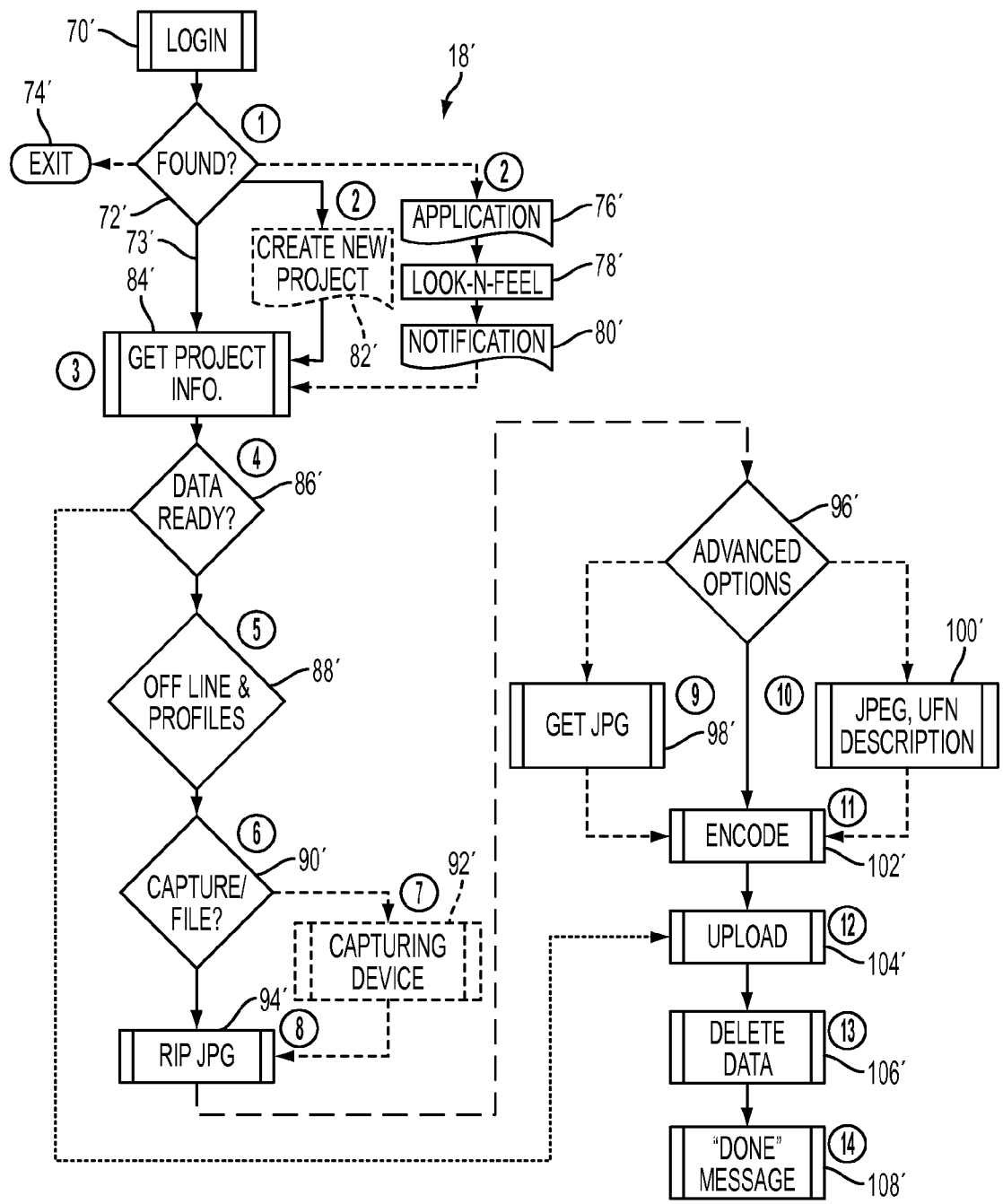
FIG. 19 illustrates an uploader in accordance with an exemplary embodiment of the present invention.
Figure 20A:
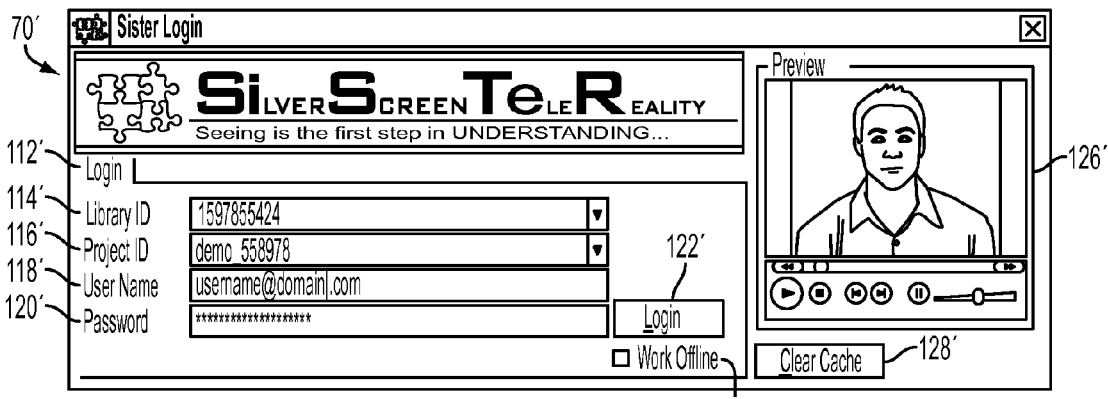
FIG. 20a illustrates a screen shot of an uploader login screen in accordance with an exemplary embodiment of the present invention.
Figure 20B:
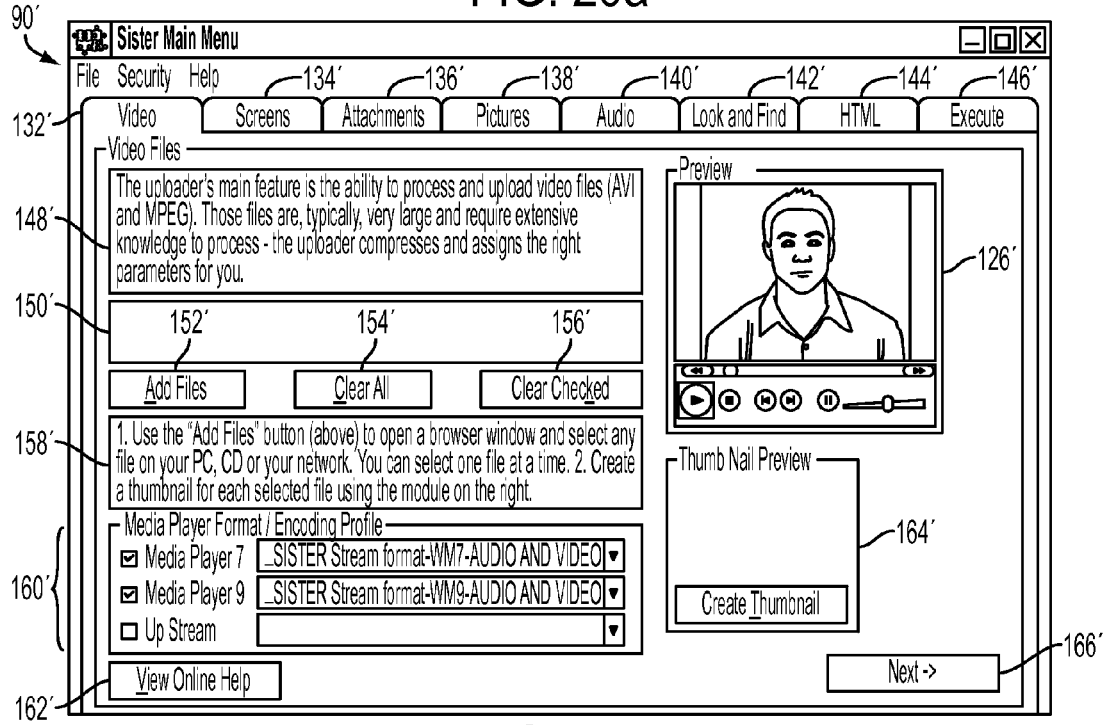
FIG. 20b illustrates a screen shot of a select media in accordance with an exemplary embodiment of the present invention.
Figures 20C, 20D:
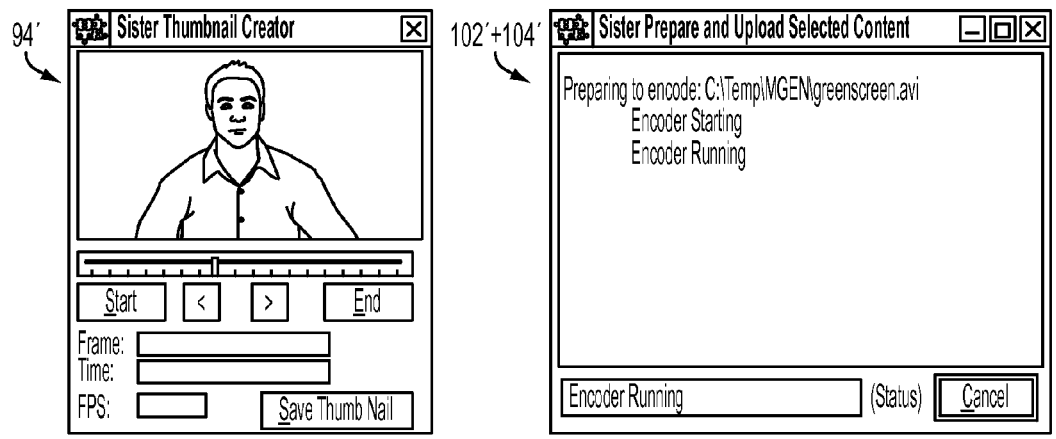
FIG. 20c illustrates a screen shot of a thumbnail creator in accordance with an exemplary embodiment of the present invention.
FIG. 20d illustrates a screen shot of a encode and upload content in accordance with an exemplary embodiment of the present invention.
Figure 21:
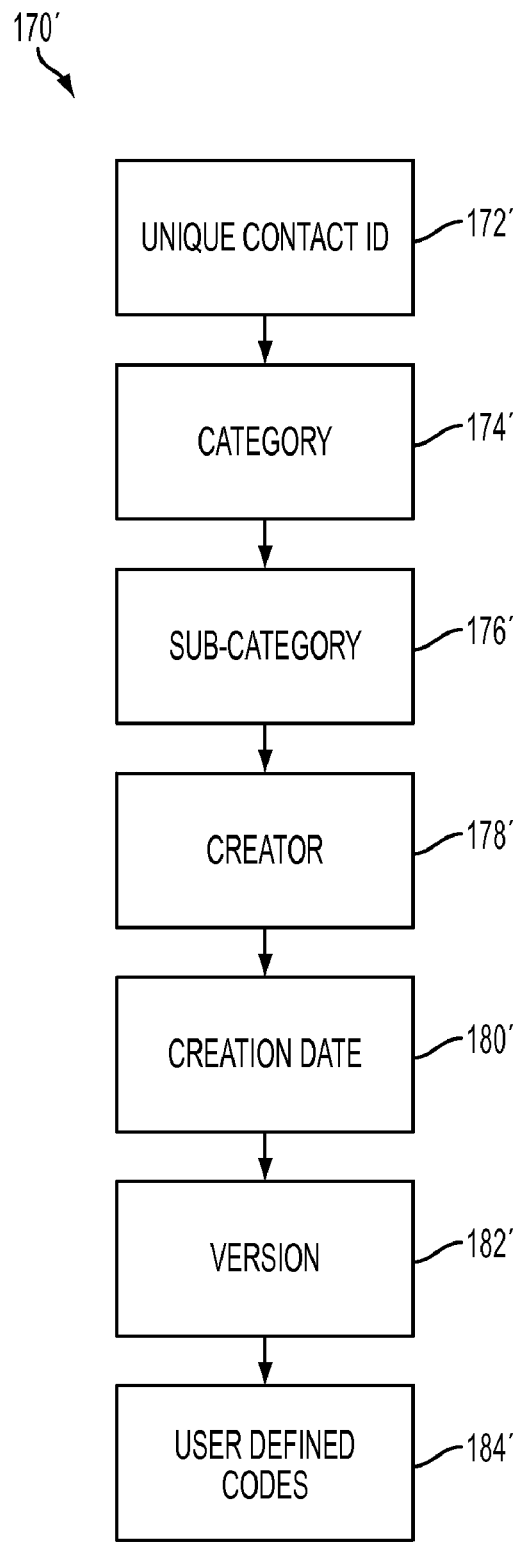
FIG. 21 illustrates a unified file name in accordance with an exemplary embodiment of the present invention.
Figure 22:
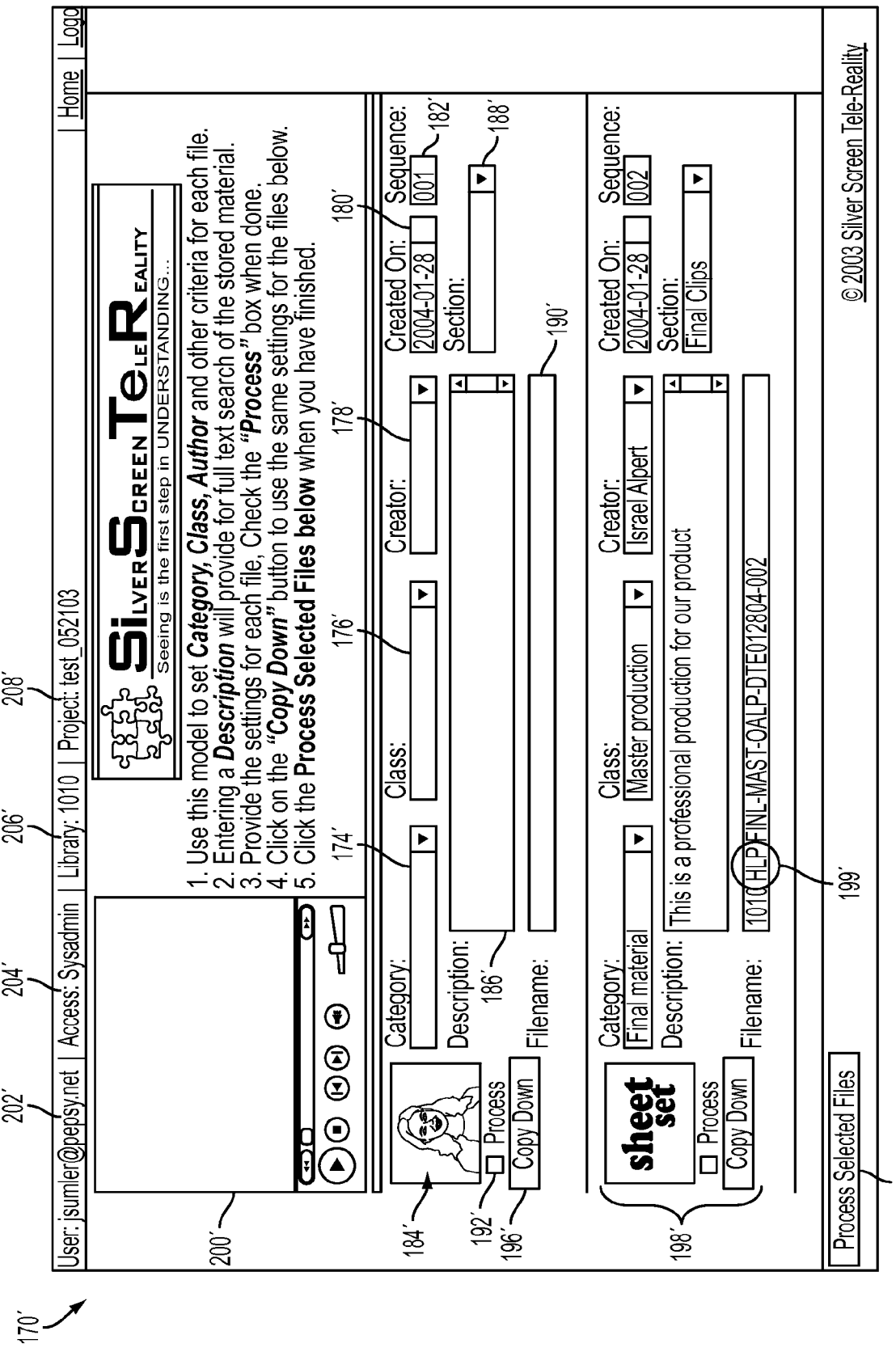
FIG. 22 illustrates a screen shot of the unified file naming selection of a UFN field in accordance with an exemplary embodiment of the present invention.
Figure 23A:
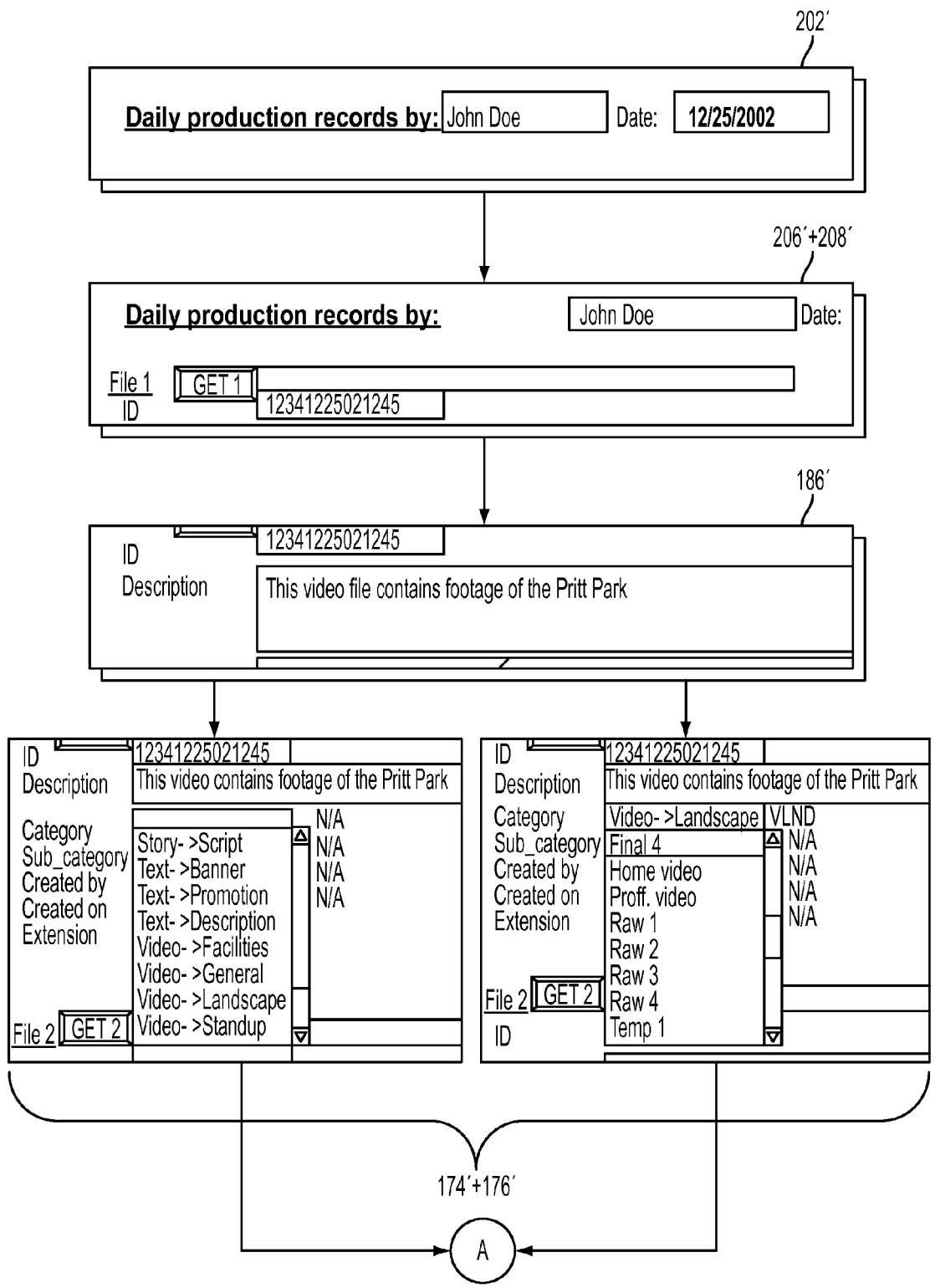
FIGS. 23a and 23b illustrate a storage and unified filing system in accordance with an exemplary embodiment of the present invention.
Figure 23B:
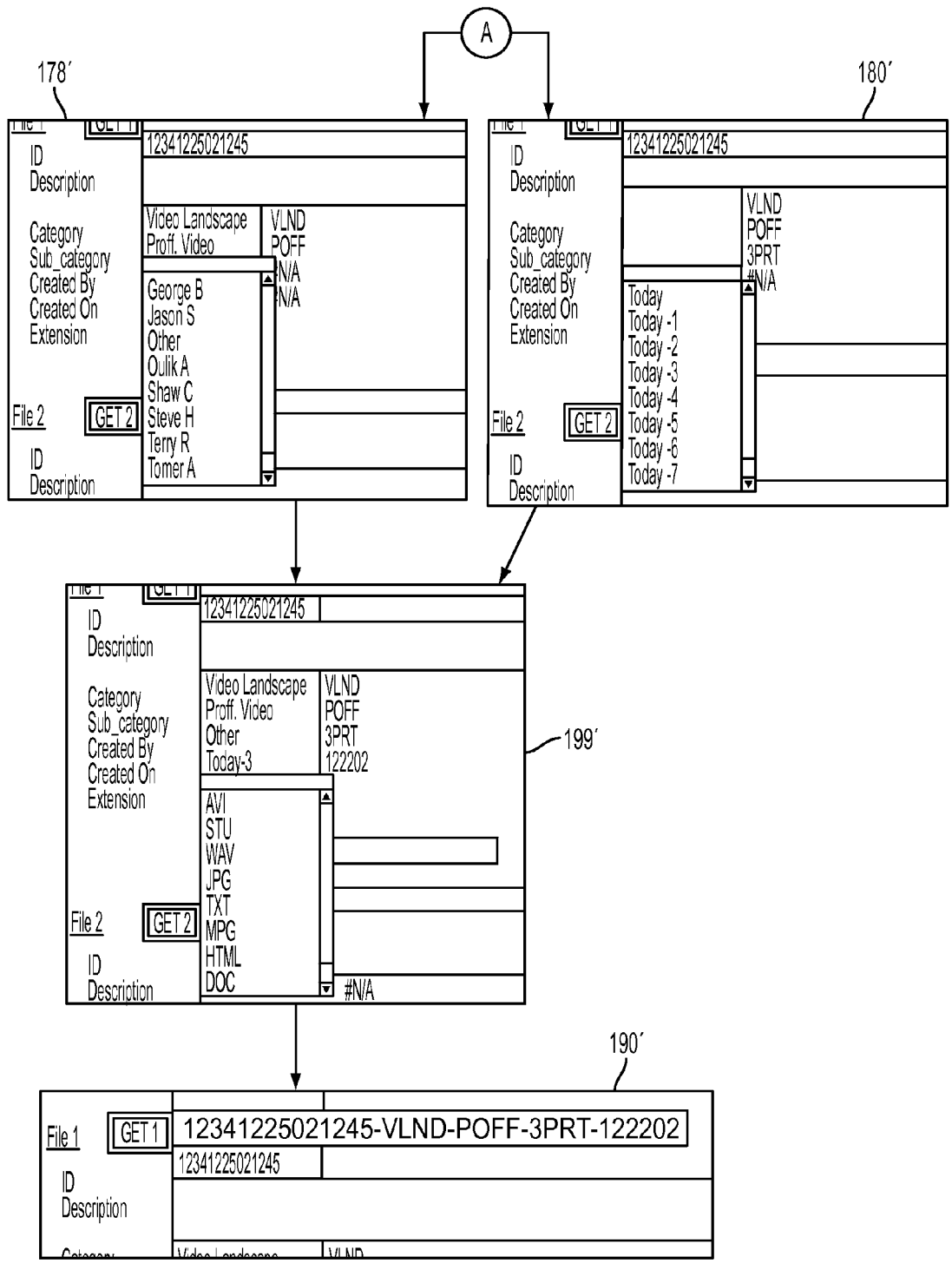

Referring now to FIG. 16 a "Workbench" user interface window 420 is depicted. The reference numerals in the figure include: 422 which is a display area for the title and description of the video, 424 which is a display area for textual information and help, 426 which is a UI button that triggers a download of the final video to the end user, 428 which is a UI button that allows the end user to send the video link via e-mail, 430 which is a UI button that allows the end user to view the video link, and 432 which is the UI button that allows the end user to download HTML code to display the video from within a HTML page.

In one embodiment of the present invention, a method for creating a video clip comprises receiving still image files by a first module, creating a copy of a still image from the still image files with reduced dimensions (such as a thumb nail) by the first module, creating a new still image from a selected area of the still image (i.e. cropping), storing the new still image and the copy of the still image with a unified file name (UFN), ordering the stored images, creating an audio file by at least one of a second module and a third module, creating a timeline, by the first module, related to the ordered images and the created audio, and rendering the timeline into the video clip by a fourth module.

The method further comprises storing at least one of: metadata related to the still image and the copy of the still image, metadata related to the audio file, the timeline, and information comprising the creating of the audio file (for example, if a user uses TTS, then the information that is stored is the text used to generate the audio. If the user uses a phone number, then the information that is stored is the dialed number, the calling number, a record number or a code number of the IVR application), transitioning from one to another one of the ordered images, and further comprising storing a transition identifier and a transition length, and retrieving at least one of: the metadata related to the audio file, the metadata related to the still image and the copy of the still image, the timeline, and the information comprising the creating of the audio file, the by the first module, wherein the metadata is stored in a command (such as a SIS Command), wherein the metadata stores at least one of: a height, a width, a size, compression data, and a file format.

The method also comprises panning and zooming at least one of: a portion of or the copy of the still image, a portion of or the new created still image, a portion of or the stored new still image, and a portion of or the stored copy of the still image, wherein the panning and the zooming is a set of coordinates related to the image, wherein the copy of the still image is used for display purposes (i.e. a thumbnail), wherein the new created still image is displayed as an image with reduced dimension, wherein the set of coordinates is stored in the timeline. The method further comprises optionally previewing the timeline via a fifth module, wherein the timeline includes at least one of: a length of the audio file, a length of the video clip, the order of the images, a display time of each of the images, transition identifiers, transition lengths, panning and zooming coordinates, an identifier of the audio file created by the second module or the third module, and a volume envelope (which includes "volume points" that are the volume and the time that the volume occurs) associated with the created audio file.

In another embodiment of the present invention, a system for creating a video clip comprises a web server adapted to receive one or more images, the web server adapted to create a copy of the images, the web server adapted to create one or more new images from one or more selected areas of the images, and the web server adapted to provide a unified file name to each of the new images and a unified file name to each of the copies of the images, wherein the copy of the still images is created with reduced dimensions.

The system further comprises memory adapted to store at least one of: the new image, the copy of the image, the new image provided with the unified file name, the copy of the image provided with the unified file name, wherein the memory is coupled to the web server, a device coupled to the web server, wherein the device is adapted to order at least one of: the received images, the copy of the images, the new images, the stored images, and the ordered images, a text-to-speech module, and an integrated voice response module, wherein at least one of the modules is adapted to create an audio file, wherein at least one of the modules is coupled to at least one of the web server and the memory, wherein the web server is adapted to create a timeline related to the ordered images and the created audio file, wherein the timeline and the audio file are stored in the memory, and a rendering server adapted to render the timeline into the video clip.

In a further embodiment of the present invention, a computer readable medium comprises instructions for: creating a copy of an image with reduced dimensions, creating a new image from a selected area of the copied image, storing the new image and the copy of the image with a unified file name, and creating a timeline related to the image, the new image, and to audio related to the image and to the new image, wherein the timeline is used to create a video clip.

Assembling and Distributing Multi-Media Output

Referring now to FIG. 33, reference numeral 10' describes the overall flow of multimedia from the user to a final multi-media output such as a multimedia presentation. Reference numeral 11' is the internal processing of the multimedia data and user interaction. Reference numeral 12' depicts a storage system on which the multimedia is stored. Reference numeral 14' is the rendering server. This is hardware and/or software that takes many media files as input and outputs a single file. Reference numeral 16' describes the voiceover system which is hardware and/or software that allows a telephone to record audio that is saved into the storage system 12'. Reference numeral 18' is the uploader. It is a software program that is run on the user's machine. This allows the user to select the media that is desired to be placed into the system. It then encodes it into the proper format and allows the user to categorize each media file.

Reference numeral 20' is the user's interface into the system, which is preferably web-based using the web server and a scripting language. Reference numeral 22' are raw multimedia files that are chosen by the user to be saved into the system. Reference numeral 24' is the end user's hardware that receives the multimedia presentation. Reference numeral 26' is the end user's storage system. This could be CD Rom, DVD and MP3 player hardware, for example. Reference numeral 28' is the flow of raw multimedia files into the uploader system. Reference numeral 30' are the encoded multimedia files that the uploader sends to the storage system 12'. Reference numeral 32' is data sent by the uploader 18' into the storage system 12'. Reference numeral 34' is an end user query or search that is used to populate the user interface. Reference numeral 36' is the flow of data from the storage system 12' to the user interface 20'. Reference numeral 38' are the audio files that the voiceover system 16' sends into the user interface 20' that is then sent into the storage system 12' via message 36'. Reference numeral 40' is the decision of a destination based on how the information is sent to the user. Message 42' is a set of commands sent to the rendering server 14'. Reference numeral 44' is the output from 40' that is sent to an end user via email, the web, MMS, SMS or other text messaging options. Reference numeral 46' are the multimedia files taken from the storage system 12' into the rendering server 14'. The rendering server 14' takes many of these data files 46' and creates a single file which it sends to the storage system 12', via message 48a'. It also has the ability to send it via messages 48b' and 48c', to the end user 24', and/or directly to a CD Rom 26'.

FIG. 33 is now further described. The uploader (1) converts and encodes any content (video clips, audio files, animation, graphic, HTML and text, etc.). The content can be retrieved from disk or direct capture from camcorder, web cam, digital camera, camera equipped cell phone, microphone and other similar devices. The upholder also creates a Unified File Name (UFN). The UFN components and a text/XML file (2) with the same file name provides for index and keyword searching. The content is then sent to the right project stored on a stand alone PC, a local file server, or via the Internet to a data center via an FTP site in XML format (3). The UFN prevents the need for a proprietary database and allows users to collaborate across different organizations. Using the user interface 20' or M-Plat, the users organize content, edit the media, create movies, add voice over via any telephone and creates digital presentations (5). The content is organized in projects or retrieved in real time using indexes built into the UFN or a keyword search (4).

Using an IVR (telephony) system of the present invention, (6) the user can add a voice over using any ordinary telephone. The M-Plat also controls publishing, distribution, reporting and archiving. If distributed via e-mail or web site, the instruction sets (SISCommands) are stored on-line and e-mail notifications are sent (7). If a new file is required, the SIS-Command is sent to the M-Gen (8) and a new file is rendered. The new file is stored in the project and is sent to mobile users (9) via a cellular network or destination device via an FTP site (10).

FIG. 33 further depicts a system for assembling and distributing multi-media output, comprising: a rendering server; a web server; and storage, wherein the servers and the storage are operably coupled; the storage adapted to receive digital media and properties of the media, store the media and the properties, and transmit the media and the properties; the web server adapted to perform at least one of a following action: retrieve the media and properties of the media; manipulate the media and the properties; assemble the properties; and transmit at least one of a following element from a group consisting of: the properties; and the assembled properties; and the rendering server adapted to receive commands from the web server. The commands include at least one of a following element from a group consisting of: the properties; and the assembled properties; and based on the commands, performs at least one of a following action: retrieve the media based on the commands; render the retrieved media; and store the retrieved media on the storage; and transmit the retrieved media to a destination. The system further comprises an audio capture module operably coupled to the web server, the audio capture module adapted to capture audio and DTMF tones, encode the captured audio, and transmit the encoded audio and information related to a call involved with generating the DTMF tones. The digital media comprises at least one of a following type of media from a group consisting of: video; audio; still images; file attachments; animation; and HTML. The manipulation of the media comprises at least one of a following action: copy the media; delete the media; and rename the media. The manipulation of the properties is adapted to change a value of the properties. The assembly of the properties is adapted to sequence the properties associated with each of the media. The transmission of the properties is adapted to transmit at least one of a following element from a group consisting of: the sequence; the properties and the media. The commands further include at least one of a following element from a group consisting of: a destination; and 5.a type of the media.

Referring now to FIG. 34, reference numeral 50' is an over all process from the receipt of commands 44' to the receipt of the multimedia presentation 56'. The process starts with the receipt of sis commands 44', to the end user 24'. Reference numeral 52' is the user's request to view the multimedia presentation. This is sent to the storage system 12'. Reference numeral 54' is a decision based on what type of hardware 24' the user originates from; either a computer or a mobile device. If it is a computer, then 56' shows the streaming of the media, the multimedia presentation to the end user's computer. If it is a mobile device, then a decision 58' has to be made on what type of device it is and how to send the multimedia to it. If the decision is that the mobile device can handle stream multimedia 56', the media is sent to the device 24'. If the mobile device cannot handle stream media, then a set of commands 42' is sent to the rendering server 14' to create a single file which is then sent via 60' to the mobile device 24'.

FIG. 34 is further described below.

The SISCommands are sent to recipients via the Internet (1) or wireless networks (2). Upon request the content is played back using streaming technology. (3) In the wireless environment the network carrier determines the right format for streaming or download (4). The receiving party may choose to respond or forward the message and can even add Voice Over using any telephone (5). The reply/forward message is stored on the project and notification is sent to the receiver (6). Upon request for play back the content is sent to Internet Users using Streaming Technology (7). Mobile users, upon determinating the right player, receive stream media (8) or a new, downloadable file, via the M-Gen (9). Since the SIScommand are small (1-5 k) compared to any typical Rich Media file (1-100 MB), storage space and airtime are largely reduced.

Referring now to FIG. 35, the uploader 18' is depicted. The process flow from login to the system until the media is sent to the storage system 12' is described. At reference numeral 70', the user logs in with a set of credentials. At reference numeral 72', a check is made to see if the credentials are valid. If they are not valid, the application exits 74'. If a current library is found with the user's credentials 73', then a request is made to get the project information 84'. If a project is not found, one path to 76' will allow them to solve an application. Reference numeral 78' allows a choice of the look and feel, the background, the color scheme, and then 80' sends a notification to have the project built. On a simpler version, a new project 82' is created automatically. Once a project exists for the logged-in user 84', project information is then requested from the server 12'. At reference numeral 86', if previous multimedia has already been encoded and is ready to send, it goes directly to 104' and is uploaded into the system. At reference numeral 88', the user can choose to work in an offline mode in which the data is not sent to the server after it is finished encoding but waits until a later time. Reference numeral 90' is a decision whether to capture multimedia data directly from the computer or to select files. If the user wishes to capture live data directly from the computer, then a capture device 92' is used. After the files have either been captured or selected 94', a jpeg image is extracted from the file to allow the media to be represented by a graphic icon or thumbnail. This happens automatically. Reference numeral 96' is a check for advanced options. If the user does not have advanced options, then 98' they are given an opportunity to select a custom graphic or jpeg to be used as a thumbnail 98'. At reference numeral 100', if they do have advanced options, then they are allowed to select a graphic representation or thumbnail to categorize using the UFN (unified file name) and to type in a description of this media file. At reference numeral 102', the media is then encoded into the proper streaming format and at reference numeral 104', it is uploaded into the storage system 12'. At reference numeral 106', the data on the user's machine is then deleted and at reference numeral 108', the user receives a "done" message that the process has been completed.

Referring now to FIG. 36a, a login screen of the uploader is depicted. At reference numeral 70', the login tab 112', and the user input 114' for the library ID 206' are shown. The user input 116' for the project ID 208', the input for the user's user name 118' into the system 202', the user's input 120' for the password, the button the user clicks to verify their login information 122', and a checkbox that the user can determine whether they are in online or offline mode 124' as shown on FIG. 35 (reference numeral 88') are shown.

Reference numeral 128' is a button to clear the cache. This removes any extraneous files on the user's desktop and is the same process as shown in FIG. 35 (reference numeral 106').

Referring now to FIG. 36b, the main screen of the application 90' (which allows users to select digital media from their local computer) includes embedded help videos 126' The following are banners and backgrounds used by the application: video 132', screen shots 134', file attachments 136', static pictures or graphics 138', audio files 140', look and feel 142', HTML gilrd 144', beginning the encoding and uploading 146', a descriptive help text 148', an area where the selected files are displayed 150', a button that allows users to add files 152', clearing any files 154' in the list 150', removing only files that are checked 156' in the list 150', another textural help box 158' allowing the user to choose different formats and profiles for their encoding sessions 160', allowing the users to view online help 162', allowing the users to capture a custom thumbnail from an image in the media 164', and a "next" button 166' which takes the users to a next step or area.

Referring now to FIG. 36c the thumbnail extractor 94' is depicted.

Referring now to FIG. 36d the encoding and uploading screen, 102' and 104', are depicted.

Figure 37:
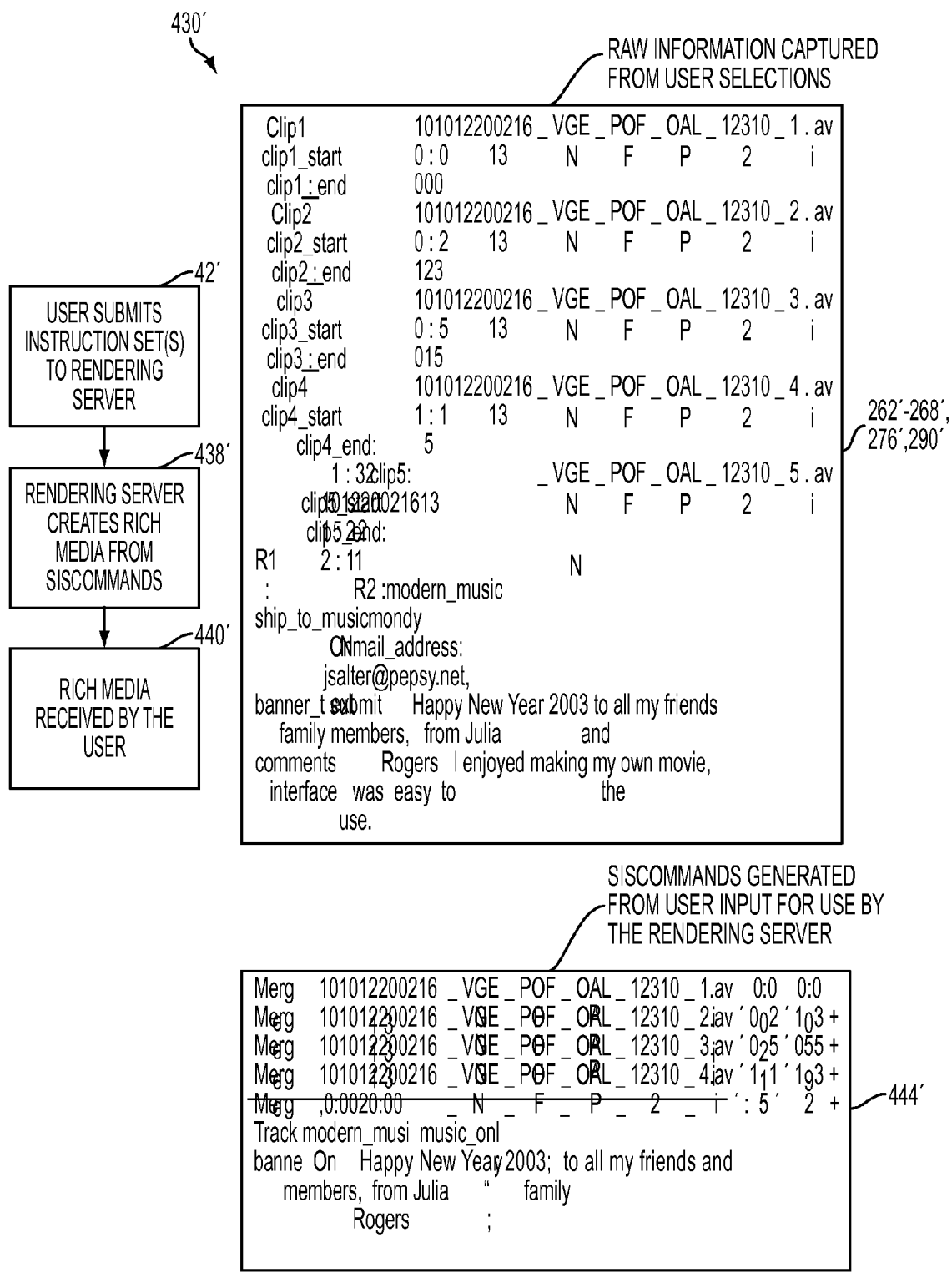
FIG. 37 illustrates a SISCommand instruction flow and sample SISCommand instructions in accordance with an exemplary embodiment of the present invention.

Referring now to FIG. 37, the processing 170' which the user categorizes their media by choosing its UFN (unified file name), is depicted. Reference numeral 172' is the unique contact ID of the person uploading or storing the file, reference numeral 174' is a general category that describes the content of the file, reference numeral 176' is another category or subcategory describing the file, reference numeral 178' is the creator of the file, reference numeral 180' is the date the file was created, reference numeral 182' is the version or sequence number and reference numeral 184' can be any user defined codes. When all these different categories and codes are put together, you end up with a UFN that is unique to this file.

UNF is done by grouping together set of codes, ID's and dates. The actual code naming can be done by the end-user or automatically following sets of rules (for example, a predefined set of rules). The main advantages of the UNF are that it is virtually impossible to create a duplicate file name by any user, and a query and retrieval of specific data/raw material can be done directly by the Operating System. There is no need for an agreed-upon database in order to share data among users and cross organizations.

Figure 38:
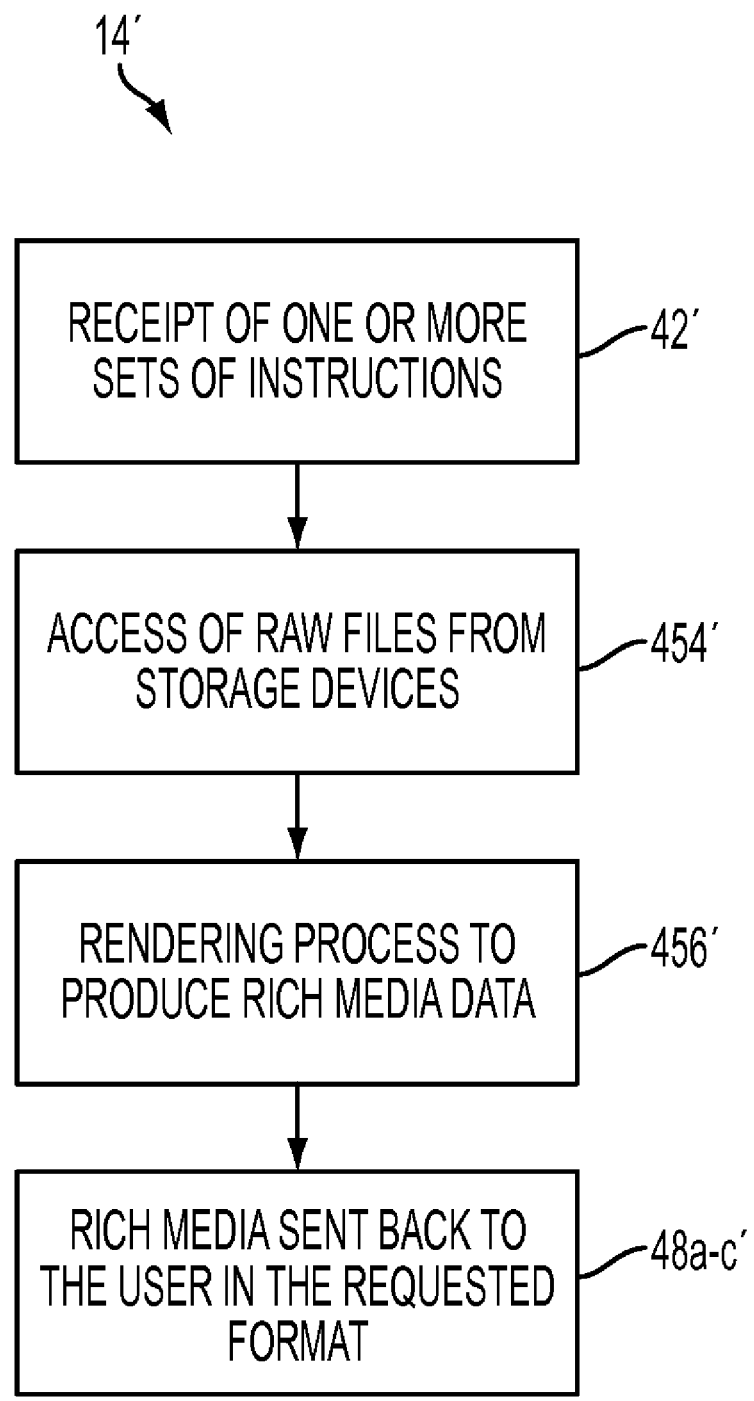
FIG. 38 illustrates a rendering server flow in accordance with an exemplary embodiment of the present invention.

Referring now to FIG. 38, the user interface to choose the UFN for a media file is disclosed. The screen shot of the user interface 170' includes the general category 174', the class or subcategory 176', the creator 178', the creation date 180', the sequence number 182', the thumbnail or the graphic representation of this digital media 184', the textural description 186' that can be entered by the user, the section 188' in which this file will be placed in the storage system 12', a displayed 190' UFN, a checkbox 192' that the user selects when done choosing all the categories, and, to process or import into the system any checked files, button 194' is used The button "copy down" 196' allows the user to copy 174', 176', 178', 180', 186', 188' to the fields below it. Reference numeral 198' depicts a set of fields that have been chosen, reference numeral 199' shows that in the UFN, the files automatically identified by the type of file (that is determined from FIG. 36b, 132' through 144'), reference numeral 200' is the media player in the user interface that is both used to display help clips and display the media as its playing, reference numeral 202' is the user's login or user name, reference numeral 204' is their access level, reference numeral 206' is the unique library ID that they are currently in, and reference numeral 208' is the unique project they are currently in.

Referring now to FIGS. 39a and 39b an alternate user interface to FIG. 38 is depicted.

Users are capable of defining the source, purpose, type, creator and date created while dumping the raw material (video, audio or pictures) or creating the files (text and images). The following steps are taken:

The user name and captured date are collected, a unique ID is set to each user and or production, text describing the them and the flow is added, category and classes are added from a pre-defined, self learning database, abbreviation of the creator name and the creation date are added to create a unique identifier, file type is automatically collected and a code is added to the file name, and a unique file name with time stamp is generated and the data is stored.

Regardless of the source, the file type and the user, the file stored using the SISController allows for storage and retrieval of all types of data and digital video, pictures and audio allowing different users to collaborate. The unique file naming prevent duplications and can be retrieved either by using a proprietary database with full text search capability, search by defined filed, or directly by any operating system.

The present invention further describes a method for creating a unified file name that comprises: assigning a unique identifier based on a destination of a file; assigning a code based on a type of the file after the unique identifier; assigning a code based on a user defined category after the code based on the file type; assigning a code based on a user defined sub-category after the code based on the user defined category; assigning a code related to at least one of: a creator of the file; and a creator of a content of the file, after the code based on the user defined sub-category; and assigning a creation date of at least one of: the creator of the file; and the creator of the content of the file, after the previously assigned code. The method further optionally comprises assigning a version of the file after the creation date and optionally comprising at least one user defined code after the assigned version.

Figure 24:
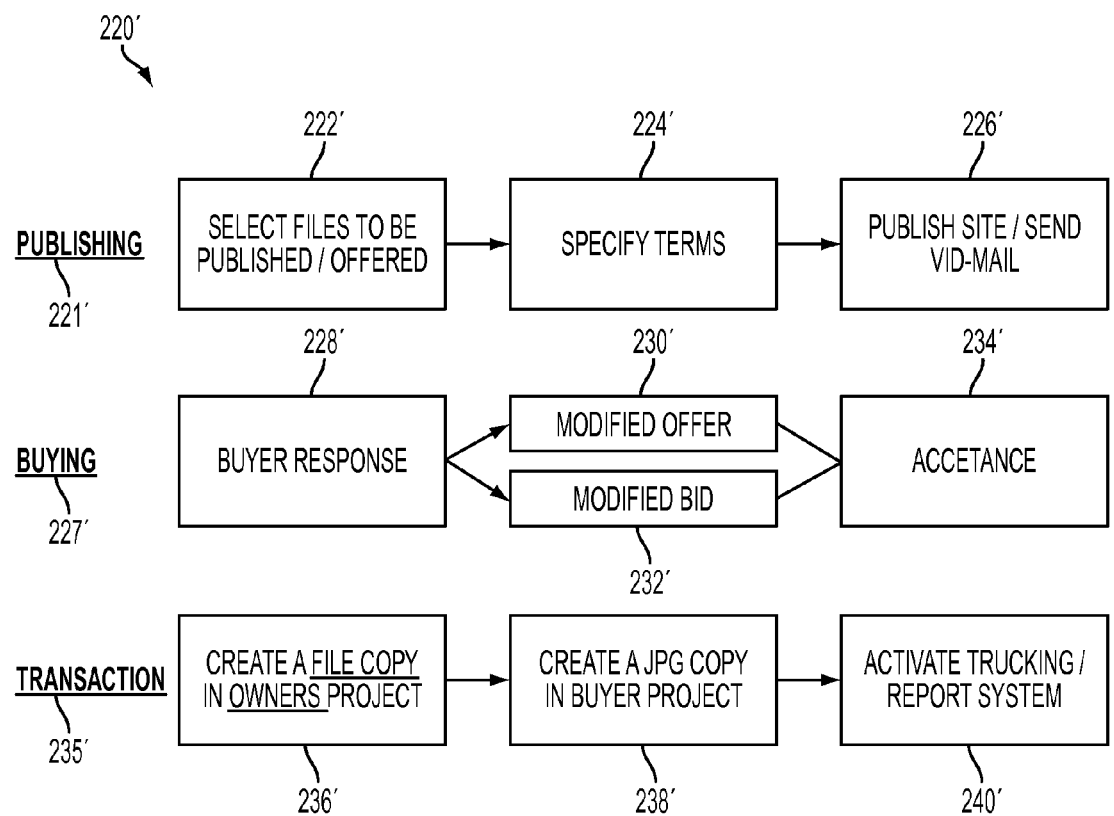
FIG. 24 illustrates a system design in accordance with an exemplary embodiment of the present invention.

Referring now to FIG. 24, reference numeral 220' shows three process flows for the exchanging of digital media between two entities. Reference numeral 221' is the path for publishing in which files are selected to be published or authored 222', terms for the purchase or reuse of the media to be specified 224', and the publishing of the media along with their terms 226'. Reference numeral 227' is the process of purchasing digital media in which the purchaser makes a response 228' to any published media from 226'. The buyer or purchase can 230' modify the offer or 232' make a bid on the digital media that they wish to purchase. Reference numeral 234' is the acceptance by the publisher of the offer or bid for the digital media. Reference numeral 235' is the process flow of the digital media after an agreement has been reached on its purchase in which the original file from 222' is copied in the owner's project 236' a jpeg image or thumbnail is created into the purchaser or buyer's project 238' and a tracker or reporting system is activated for this piece of digital media 240'.

Figure 25:
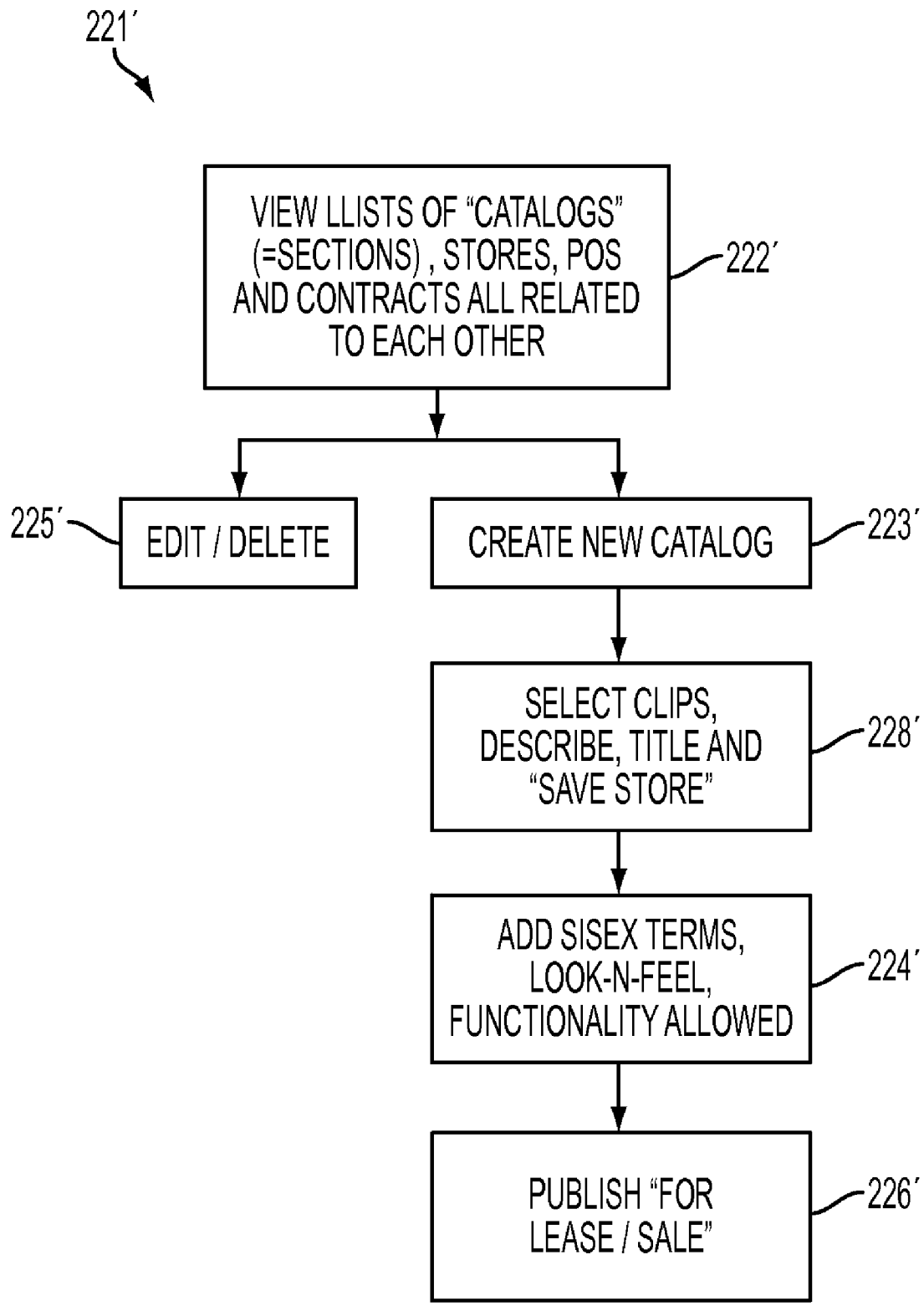
FIG. 25 illustrates the process that the owner of digital media uses to publish the media along with its terms.

Referring now to FIG. 25, reference numeral 221' is the process that the owner of digital media uses to publish the media along with its terms. At reference numeral 222', the owner can view a list of current catalogs or stores that contain current digital media. The owner then has a choice to edit or delete current catalogs 225' create a new catalog of content 223'. At reference numeral 228', the owner selects clips to be published, creates a description for the catalog or store and then saves it. At reference numeral 224', the owner of the digital media sets forth the terms for the purchase of their media, selects look and feel, banner, backgrounds, color schemes, etc.k and at reference numeral 226' the list of media is then published on an electronic storefront. Referring now to FIG. 26a, reference numeral 221' is the user interface for publishing or exporting digital media for purchase.

Referring now to FIG. 26b is the user interface to specify terms 224' is depicted. Reference numeral 500' is the field code that becomes part of the UFN, reference numeral 502' is a short textural description, reference numeral 504' is the business description that is used in the exchange agreement, and reference numeral 506' is the catalog description which is used when the site is published in 226'.

Figure 27:
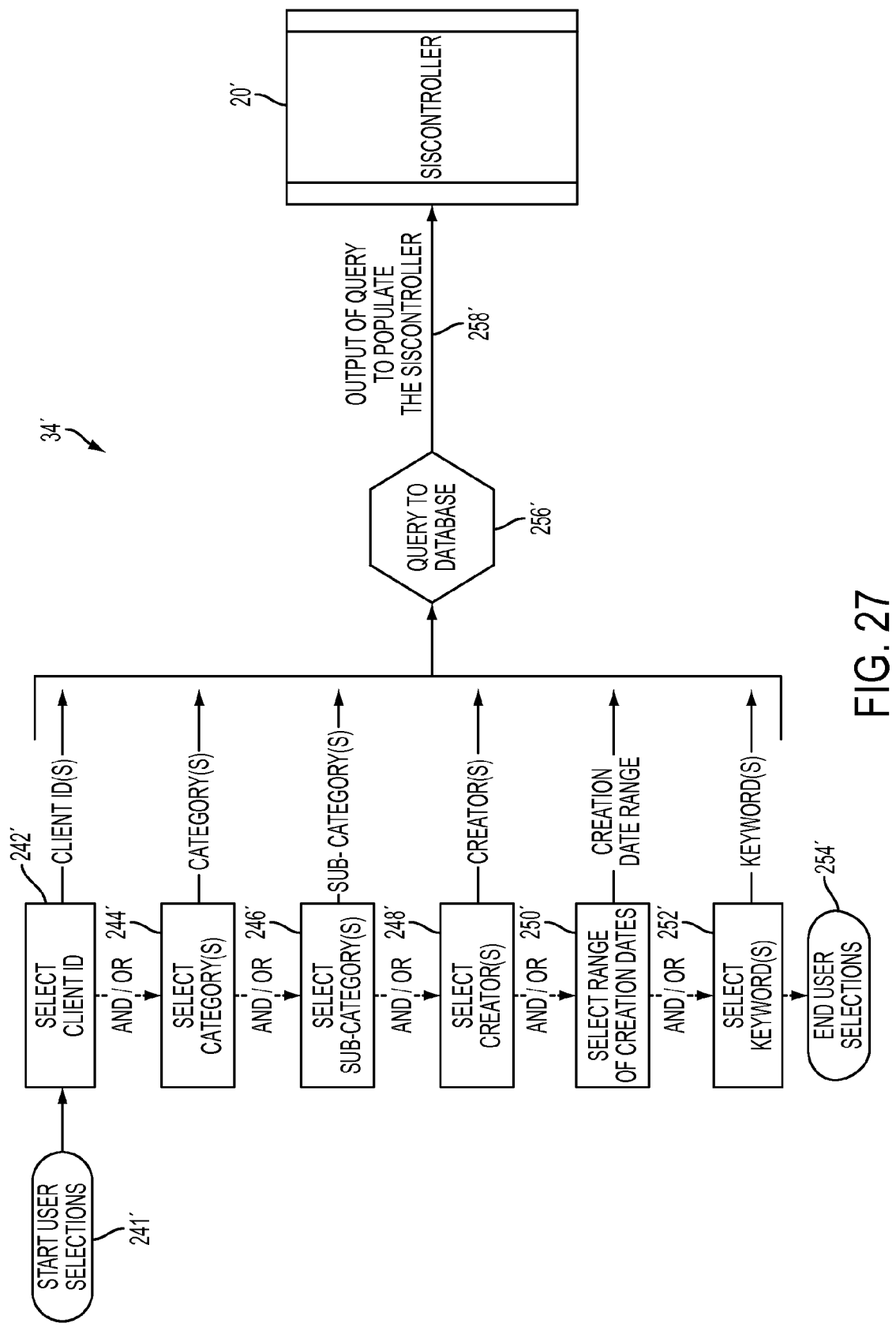
FIG. 27 illustrates selections from user to populate the SISController in accordance with an exemplary embodiment of the present invention.

Referring now to FIG. 27, the process 34' that a user creates a query or search into the storage system 12' to populate the user interface 20' is depicted. At reference numeral 241' the user starts the process. The user can select from a plurality of (1-6 for example) of different search variables. Reference numeral 242' is the client ID to search on, reference numeral 244' are categories to search, reference numeral 246' are subcategories to search, reference numeral 248' are creators to search, reference numeral 250' can be a range of creation dates to search, reference numeral 252' are any key words contained in the description of the file to search on, reference numeral 254' ends the user selections, at reference numeral 256', the query is sent to the database, at reference numeral 258', data is returned to populate the user interface.

Retrieving any data and populating the user interface 20' is done by simple query, following the same coding system that created the file name or by keyword search. This presents the data as a set of images. The human brain can process images by far much faster than text. Efficiency and productivity increase and there is no need for users training.

Figure 28:
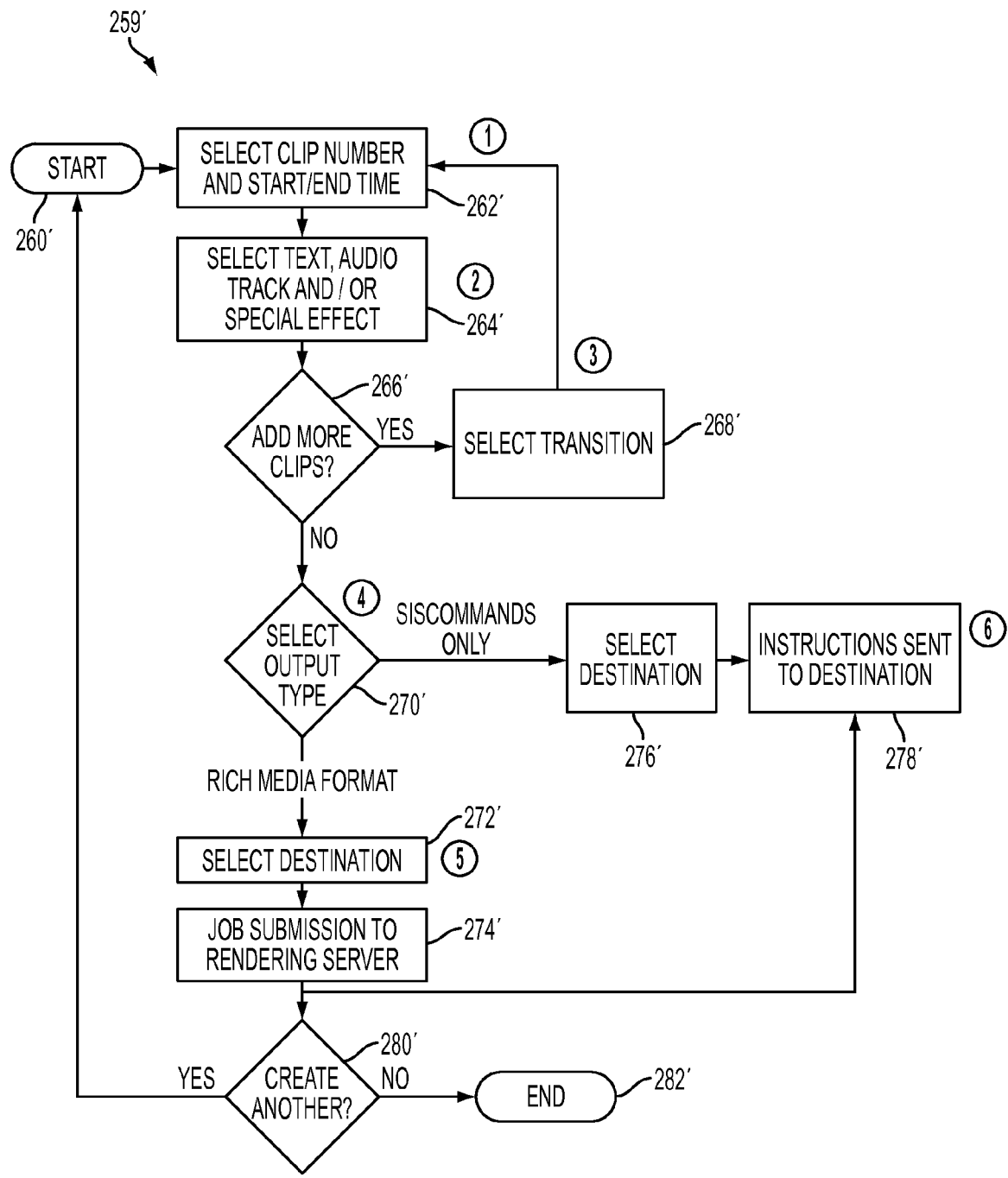
FIG. 28 illustrates a SISController in accordance with an exemplary embodiment of the present invention.

Referring now to FIG. 28, the overall process flow 259' that the user follows to create their multimedia presentation is depicted. Reference numeral 260' begins the process. At reference numeral 262', media files are selected and optionally start and end times within the media file are selected, at reference numeral 264', text audio tracts or special effects are selected. At reference numeral 266', a decision is made to whether the user wishes to add more digital media. If yes, they can select a transition 268' between medias that takes the user back to 262'. If they do not wish to add any more media, they select their output type 270'. If the output type is rich media 272', they select a destination. At reference numeral 274', the job can be submitted to the rendering server, at reference numeral 278', the instructions are sent to the chosen destination. After the process is complete the user is prompted to create another multimedia presentation 280'. If they select no 282', the process ends. If they select yes 260' starts the process over again. At reference numeral 276', if a user chooses to output sys commands only, then they select a destination 278' and commands are sent to that destination.

The user identifies (visually or by text) the desired clip (1) and can play or run the associated application on the user interface 20' display window. Text and media can be selected from pre-defined menus (2). (The menus are defined by the system administrator/service provider). Transition types are selected as well (3). If a Rich Media output is selected (4) then the SISCommands 42' are sent directly to the Rendering Server (5) for production, otherwise the SISCommands are sent to another end-user, portable device, service provider or storage (6). The process is fast and requires no training. A novice user can produce a rich media presentation in minutes, a task that otherwise requires a studio and many hours of labor by highly trained professionals.

Figure 29A:
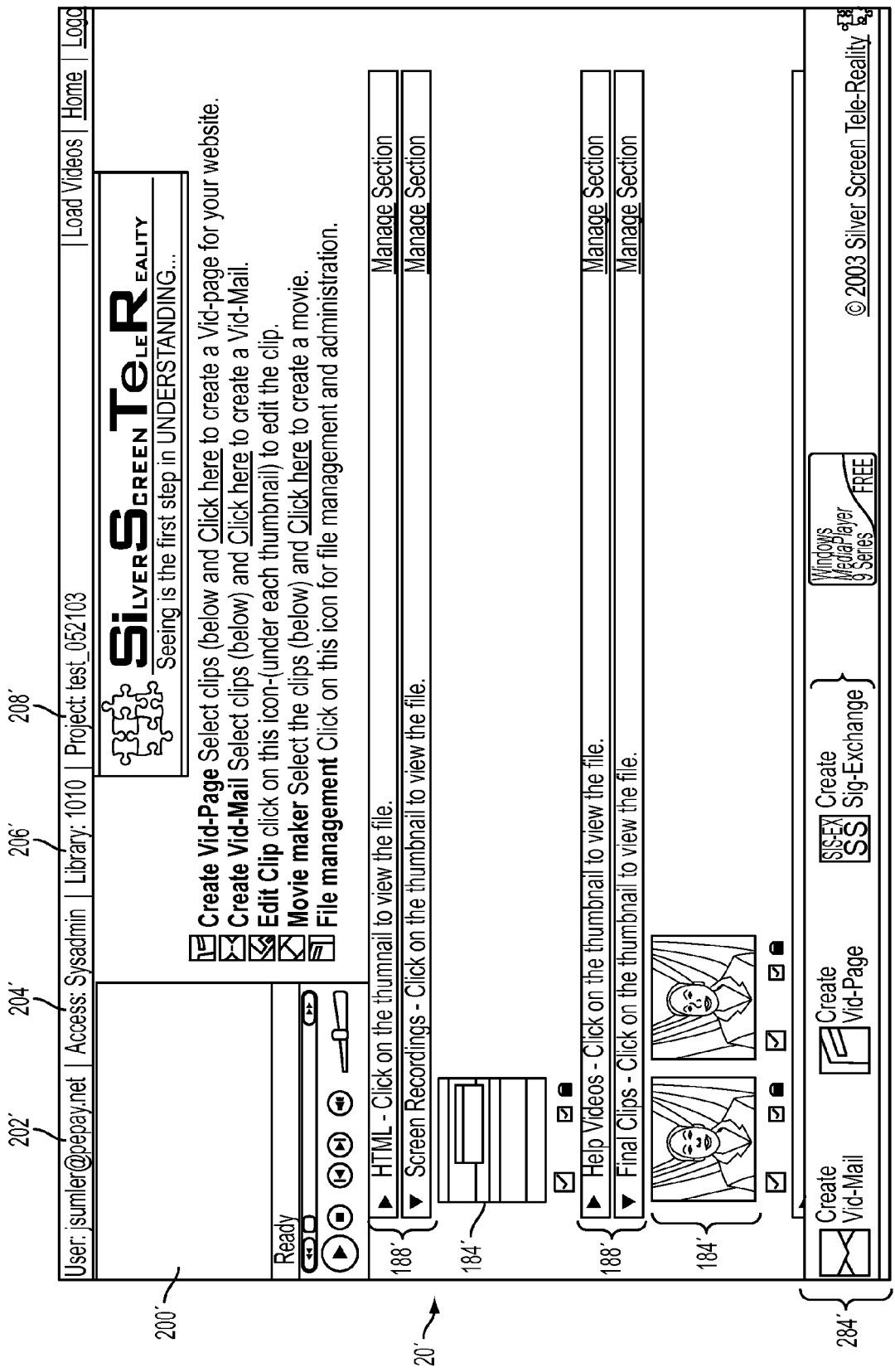
FIG. 29a illustrates screen shots of multi-media presentation creation of selecting media in accordance with an exemplary embodiment of the present invention.

Referring now to FIG. 29*a*, the user interface 20' is depicted. Once the user has selected their clips, they select different templates in which the multimedia presentation resides 284'.

Figure 29B:
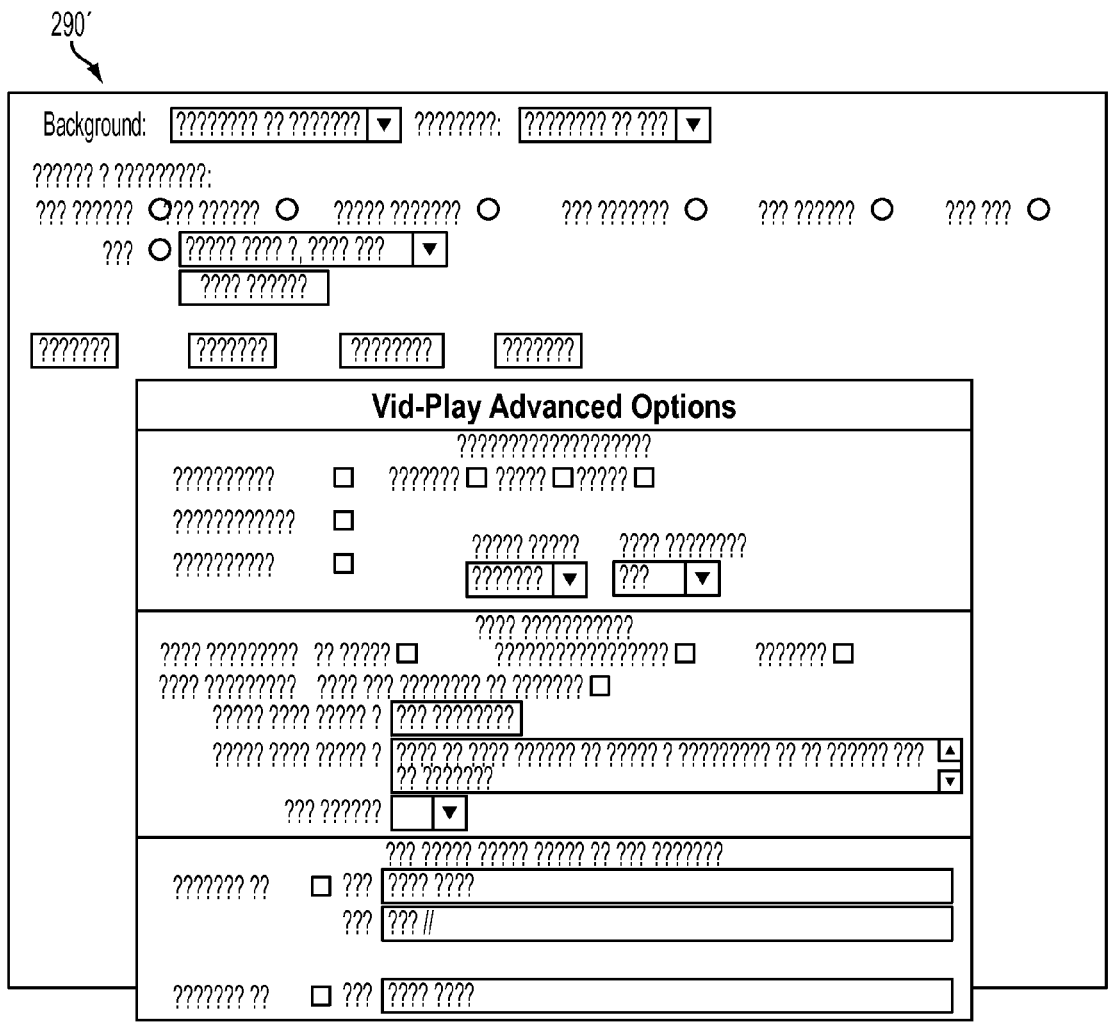
FIG. 29b illustrates screen shots of multi-media presentation creation of selecting destination options in accordance with an exemplary embodiment of the present invention.

Referring now to FIG. 29*b*, the user interface 290' for various options for the multimedia presentation is depicted.

Figure 29C:
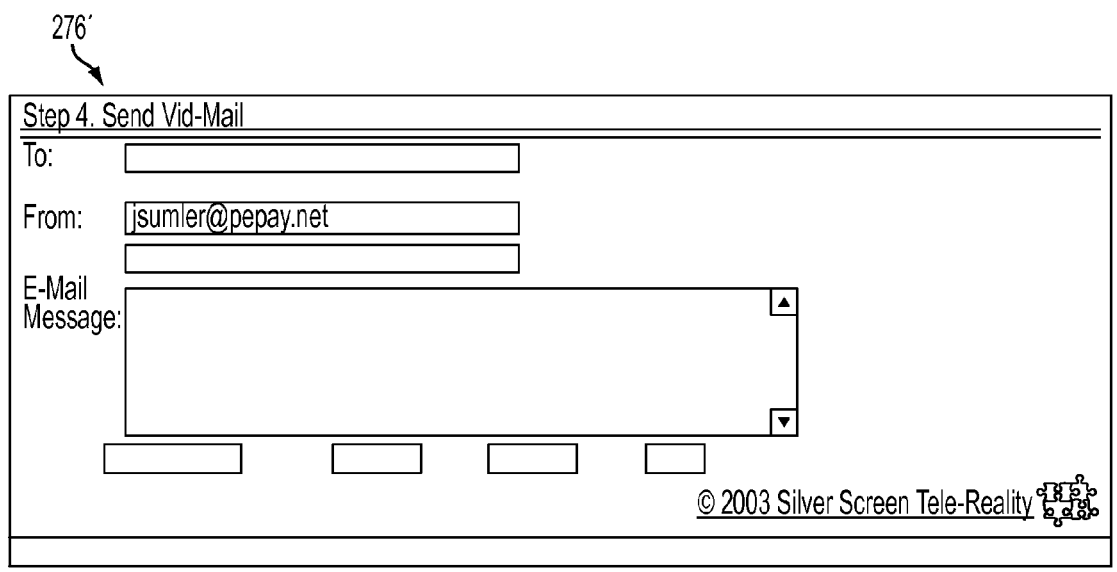
FIG. 29c illustrates screen shots of multi-media presentation creation of send/save multimedia presentation in accordance with an exemplary embodiment of the present invention.

Referring now to FIG. 29*c*, the destination selection 276' is depicted.

Figure 30A:
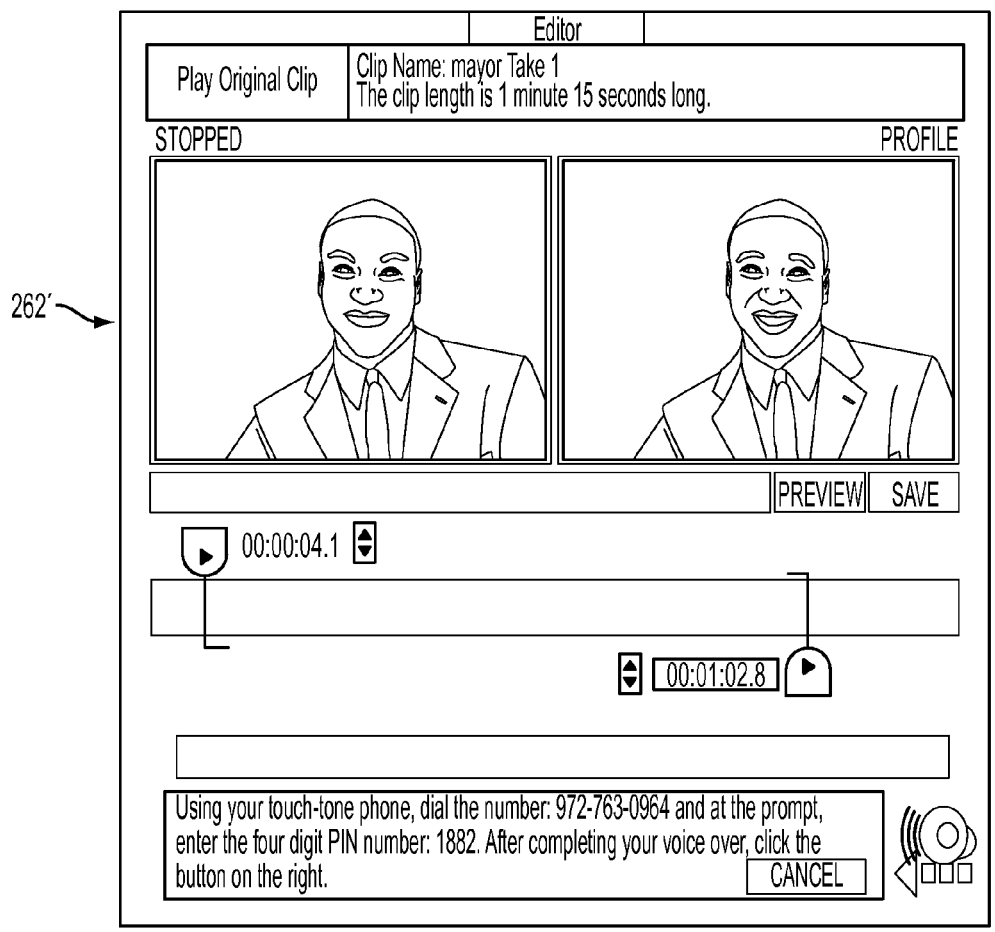
FIG. 30a illustrates a screen shot of editing a clip in accordance with an exemplary embodiment of the present invention.

Referring now to FIG. 30*a*, the user interface 262' for selecting start and end times within a clip is depicted.

Figure 30B:
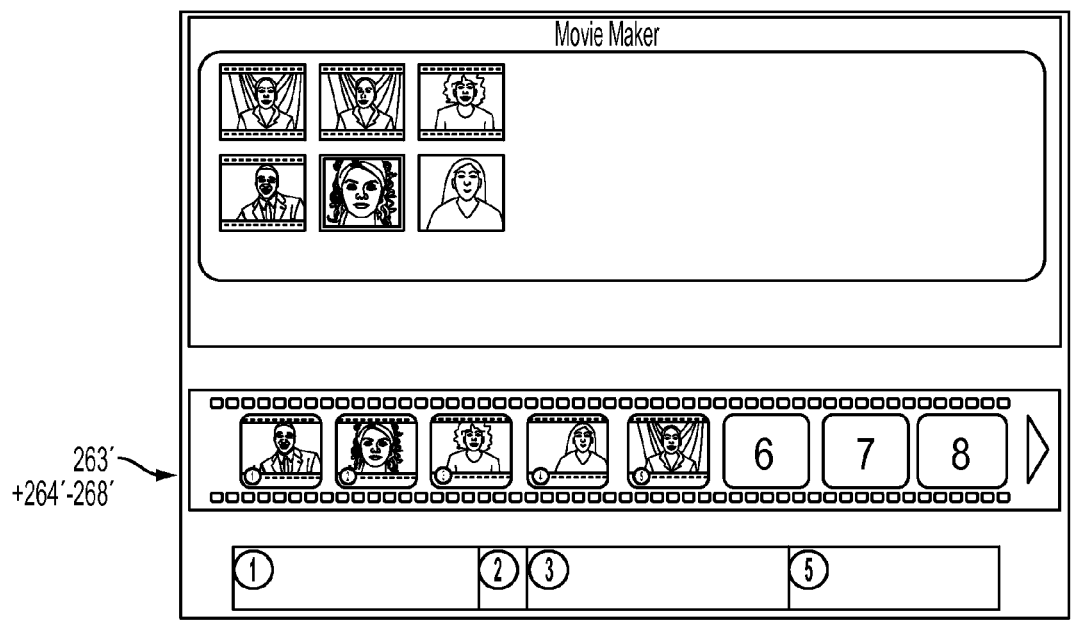
FIG. 30b illustrates a screen shot of sequencing clips in accordance with an exemplary embodiment of the present invention.

Referring now to FIG. 30*b*, the user interface 263' for sequencing clips, and selecting text, audio tracts, special effects, and transitions 264'-268' is depicted.

Figure 31A:
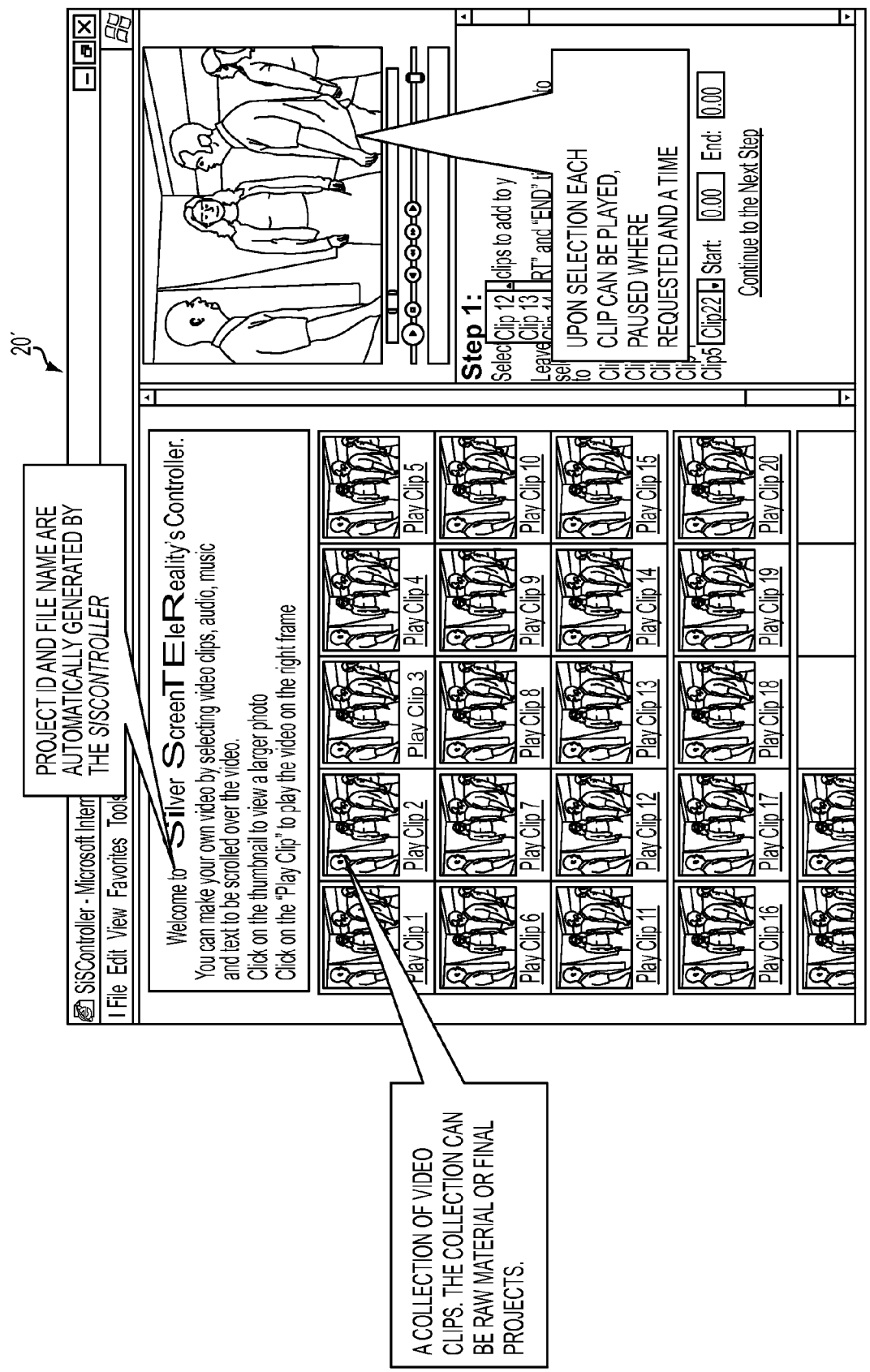
FIG. 31a illustrates an alternate process controlled by user interface.
Figure 31B:
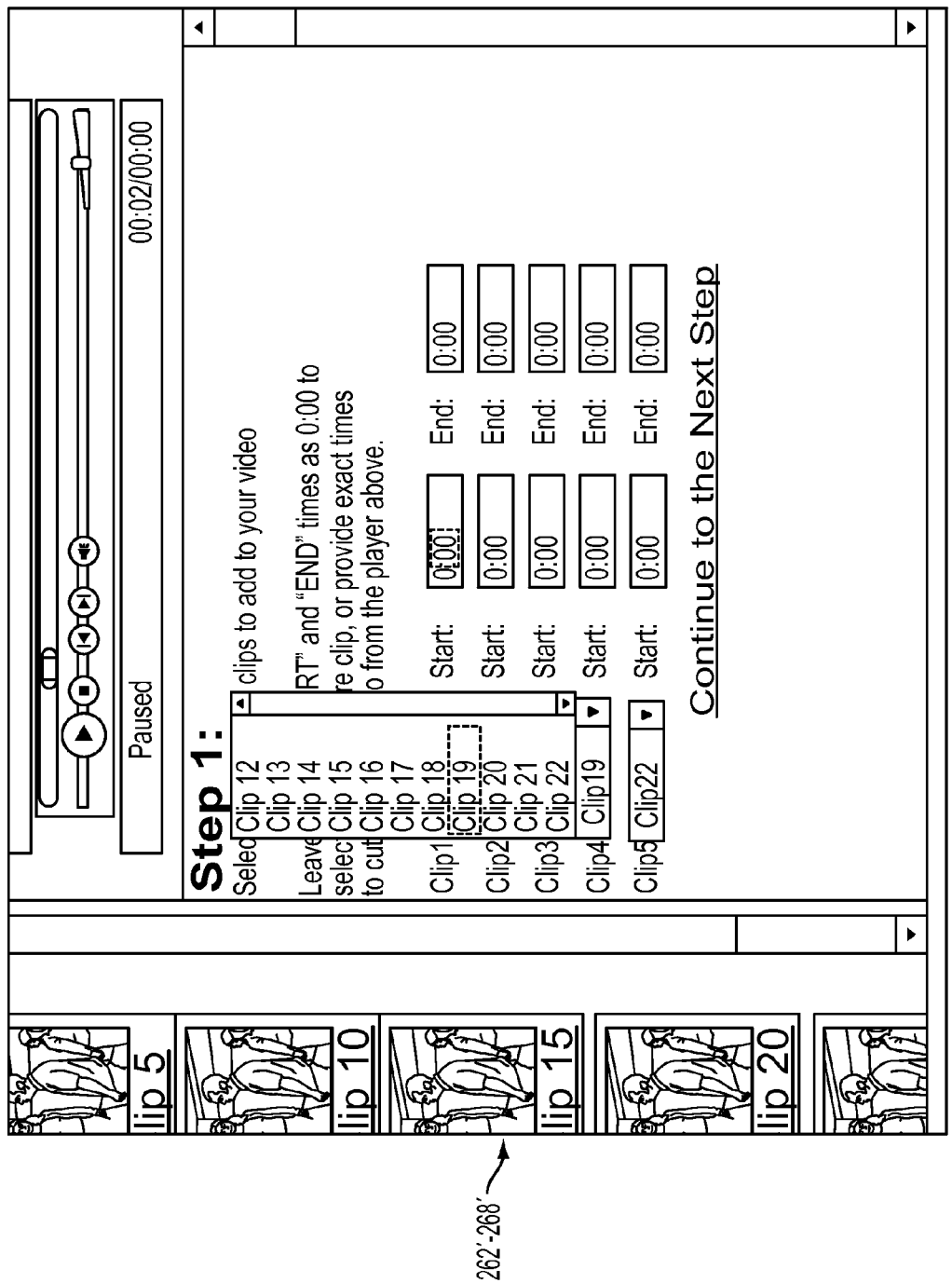
FIG. 31b illustrates an alternate process controlled by user interface.

Referring now to FIGS. 31*a*-31*b* an alternate process controlled by user interface 20' is depicted. The process is described below. Upon starting a new project, raw video is collected from all sources including the user's PC, dedicated servers, other stations on the network and via the Internet, for example. Time stamps are captured for the "START" and "STOP" of individual clip, and audio from different sources (such as music, voice, sound effects) is selected. The user provides text information that is played as banner (at a bottom of movie, for example) or a stand alone picture. Delivery information is selected which includes: physical media (CDR) or sending rendering instructions to an end user via e-mail.

Figure 32:
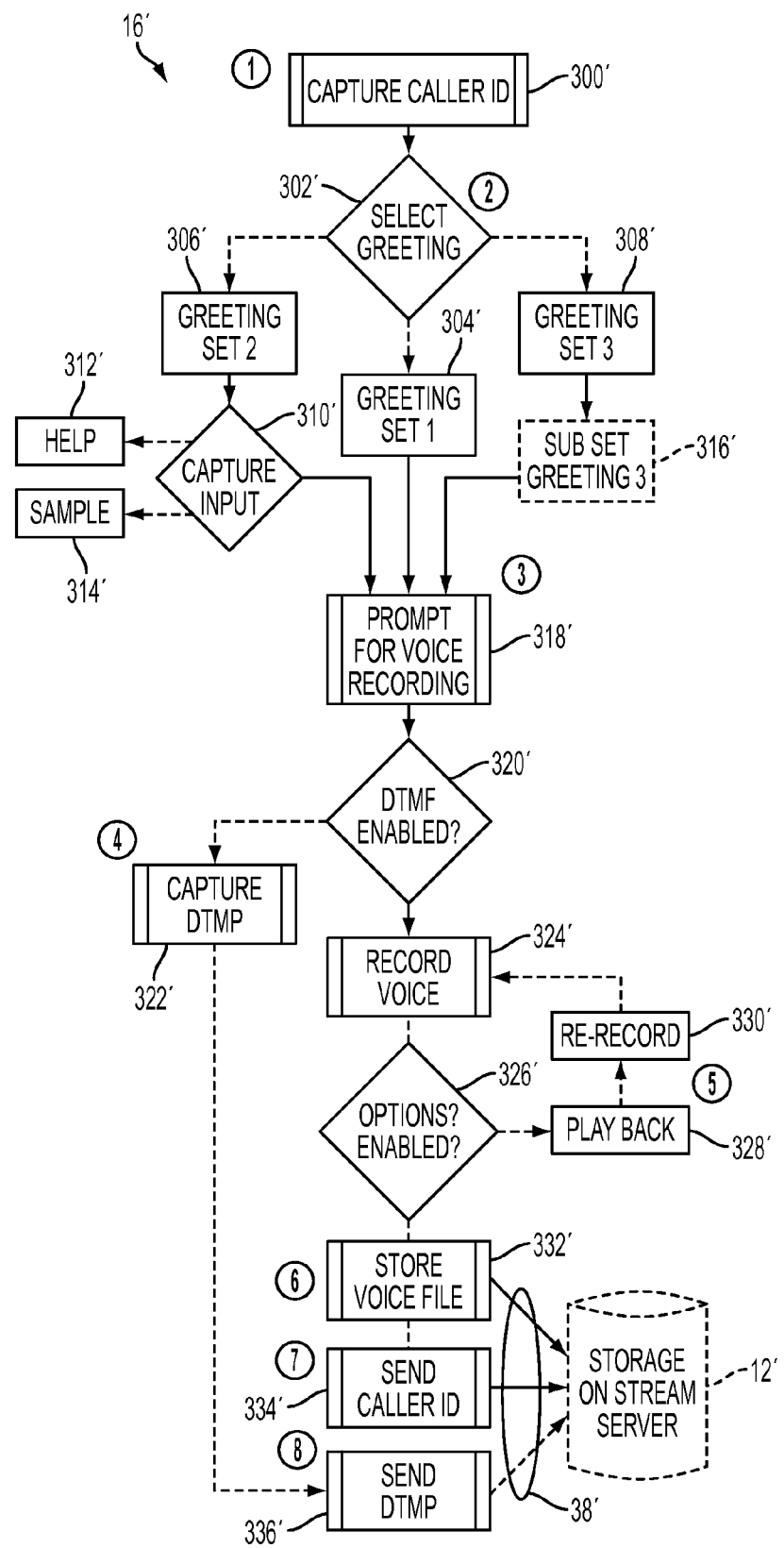
FIG. 32 illustrates a voice over in accordance with an exemplary embodiment of the present invention.

Referring now to FIG. 32, the voiceover process flow 16' for capturing audio over a telephone, coding it into a string format, and saving it onto a storage system 12' is depicted. Reference numeral 300' is an incoming call where Caller ID is captured. At reference numeral 302', the number that was dialed is detected and, depending on which number the user dialed, different greeting sets are encountered. Reference numeral 304' is the standard greeting set, and reference numeral 306' is a custom greeting set with help and samples. At reference numeral 310', the user's input is captured to direct them to the help system 312', the sample system 314' or to the prompt for voice recording 318'.

Reference numeral 308' is another customer greeting set that includes a subset of greetings 316'. At reference numeral 318', the user is prompted to record their message. At reference numeral 320 a' decision is made regarding DTMF enabling. At reference numeral 322', the DTMF capturing is set to on, at reference numeral 324', the audio is recorded, at reference numeral 326', if advanced options is enabled this allows the user to 328', play back the recording 328' or re-record their message 330'. At reference numeral 332', after recording is finished, the voice file is then stored on the storage system 12', at reference numeral 334', the caller's number is also stored on the storage system, at reference numeral 336', if DTMF tones were captured, they are also stored on the storage system, and at reference numeral 38' (which refers back to FIG. 33), data flows from the voiceover system into the user interface into the storage system 12'.

FIG. 32 is further described below. Upon calling in, the caller ID is captured (1) and, based on the call in phone number, a greeting to play is selected (2). The system administrator can set any number of voice boxes and greeting paths. In this example, set 1 goes directly to voice prompt, set 2 provides for help and pre-recorded samples and set 3 is a combination of several voice boxes. The user is then prompted to record his voice upon a tone signal (3). If the DTMF option (4) is enabled then DTMF tones and time is captured. If playback and re-record option is enabled then the user is promoted (5). The voice file is encoded and stored on the server (6) as well as the caller ID (7) and DTMF time code (8).

Figure 33A:
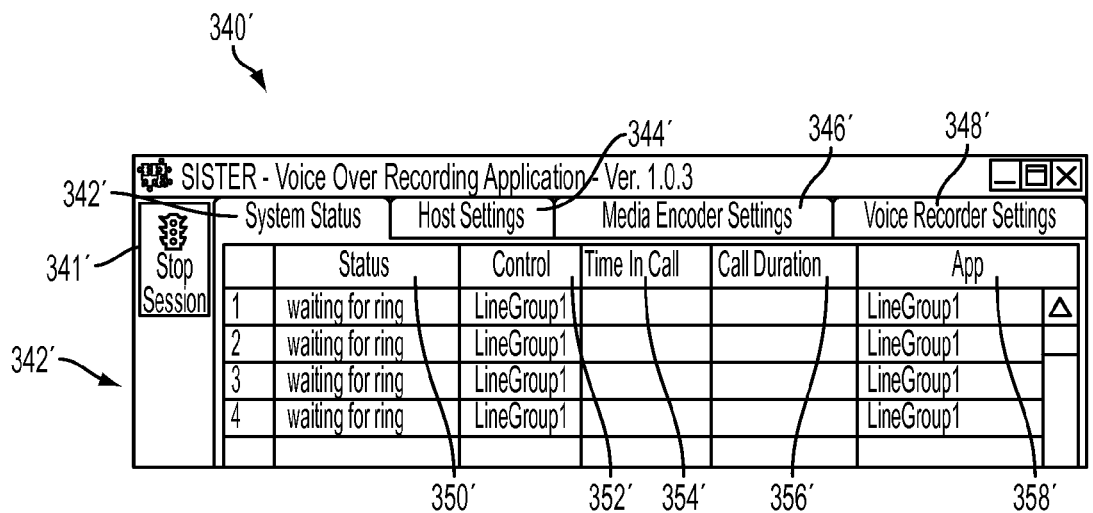
FIG. 33a illustrates a screen shot of the voice over application of the phone line monitor in accordance with an exemplary embodiment of the present invention.

Referring now to FIG. 33*a*, the user interface 340' to the voiceover system console is depicted. Reference numeral 341' is a button that starts or stops the software, reference numeral 342' is the system status display page, reference numeral 344' is the host settings, reference numeral 346' is the media and coding settings, and reference numeral 348' is the voice recording settings. Reference numeral 350' shows the current status of the phone lines, reference numeral 352' displays the name of the group that each phone line is associated with, reference numeral 354' displays the current time spent in each step of process 16', reference numeral 356' shows the total accumulated duration of the current call, and reference numeral 358' shows the current application designated for each phone call.

Figure 33B:
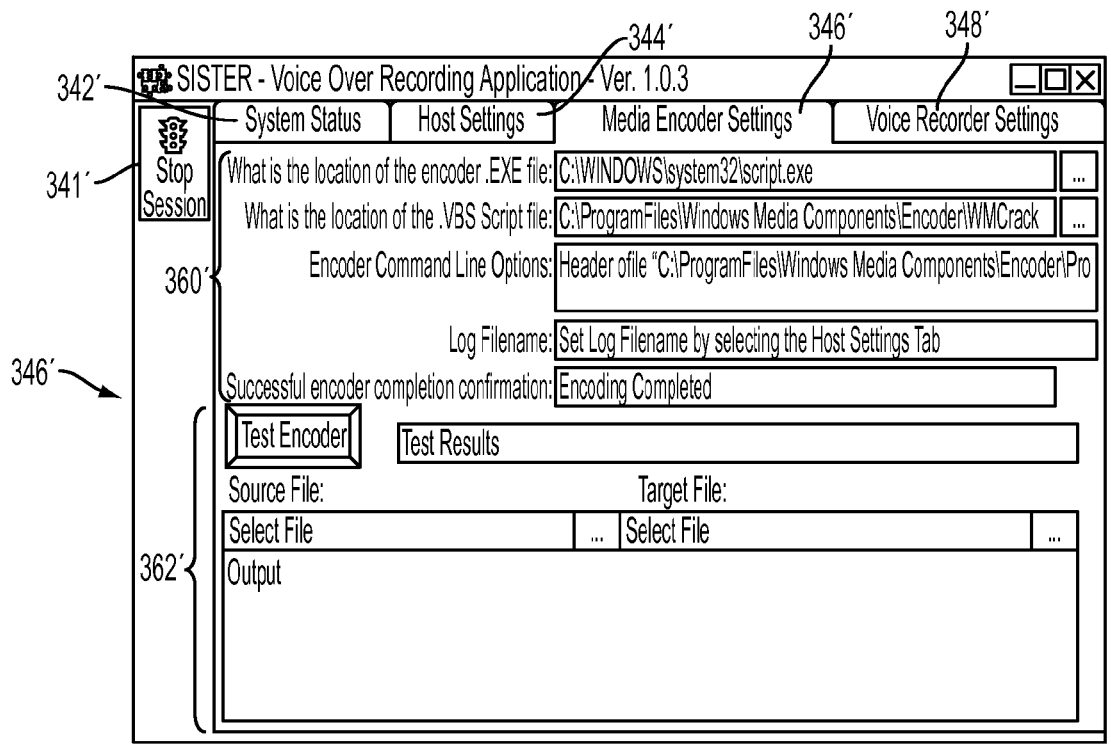
FIG. 33b illustrates a screen shot of the voice over application of the media encoding settings in accordance with an exemplary embodiment of the present invention.

Referring now to FIG. 33*b*, the user interface 346' for the media and coder settings are depicted. Reference numeral 360' includes user inputs for the settings, and reference numeral 362' is the testing and debugging interface.

Figure 34A:
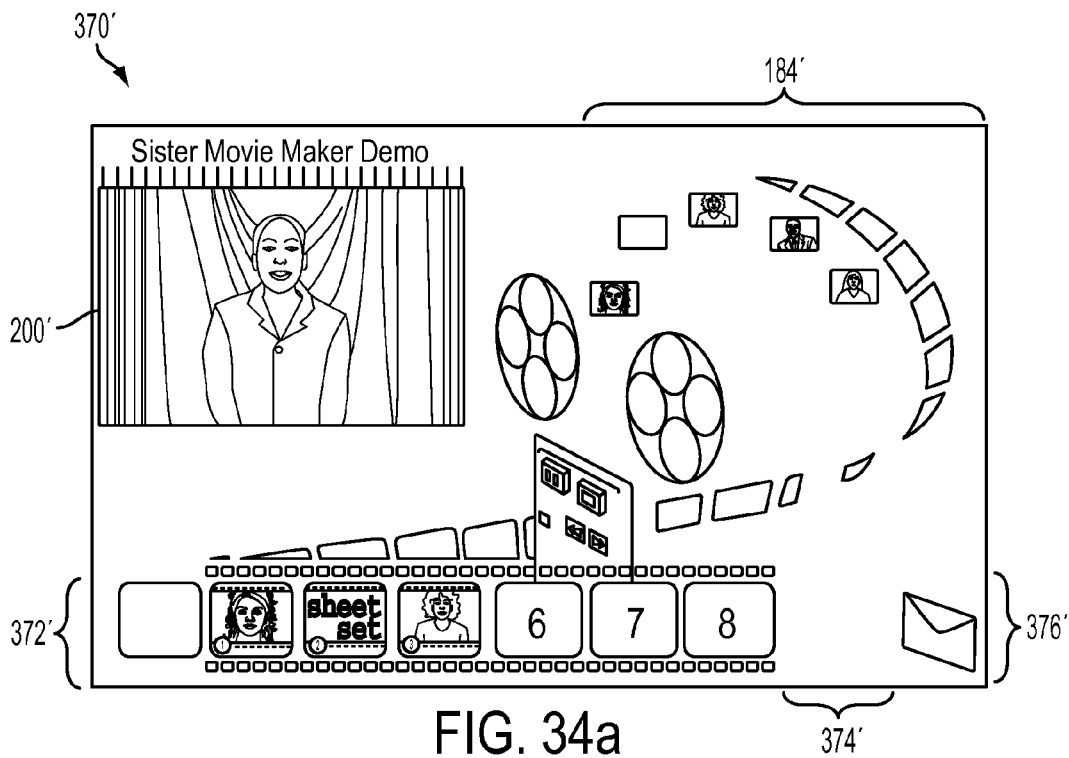
FIGS. 34a and 34b illustrate a sample of receiving a multimedia presentation in accordance with an exemplary embodiment of the present invention.

Referring now to FIG. 34*a*, a sample multimedia presentation 370' is depicted. Reference numeral 372' is a timeline to allow the user to sequence a subset of clips to play their own personal movie. Reference numeral 374' is the interface for a user to record their own personal voice message. Reference numeral 376' allows the end user to send a copy of their personalized presentation via email.

Figure 34B:
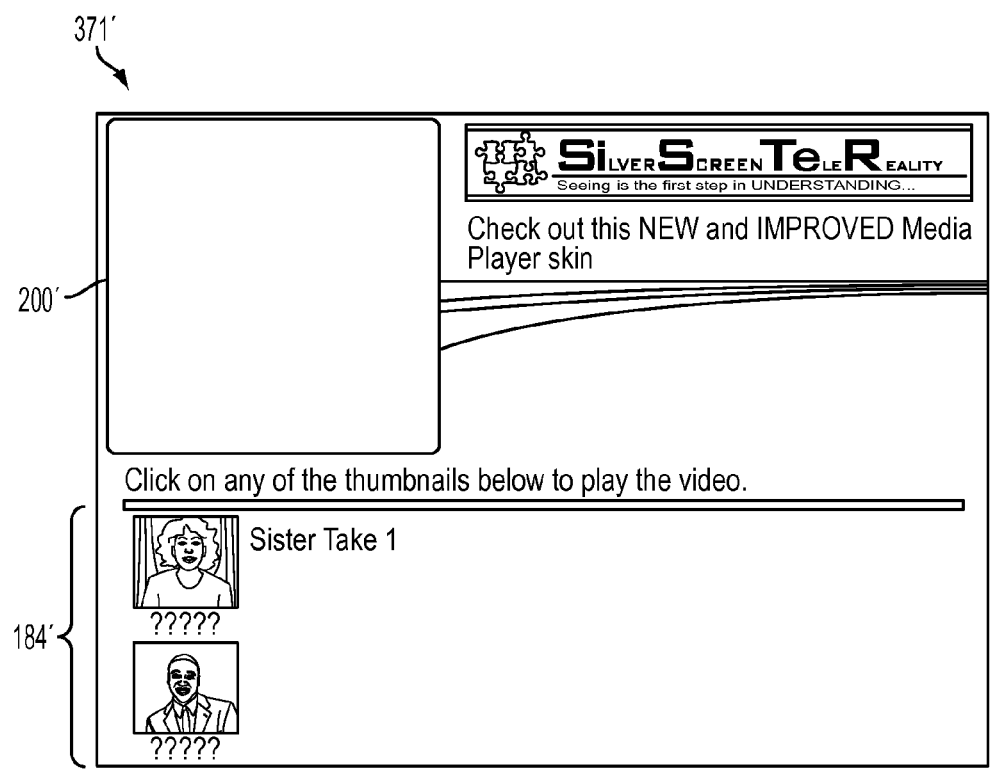

Referring now to FIG. 34*b*, an alternate sample of the end user's experience from a multimedia presentation 371' is depicted.

Figure 35A:
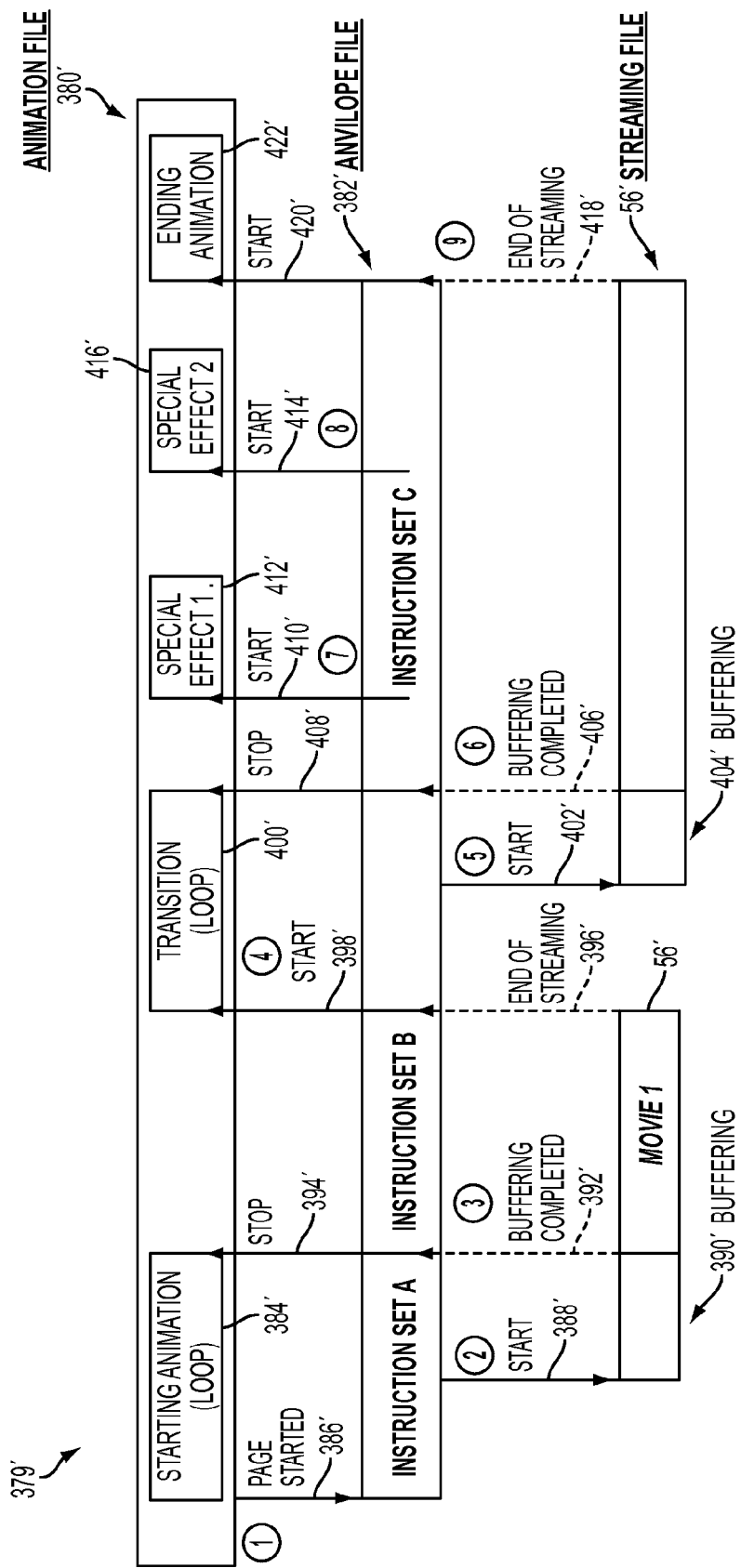
FIG. 35a illustrates the process flow to trigger animation events.

FIG. 35*a* includes Instruction Set A: to play the starting animation and stay in loop until movie 1 is playing for a defined minimum time, if applicable (buffering done). At Instruction Set B: As soon as movie 1 ends play Transition and stay in loop while Movie is buffering for a defined minimum time, if applicable. At Instruction Set C: Upon Event A, activate the Special Effect 1 and upon Event B activate the Special Effect.

FIG. 35a is further described below:

1. The page is loaded and the Starting Animation plays.
2. At the predefined time Movie 1 is called to play. Buffering starts 3 while Starting Animation stays in a loop.
3. As soon as Movie 1 starts, Starting Animation stops.
4. Movie 1 plays. Once finished, the Transition Animation plays.
5. At the predefined time Movie 2 is called to play. Buffering starts while Transition Animation stays in a loop.
6. Movie 2 plays until the end.
7. Upon Event A (Mouse click, DTMF signal, key pad pressed etc.), Special Effect 1 plays.
8. Upon Event B (Mouse click, DTMF signal, key pad pressed etc.) Special effect Animation 2 plays.
9. Animation ends.

Figure 35B:
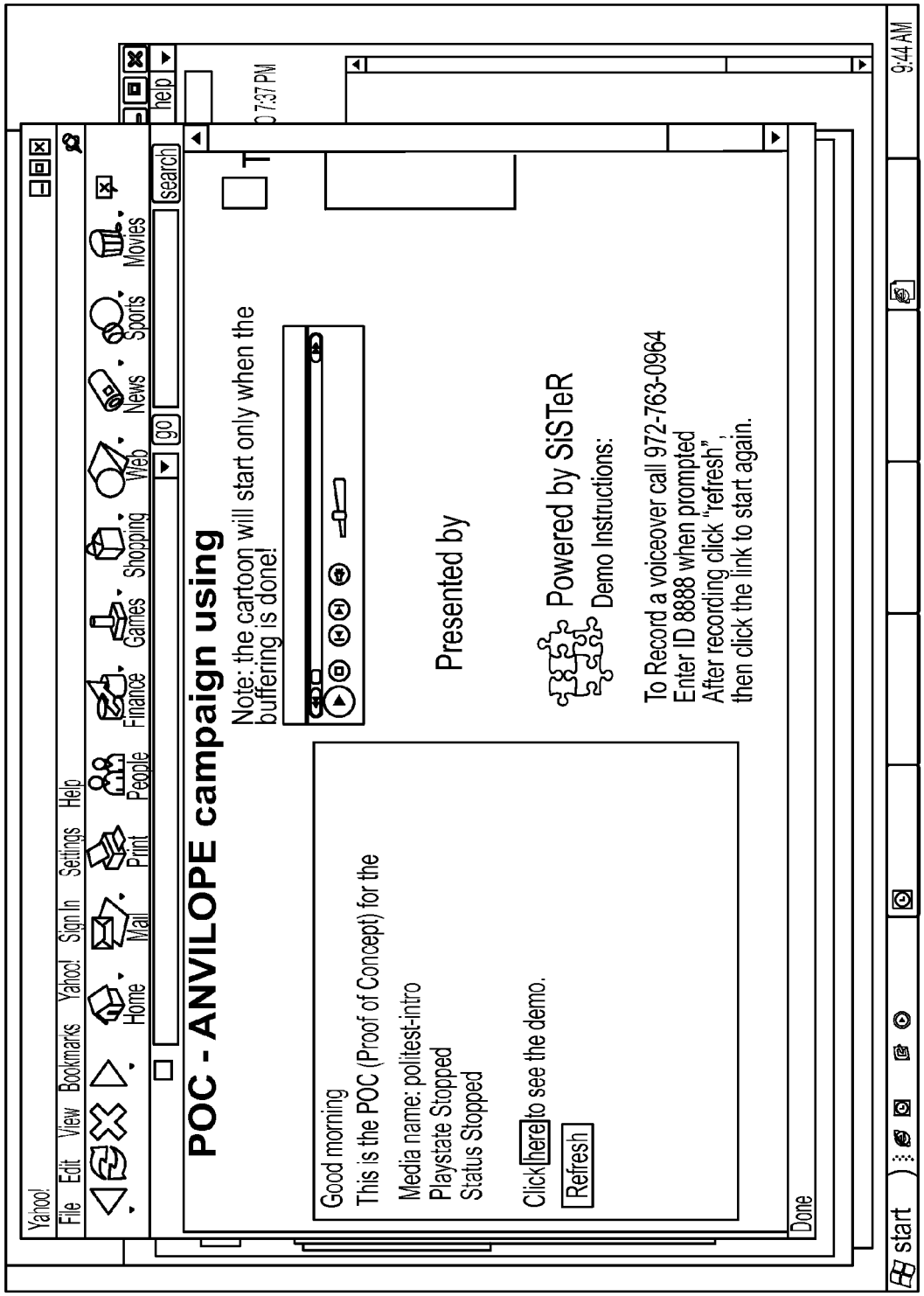
FIG. 35b illustrates a command to an animation file to play the ending animation.

Referring again to FIG. 35a, 379' is the process flow to trigger animation events based on instructions sent while streaming media is playing, 380' is the animation file, 382' is the instruction set file, 56' is the streaming file, 384' is a starting animation as it is played after the page is loaded, 386' refers to the event of the page load or the page starting while the animation is playing, 388' shows the start of the streaming files buffering event, 394' shows the effect of that event which stops the beginning animation, 396' is the event that the streaming file has finished and triggers 398', the start of the transition 400' in the animation file, 402' is the start of the next streaming file, 404' is its buffering event, 406' is the event that the buffering is completed, 408' is the instruction to start the transition from the animation file, 410' is the event triggered from the instruction set 382' which plays special effect animation 412', 414' shows another triggered event from the instruction set that plays a separate animation special effect 416', 418' is the event that the streaming file has ended, and 420' sends a command to the animation file to play the ending animation 422' (FIG. 35b).

Figure 36:
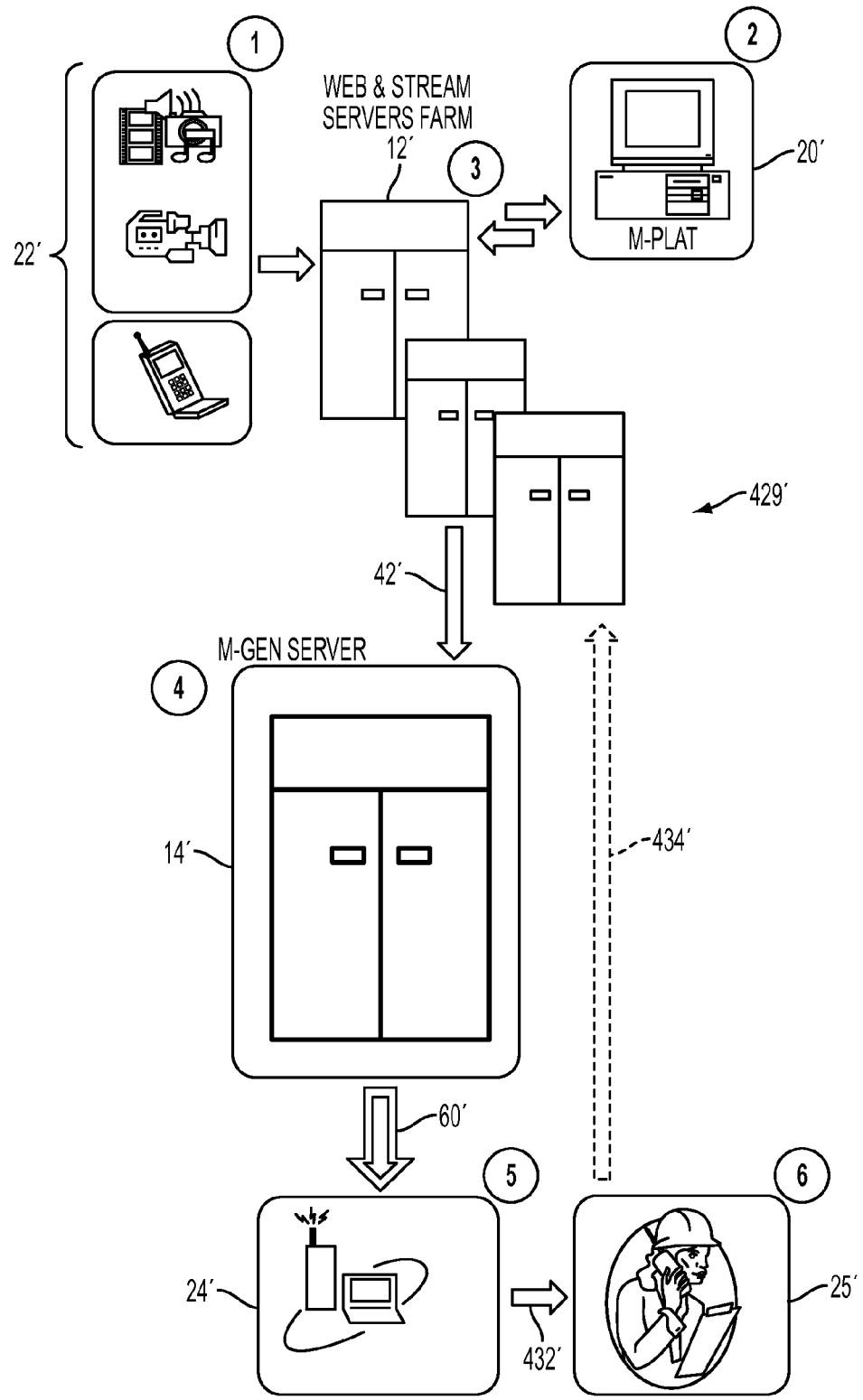
FIG. 36 illustrates an MMS process flow in accordance with an exemplary embodiment of the present invention.

Referring now to FIG. 36, the following steps occur:

1. Content is uploaded to the server from existing data files, video camera or cam-equipped cell phone.
2. Using the web based M-Plat any user can customize the content, create a personalize movie, add a voice over and send to any PC, web site or cell phone.
3. The web server holds the content and customized messages. The stream server distributes the content.
4. If the message is to be sent to a cell phone, the M-Gen receives the time stamps and creates a new file using DES and the media encoders.
5. The M-Gen transfers the appropriate file and destination information to the carrier. Content is forwarded to the devices (download or streaming).
6. Mobile user can respond to the message by SMS and/or voice. The voice message is embedded in the response e-mail.

Referring further to FIG. 36a, a process flow 429' for receiving and replying to, a multimedia message received by a global device user is depicted. This is an abbreviated process flow from FIG. 33 and FIG. 34 and includes raw media 22' that is stored on storage devices 12'. A multimedia presentation is created at the user interface 20' and then is sent 42' to the rendering server 14', which creates a single file and sends it to the mobile device 60'. The mobile device receives it 24', 432', the mobile device user has a chance to reply to this presentation, 25' and sends the reply via 434' back to the storage system.

Referring now to FIG. 37, 430' is the information flow from the user through the rendering server with a single file being created then and some samples of the information.

At 42' the user submits instructions to the rendering server, 438' the rendering server retrieves one or more file, creates a single file, 440', that single file is sent to the user, 442' the process ends. 444' is an example of possible commands created by the user that the rendering server uses to assemble files into a new single file. The box labeled 262'-268', 276', 290' is an example of the data that is captured by the user to create his multimedia Referring now to FIG. 38, 14''—this is the process flow of the rendering server, 14', from the rendering server's prospective.backslash., 42'—one or more sets of instructions have been to the rendering server, 46'—the rendering server accesses raw files from the storage system, 12'. 456'—the rendering server runs a process that combines one or more files into a new single file. 48A'-48C'—is the return of this single file from the media from the rendering server back to the user.

Figure 39:
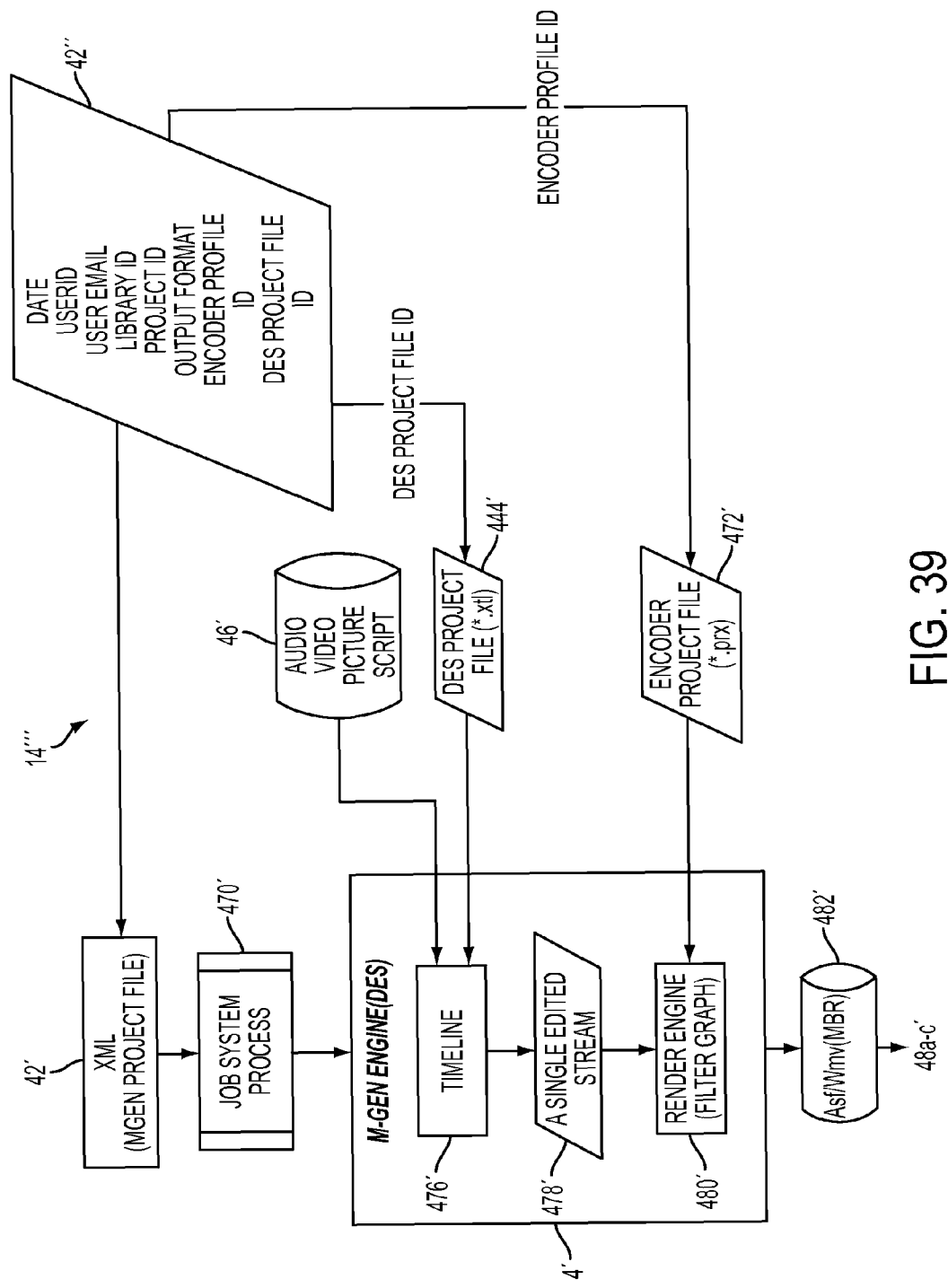
FIG. 39 illustrates an M-GEN in accordance with an exemplary embodiment of the present invention.

Referring now to FIG. 39, 14'''—this is an expanded view of the rendering server process. It begins 42' a set of commands is received 42'' is the list of possible fields included in this command set, 470' refers to a job control process. This process is responsible for initiating the actual rendering of the files, 474' is the actual rendering process once it is initialized, 476' is the timeline of the final movie that needs to be outputted. It retrieves data from 46' audio, video, pictures, raw data from system 12', the storage system, 444' is a project file that describes how they combine and render the files 46', 478' is the raw data stream of a single file that has been created, 480' is the output process for rendering engine. Depending on the format of the output file, it has the ability to take as an input 472' and encode a project file. This project file contains all the parameters needed to reduce a streaming media file. This is an optional input. 480' also has the ability to produce a file in a non-streaming format. 482' is the final product for file that is stored on 48A' or sent through 48C' and 48B'.

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the systems 10 and 30 can be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

What is claimed is:

1. A method, comprising:
   creating a copy of a still image by a first module, the copy of the still image comprising reduced dimensions of the still image;
   creating a new still image from a selected area of the still image;
   automatically ordering the new still image and the copy of the still image;
   creating an audio file by at least one of a second module and a third module;

creating a timeline, by the first module, related to the ordered images and the created audio file; and rendering the timeline into a video clip by a fourth module, wherein the timeline includes: a length of the audio file, a length of the video clip, the ordered images, a display time of each of the ordered images, transition identifiers, and transition lengths.

2. The method of claim 1 comprising storing at least one of: metadata related to the still image and the copy of the still image, metadata related to the audio file, the timeline, or information comprising the creating of the audio file.

3. The method of claim 2, wherein the metadata is stored in a command.

4. The method of claim 2, wherein the metadata stores at least one of:
   a height;
   a width;
   a size;
   compression data; and
   a file format.

5. The method of claim 1, wherein the copy of the still image is used for display purposes.

6. The method of claim 1, wherein the new created still image is displayed as an image with reduced dimension.

7. The method of claim 1 comprising panning and zooming at least one of: a portion of or the copy of the still image, a portion of or the new created still image, a portion of or the stored new still image, or a portion of or the stored copy of the still image, wherein the panning and the zooming is a set of coordinates related to the image.

8. The method of claim 7, wherein the set of coordinates is stored in the timeline.

9. The method of claim 2 comprising transitioning from one to another one of the ordered images, and further comprising storing a transition identifier and a transition length.

10. The method of claim 2 comprising retrieving at least one of: the metadata related to the audio file, the metadata related to the still image and the copy of the still image, the timeline, or the information comprising the creating of the audio file, by the first module.

11. The method of claim 1 comprising optionally previewing the timeline via a fifth module.

12. A system, comprising:
   a device configured to create audio;
   a first server configured to:
      receive still images;
      automatically order the still images; and
      create a timeline related to the ordered images and the created audio, wherein the timeline includes a length of the ordered images and a length of the created audio;
   a second server configured to render the timeline into a video clip; and
   memory configured to store at least one of: the created audio, the still images, the ordered still images, the timeline and the video clip;
   wherein the device and the first server are communicably coupled;
   wherein the first server and the second server are communicably coupled;
   wherein the memory is communicably coupled to the first server and the second server; and
   wherein the device is at least one of:
      a text-to-speech module; and
      an integrated voice response module.

13. A non-transitory computer readable medium, comprising instructions for:
   creating a copy of a still image by the first module, the copy of the still image comprising reduced dimensions of the still image;
   creating a new still image from a selected area of the still image;
   automatically ordering the new still image and the copy of the still image;
   creating an audio file by at least one of a second module and a third module;
   creating a timeline, by the first module, related to the ordered images and the created audio; and
   rendering the timeline into a video clip by a fourth module, wherein the timeline includes a length of the audio file, an identifier of the audio file created by the second module or the third module, or a volume envelope associated with the audio file.

14. The non-transitory computer readable medium of claim 13 comprising instructions for:
   storing at least one of: metadata related to the still image and the copy of the still image, metadata related to the audio file, the timeline, and information comprising the creating of the audio file; and
   transitioning from one to another one of the ordered images, and further comprising storing a transition identifier and a transition length.

* * * * *

(12) INTER PARTES REEXAMINATION CERTIFICATE (728th)

United States Patent
Sumler et al.

(10) Number: US 8,149,701 C1
(45) Certificate Issued: *Nov. 4, 2013

(54) SYSTEM, METHOD, AND COMPUTER READABLE MEDIUM FOR CREATING A VIDEO CLIP

(76) Inventors: Jason Sumler, Dallas, TX (US); Tomer Alpert, Dallas, TX (US)

Reexamination Request:
No. 95/000,689, Sep. 6, 2012

Reexamination Certificate for:
Patent No.: 8,149,701
Issued: Apr. 3, 2012
Appl. No.: 13/018,191
Filed: Jan. 31, 2011

( * ) Notice: This patent is subject to a terminal disclaimer.

Related U.S. Application Data

(63) Continuation of application No. 11/293,005, filed on Dec. 2, 2005, now Pat. No. 7,882,258, and a continuation-in-part of application No. 10/773,130, filed on Feb. 5, 2004, now abandoned.

(60) Provisional application No. 60/632,410, filed on Dec. 2, 2004, provisional application No. 60/445,261, filed on Feb. 5, 2003.

(51) Int. Cl.
*G01R 31/08* (2006.01)
*G06F 15/16* (2006.01)

(52) U.S. Cl.
USPC .......................................... 370/230; 709/231

(58) Field of Classification Search
None
See application file for complete search history.

(56) References Cited

To view the complete listing of prior art documents cited during the proceeding for Reexamination Control Number 95/000,689, please refer to the USPTO's public Patent Application Information Retrieval (PAIR) system under the Display References tab.

*Primary Examiner* — Rachna Desai

(57) ABSTRACT

The present invention provides a system, method, and computer readable medium for creating a video clip. In one embodiment, a method, comprising creating a copy of a still image by a first module, the copy of the still image comprising reduced dimensions of the still image, creating a new still image from a selected area of the still image, automatically ordering the new still image and the copy of the still image, creating an audio file by at least one of a second module and a third module, creating a timeline, by the first module, related to the ordered images and the created audio file, and rendering the timeline into a video clip by a fourth module, wherein the timeline includes a length of the audio file, a length of the video clip, the ordered images, a display time of each of the ordered images, transition identifiers, transition lengths. The present invention further discloses a system for assembling and distributing multi-media output, comprising: a rendering server; a web server; and storage, wherein the servers and the storage are operably coupled; the storage adapted to receive digital media and properties of the media, store the media and the properties, and transmit the media and the properties; the web server adapted to perform at least one of a following action: retrieve the media and properties of the media; manipulate the media and the properties; assemble the properties; and transmit at least one of a following element from a group consisting of: the properties; and the assembled properties; and the rendering server adapted to receive commands from the web server.

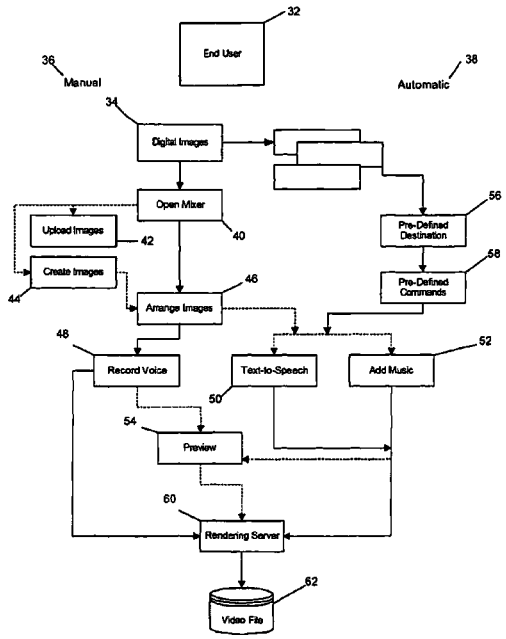

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-14 are cancelled.

\* \* \* \* \*